United States Patent
Oh et al.

(10) Patent No.: US 11,067,664 B2
(45) Date of Patent: *Jul. 20, 2021

(54) SYSTEM AND METHOD FOR INDOOR LOCALIZATION USING BEACONS

(71) Applicant: PCMS Holdings, Inc., Wilmington, DE (US)

(72) Inventors: Hyun Oh Oh, Seoul (KR); JuHyung Son, Uiwang-si (KR); Jin Sam Kwak, Uiwang-si (KR); Geonjung Ko, Suwon-si (KR)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,608

(22) Filed: Jan. 17, 2020

(65) Prior Publication Data
US 2020/0150213 A1 May 14, 2020

Related U.S. Application Data

(63) Continuation of application No. 15/558,047, filed as application No. PCT/US2016/023214 on Mar. 18, 2016, now Pat. No. 10,571,547.
(Continued)

(51) Int. Cl.
*G01S 5/00* (2006.01)
*G01S 5/02* (2010.01)
*H04W 64/00* (2009.01)
*G01S 5/14* (2006.01)
*G01S 1/02* (2010.01)
(Continued)

(52) U.S. Cl.
CPC ............ *G01S 5/0289* (2013.01); *G01S 1/024* (2013.01); *G01S 5/0242* (2013.01); *G01S 5/14* (2013.01);
(Continued)

(58) Field of Classification Search
CPC ......... H04W 64/00; H04W 4/02; H04W 4/80; H04W 8/08; Y02D 30/70; G01S 19/48;
(Continued)

(56) References Cited

U.S. PATENT DOCUMENTS 7,123,143 B2 10/2006 Zank
7,414,988 B2 8/2008 Jones
(Continued)

FOREIGN PATENT DOCUMENTS

AU 2012101222 9/2012
EP 2439605 4/2012
(Continued)

OTHER PUBLICATIONS

Dan et al., Localization with enhanced location accuracy using RSSI in WSN, 2011, IEEE, p. 1-6 (Year: 2011).*
(Continued)

*Primary Examiner* — McDieunel Marc
(74) *Attorney, Agent, or Firm* — Invention Mine LLC

(57) ABSTRACT

Systems and methods are described for determining positions of indoor localization beacons without requiring a physical site survey. In a coarse positioning method, a mobile node receives beacon signals that identify rooms (such as stores in a shopping mall) in which the beacons are located. The mobile node obtains floor plan information relating to the building and estimates beacon locations based on the floor plan and beacon signal strength. The estimated beacon locations may be arranged in a predetermined geometric pattern based on the number of beacons in a room. In a fine positioning method, a mobile node recognizes its proximity to a beacon and responsively measures the distance to other beacons. Estimated beacon positions may be used to estimate the location of the mobile node using trilateration or other techniques.

20 Claims, 40 Drawing Sheets

Related U.S. Application Data

(60) Provisional application No. 62/139,311, filed on Mar. 27, 2015, provisional application No. 62/139,377, filed on Mar. 27, 2015, provisional application No. 62/151,793, filed on Apr. 23, 2015.

(51) Int. Cl.
*G01C 21/12* (2006.01)
*G01S 1/06* (2006.01)

(52) U.S. Cl.
CPC ............ *H04W 64/00* (2013.01); *G01C 21/12* (2013.01); *G01S 1/06* (2013.01); *G01S 5/00* (2013.01)

(58) Field of Classification Search
CPC ...... G01S 5/0009; G01S 5/0226; G01S 1/024; Y02B 70/30; H04L 67/10; H04L 12/189; H04L 2209/80; G06Q 30/0267; H04B 5/0043; H04B 7/2606; H04B 17/318; B60K 2370/177; B60K 35/00; B60K 2370/176; B60K 2370/184; B60K 2370/21; B60K 2370/31; B60K 2370/334; B60K 2370/55; B60K 37/06; B60R 2300/20; G08B 13/1427
See application file for complete search history.

(56) References Cited

U.S. PATENT DOCUMENTS

| | | | |
|---|---|---|---|
| 7,526,108 B2 | 4/2009 | Zank | |
| 8,369,264 B2 | 2/2013 | Brachet | |
| 8,393,532 B2* | 3/2013 | Cato | G01S 5/0294 235/376 |
| 8,489,112 B2 | 7/2013 | Roeding | |
| 8,615,254 B2 | 12/2013 | Jamtgaard | |
| 8,699,370 B2 | 4/2014 | Leung | |
| 9,202,245 B2* | 12/2015 | Kostka | H04W 12/06 |
| 9,264,151 B1 | 2/2016 | Emigh | |
| 9,408,037 B1 | 8/2016 | Alizadeh-Shabdiz | |
| 9,426,657 B2 | 8/2016 | Niewczas | |
| 9,603,013 B2 | 3/2017 | Niewczas | |
| 9,667,352 B2 | 5/2017 | Niewczas | |
| 9,801,062 B2* | 10/2017 | Niewczas | H04W 4/80 |
| 10,094,907 B2 | 10/2018 | Niewczas | |
| 10,571,547 B2* | 2/2020 | Oh | G01S 5/14 |
| 2008/0125161 A1 | 5/2008 | Ergen | |
| 2010/0074133 A1 | 3/2010 | Kim | |
| 2012/0044355 A1 | 2/2012 | Jamtgaard | |
| 2012/0182933 A1 | 7/2012 | Bandhakavi | |
| 2013/0222599 A1 | 8/2013 | Shaw | |
| 2013/0252631 A1 | 9/2013 | Alizadeh-Shabdiz | |
| 2013/0260797 A1 | 10/2013 | Jones | |
| 2013/0294646 A1 | 11/2013 | Shaw | |
| 2014/0195380 A1* | 7/2014 | Jamtgaard | H04L 67/02 705/26.61 |
| 2014/0228044 A1* | 8/2014 | Jones, Jr. | G01S 5/02 455/456.1 |
| 2015/0031392 A1* | 1/2015 | Un | H04W 64/00 455/456.1 |
| 2015/0079942 A1* | 3/2015 | Kostka | G06Q 30/0267 455/411 |

FOREIGN PATENT DOCUMENTS

| | | |
|---|---|---|
| WO | 2012152988 | 11/2012 |
| WO | 2014092945 A1 | 6/2014 |

OTHER PUBLICATIONS

Cavalcante et al., Audio beacon providing location-aware content for low-end mobile devices, 2012, IEEE, 1-9 (Year: 2012).*
Cui et al., Three-mobile-beacon assisted weighted centroid localization method in wireless sensor networks, 2011, IEEE, p. 308-311 (Year: 2011).*
Mitton et al., Dynamic Beacon Mobility Scheduling for Sensor Localization, 2011, IEEE, p. 1439-1452 (Year: 2011).*
Wikipedia, "Indoor Positioning System". Web Archive dated Mar. 24, 2015, available at: https://web.archive.org/web/20150324111913/http://en.wikipedia.org/wiki/Indoor_positioning_system, 8 pages.
Bahl, P., et. al., "RADAR: An In-Building RF-based User Location and Tracking System", Institute of Electrical and Electronics Engineer, Inc. IEEE 2000, Mar. 1, 2000.
Wikipedia, "iBeacon". Web Archive dated Mar. 20, 2015, available at: https://web.archive.org/web/20150320234605/http://en.wikipedia.org/wiki/IBeacon, 7 pages.
Apple, Inc., "Getting Started with iBeacon". Ver.1.0, Apple, Inc., Jun. 2, 2014, 11 pages.
Wikipedia, "Levenberg-Marquardt algorithm". Web Archive dated Mar. 23, 2015, available at: https://web.archive.org/web/20150323190241/http://en.wikipedia.org/wiki/Levenberg%E2%80%93Marquardt_algorithm, 7 pages.
Chintalapudi, K., et. al., "Indoor Localization Without the Pain". MobiCom '10, Sep. 20-24, 2010, ACM 978-1-4503-0181—Jul. 10, 2009.
Rai, A. et. al., "Zee: Zero-Effort Crowdsourcing for Indoor Localization". MobiCom '12, Aug. 22-26, 2012, ACM 978-1-4503-1159—May 12, 2008.
Wu, C., et. al., "Site-Survey—Free Wireless Localization using Mobile Phones", (2012), 19 pages.
Lim, H., et. al., "Zero-Configuration, Robust Indoor Localization: Theory and Experimentation". Technical Report No. UIUCDCS-R-2005-2629 (Engr. No. UILU-ENG-2005-1818) Aug. 2005.
Bolliger, P. "Redpin—Adaptive, Zero-Configuration Indoor Localization through User Collaboration", Institute for Pervasive Computing ETH Zurich, MELT '08, Sep. 19, 2008, ACM 978-1-60558-189—Jul. 8, 2009.
International Preliminary Report on Patentability for PCT/US2016/023214 dated May 10, 2017.
Written Opinion of the in International Preliminary Examining Authority for PCT/US2016/023214 dated Feb. 16, 2017.
Kaplan, D. "Can Facebook Beacons to the Mainstream?" Geomarketing.com, Jan. 30, 2015, Available at: http://www.geomarketing.com/can-facebook-bring-beacons-to-the-mainstream.
Cinefra, N. et. al., "An adaptive indoor positioning system based on Bluetooth Low Energy RSSI", 2013.
International Search Report and the Written Opinion of the International Searching Authority for PCT/US2016/023214, dated Jun. 22, 2016.
Bluetooth, "Bluetooth Core Specification 4.2". Specification Adopted Documents, Web Archive dated Mar. 15, 2015, available at: https://web.archive.org/web/20150315104711/https://www.bluetooth.org/en-us/specification/adopted-specifications, 10 pages.
IEEE Standard for Information Technology—Telecommunications and information exchange between systems Local and metropolitan area networks—Specific requirements. Part 11: Wireless LAN Medium Access Control (MAC) and Physical Layer (PHY) Specifications. IEEE Computer Society, 802.11-2012, Mar. 29, 2012.
Taniuchi, D. et al., "Spring Model Based Collaborative Indoor Position Estimation with Neighbor Mobile Devices". IEEE Journal of Selected Topics in Signal Processing, vol. 9, No. 2, Mar. 2015, pp. 268-277.
Wyffels, J., et. al., "A Novel Indoor Localization System for Healthcare Environments". IEEE International Symposium on Computer-Based Medical Systems, (2012), pp. 1-6.
Xu, H., et al., "Practical Indoor Tracking Using Wireless Sensor Networks". Proceedings of the 6th Workshop on Positioning, Navigation and Communication, (2009), pp. 209-215.
Haute et al., "A Hybrid Indoor Localization Solution Using a Generic Architectural Framework for Sparse Distributed Wireless Sensor Networks". Proceedings of the 2014 Federated Conference on Computer Science and Information Systems, (2014), pp. 1009-1015.

(56) References Cited

OTHER PUBLICATIONS

Bluetooth, "A Look at the Basics of Bluetooth Technology." Internet Archive dated on Mar. 15, 2015, available at: https://web.archive.org/web/20150315223852/http://www.bluetooth.com/Pages/Basics.aspx, 3 pages.
Euclid Analytics. "Solutions." Internet Archive dated Mar. 15, 2015. Retrieved from, https://web.archive.org/web/20150315002323/http://euclidanalytics.com/solutions, and https://web.archive.org/web/20150315050119/http://euclidanalytics.com/solutions/retail, 4 pages.
Leber, J., "Startup Creates a Google Analytics for Brick-and-Mortar Retail". MIT Technology Review, retrieved from, https://www.technologyreview.com/s/509771/startup-lets-retail-stores-track-shoppers-as-websites-do/, Jan. 11, 2013, 2 pages.
Estimote, "Estimote Bluetooth Smart Beacon—iBeacon-compatible." Youtube, Sep. 10, 2013. https://www.youtube.com/watch?v=sUIqfjplnxY, 13 pages.

\* cited by examiner

STORE

FLOOR LAYOUT

STORE

FLOOR LAYOUT

SYSTEM AND METHOD FOR INDOOR LOCALIZATION USING BEACONS

CROSS-REFERENCE TO RELATED APPLICATIONS

This present application is a continuation of U.S. patent application Ser. No. 15/558,047, entitled, "System and Method for Indoor Localization Using Beacons," filed Sep. 13, 2017, which is hereby incorporated by reference herein in its entirety, which is a national stage application under 35 U.S.C. § 371 of International Application No. PCT/US2016/023214, entitled, "System and Method for Indoor Localization Using Beacons," filed Mar. 18, 2016, which claims priority to and the benefit under 35 U.S.C. § 119(e) of U.S. Provisional Patent Application Ser. No. 62/139,311, filed Mar. 27, 2015 and entitled "System and Method for Indoor Localization Using Beacons," Provisional Patent Application Ser. No. 62/139,377, filed Mar. 27, 2015 and entitled "System and Method for Determination of Indoor Beacon Position," and Provisional Patent Application Ser. No. 62/151,793, filed Apr. 23, 2015 and entitled "System and Method for Anchor Position Calculation Using Video Images," the full contents of which are hereby incorporated herein by reference.

BACKGROUND

The ability to determine the location of persons or devices in an indoor environment has become increasingly important for many applications. With the wide adoption of global satellite positioning systems, outdoor positioning has become very reliable. Many applications, however, also require or could benefit from seamless localization capabilities in indoor environments. Therefore, indoor localization has become a focus of research and development during the past decade. Improvements in localization performance will create unprecedented opportunities for many online and offline businesses. Applications include navigating users to a particular store (or other room) in a mall or to an office (or other room) in a public building. In particular, location-based advertisements and location-based search services are expected to be commercially valuable.

Known techniques for indoor localization operate to locate objects inside a building using radio waves, acoustic signals, or other sensory information collected by mobile nodes. The ability to provide precise location/navigation services for customers in commercial buildings such as shopping malls, department stores, and hospitals is directly linked to revenues. Real-time data on the location of consumers is very valuable to many parties, including stores, and third party applications compete for the users' attention and for ownership of data on consumer movements and habits. The data can provide information on how customers navigate stores and go about making their purchasing decisions.

While various methods have been proposed for indoor localization, no solution has gained universal approval. For the physical localization of a mobile node in buildings, proposed methods involve techniques such as, for example, geometric trilateration using radio signals from Wi-Fi access points or location fingerprinting using a pre-established map of environmental signals (such as magnetic fields, Wi-Fi signals, etc.). One notable recent approach is the "iBeacon" infrastructure promoted by Apple Inc. Beacons can employ the BLE (Bluetooth Low Energy) standard using low-powered, low-cost transmitters that can notify nearby mobile devices of their presence. Such systems enable a mobile node to determine that it is in proximity to a beacon device, but they do not necessarily provide the physical localizations of the mobile node in a building. Without extensive setup, beacons do not offer a pinned location like GPS. Beacons thus generally act as an indoor proximity solution, not an indoor localization solution. Beacons are increasingly deployed in many commercial buildings such as shopping malls, department stores, and mega complex buildings.

The use of beacon-type devices for further physical localization of mobile nodes indoors requires a "site survey." For example, a site survey may be performed to build a database of radio frequency fingerprints by measuring beacon signals in each position in a building and mapping the indoor locations in advance. If a trilateration method is to be used, for indoor localization, the exact location of beacon devices in each building or store is provided to mobile nodes.

SUMMARY

The present disclosure describes an indoor localization system capable providing physical locations of mobile nodes by utilizing contextual/proximity information from nearby beacon devices. In some embodiments, no site survey is required to set up the system.

For embodiments that operate to find the positions of beacon devices without site survey, several detailed methods are proposed herein. For example, initial positions of a mobile node and beacons can be estimated. The mobile node (MN) and beacons are then iteratively updated toward finer positions. In some embodiments, indoor localization methods described herein can work on the MN alone without a help of server. When a server can assist the MN, accumulated data from many MNs in crowd-sourced manner build a proposed confidence level for each node, thereby improving the localization precision.

This disclosure further describes indoor localization systems utilizing a ubiquitous infrastructure of beacon devices without requiring prior knowledge of beacon deployment location. Some proposed systems use crowd-sourced intelligence, in which reference positions of beacon devices become more accurate using cumulative input data from various mobile nodes, which in turn can provide more precise location information to mobile nodes.

Exemplary proposed indoor localization systems do not require the site survey procedure, instead building up information on a beacon's reference position database from crowd-sourced data from mobile nodes.

An exemplary system does not require new infrastructure, instead utilizing increasing deployment of beacon devices in many buildings. The beacons' original proximity applications remain unaffected. The exemplary system can provide additional applications relying on the benefit of localization for Mobile Nodes, such as applications that provide navigation to or through a particular store or other room.

Exemplary systems described herein can operate either with or without support from a dedicated localization server. A MN can be provided with its indoor location even when it enters a wholly new building without any provision of prior data, such as beacons' reference locations from the localization server. Instead, the MN may be provided with a simple floor plan of the building, which can be available from the building's website or web searches. When more and more users visit the building, by using crowdsourced information from both visiting customers and long-dwelling clerks in stores, the locations of beacon devices can be fine-tuned, which in turns gives precise localization services to mobile nodes.

DETAILED DESCRIPTION

Systems and methods are disclosed herein for providing indoor localization without the need for a physical site survey. Embodiments are described with reference to an indoor localization system and method implemented in an indoor environment partitioned into multiple connected indoor spaces, such as a shopping mall having an atrium (or atria) adjacent to numerous stores. For the sake of clarity, embodiments are described herein with reference to use in a shopping mall. However, embodiments can also be implemented in other building types.

Figure 1:
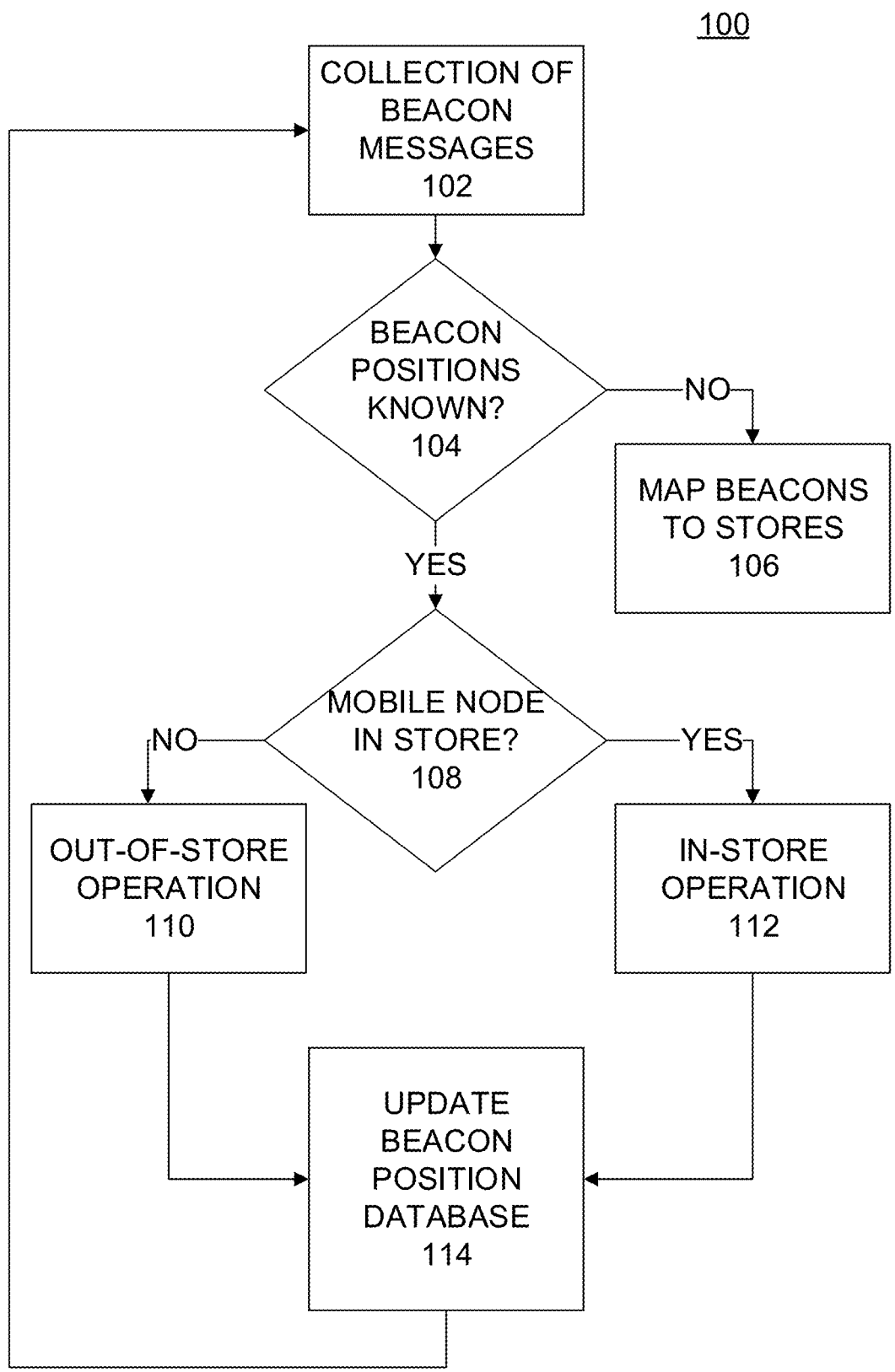
FIG. 1 is a schematic flow diagram illustrating an overview of a proposed indoor localization procedure.

FIG. 1 illustrates an exemplary method of localizing beacon positions without the use of a site survey. FIG. 1 depicts the flow diagram 100. In step 102, when a mobile node (MN) enters a building, the mobile node collects multiple beacon messages from nearby beacon devices. If the mobile node does not already have information on the positions of the beacons (step 104), the mobile node preliminarily maps beacons to store locations (step 106). By referring to a floor plan of the building and to the UUIDs (Universally Unique ID) contained in the beacon messages, the mobile node can preliminary map beacon devices to their virtual initial positions within a store. At step 108, the mobile node determines if it is in a store. When a mobile node determines that it is not proximate to a particular beacon device, the mobile node enters an out-of-store (or coarse-positioning) operation mode (step 108), in which the mobile node and beacon devices are iteratively relocalized based on a coarse relocalization method described in greater detail below.

A floor plan employed in embodiments of the present disclosure includes information identifying a location of at least one room (e.g. an atrium, a store, or an office) along with information associating the room with a room identifier (e.g. a UUID and major number) used by beacons deployed within the room. In some embodiments, the floor plan provides locations of rooms in a two- or three-dimensional grid. The grid may use latitude, longitude, and altitude values to allow comparison with GPS measurements in areas where indoor navigation service and GPS service overlaps.

If the mobile node determines that it is proximate to a beacon device associated with a particular store, the mobile node enters an in-store (or fine-positioning) operation mode (step 112). In the in-store operation mode, the mobile node performs a more fine-grained repositioning of the beacon devices using one or more of the techniques described below.

Method steps 102 through 112 illustrated in FIG. 1 can be performed by a mobile node without the use of any external location server. However, in some embodiments, the mobile node operates in step 114 to provide information to location server that is used to update a database that stores information on beacon location. The location server accumulates crowd-sourced inputs from multiple mobile nodes and updates the stored beacon location based on the crowd-sourced inputs. As the number of inputs increases, the stored positions of beacon devices approaches the ground-truth positions of the beacons, which in turn improves the localization of mobile nodes.

Methods are described herein for indoor localization of mobile nodes utilizing nearby beacon devices with limited prior knowledge of beacon device location. Methods are further provided for determining the locations of beacon devices.

Methods are provided for determining the position of beacon devices that have been arbitrarily positioned in a store. In some embodiments, the positioning methods make use of a floor plan of the indoor space and UUIDs of the respective beacons.

With respect to the out-of-store mode of operation, a coarse re-localization method is provided for iteratively improving the determined location of the mobile node and of the beacon devices.

With respect to the in-store mode of operation, methods are described for refining beacon-to-beacon relative distances and position of beacons on the floor plan. These methods include (1) operating a mobile node to determine relative signal strength of two or more beacons when the mobile node is proximate to at least one of those beacons; (2) using sensors in a mobile node to apply "dead reckoning" techniques when the mobile node travels from proximity to one beacon to proximity to another beacon; and (3) performing a centroid repositioning method based on characteristics of mobile nodes that are expected to remain within the store, such as mobile nodes of store personnel.

In some embodiments, a confidence level is assigned to the location of each network node (e.g., each beacon and mobile node). The confidence level can propagate over the connections. In some embodiments, a strategy for updating beacon device location at a localization server is provided based on comparison of confidence levels.

Figure 2:
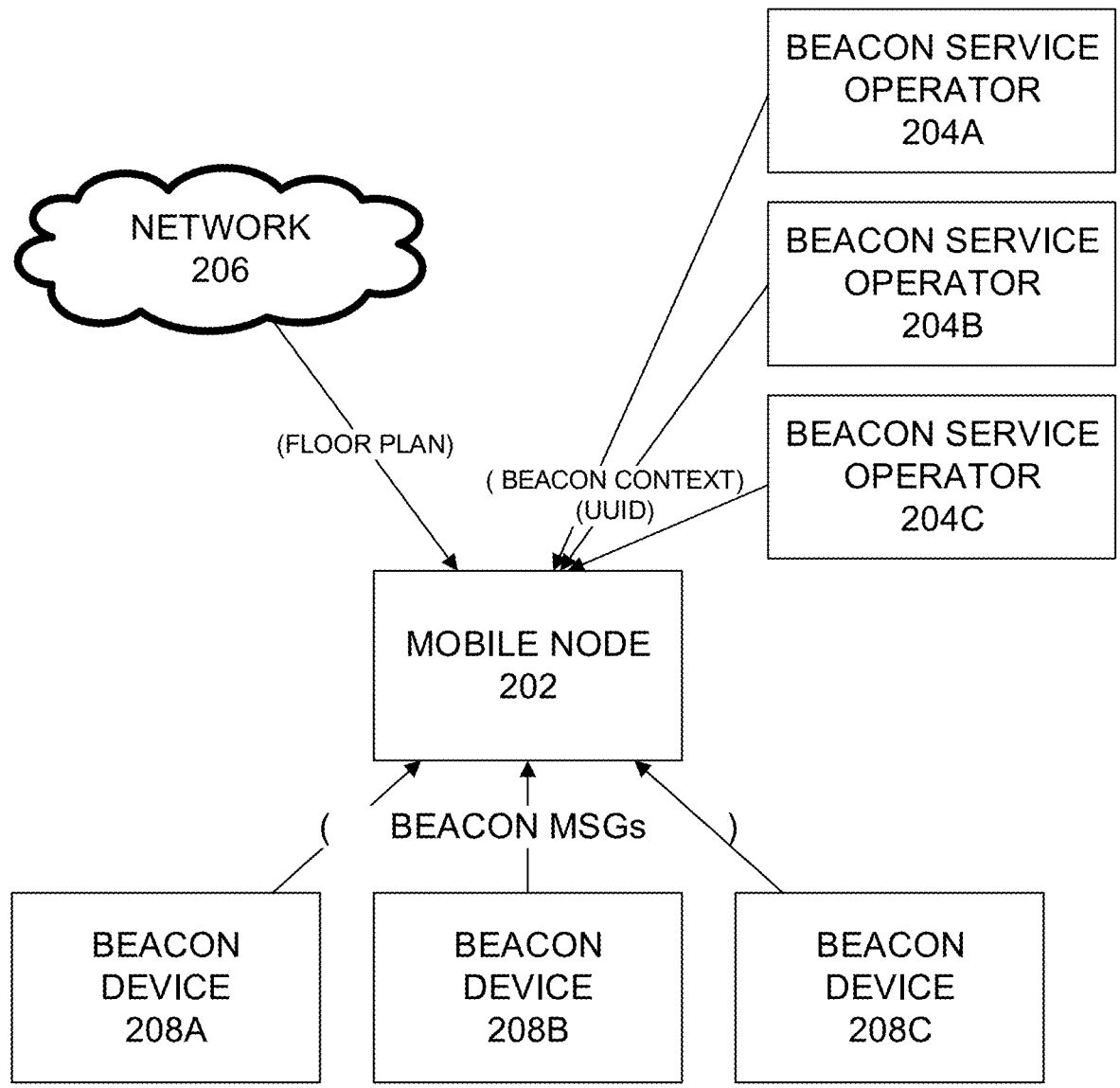
FIG. 2 is an entity relationship diagram illustrating an exemplary indoor localization system.

FIG. 2 illustrates an indoor localization system in which a mobile node determines its own position without support from the external localization server. FIG. 2 includes the localization system 200, which includes a mobile node 202, beacon service operators 204A-C, the network 206, and beacon devices 208A-C. The mobile node 202 first downloads or otherwise obtains a floor plan of the building (e.g. from the Internet or network 206). The mobile node 202 receives messages from those beacons 208A-C that are within range, each message including a UUID. The mobile node 202 then queries the appropriate beacon service operators 204A-C to obtain context information of the received beacon messages by querying each received UUID. Such queries may be mediated through the use of iOS or Android platforms. Based on the obtained context information, the mobile node 202 can localize itself within the building without any reliance on an external localization server.

Figure 3:
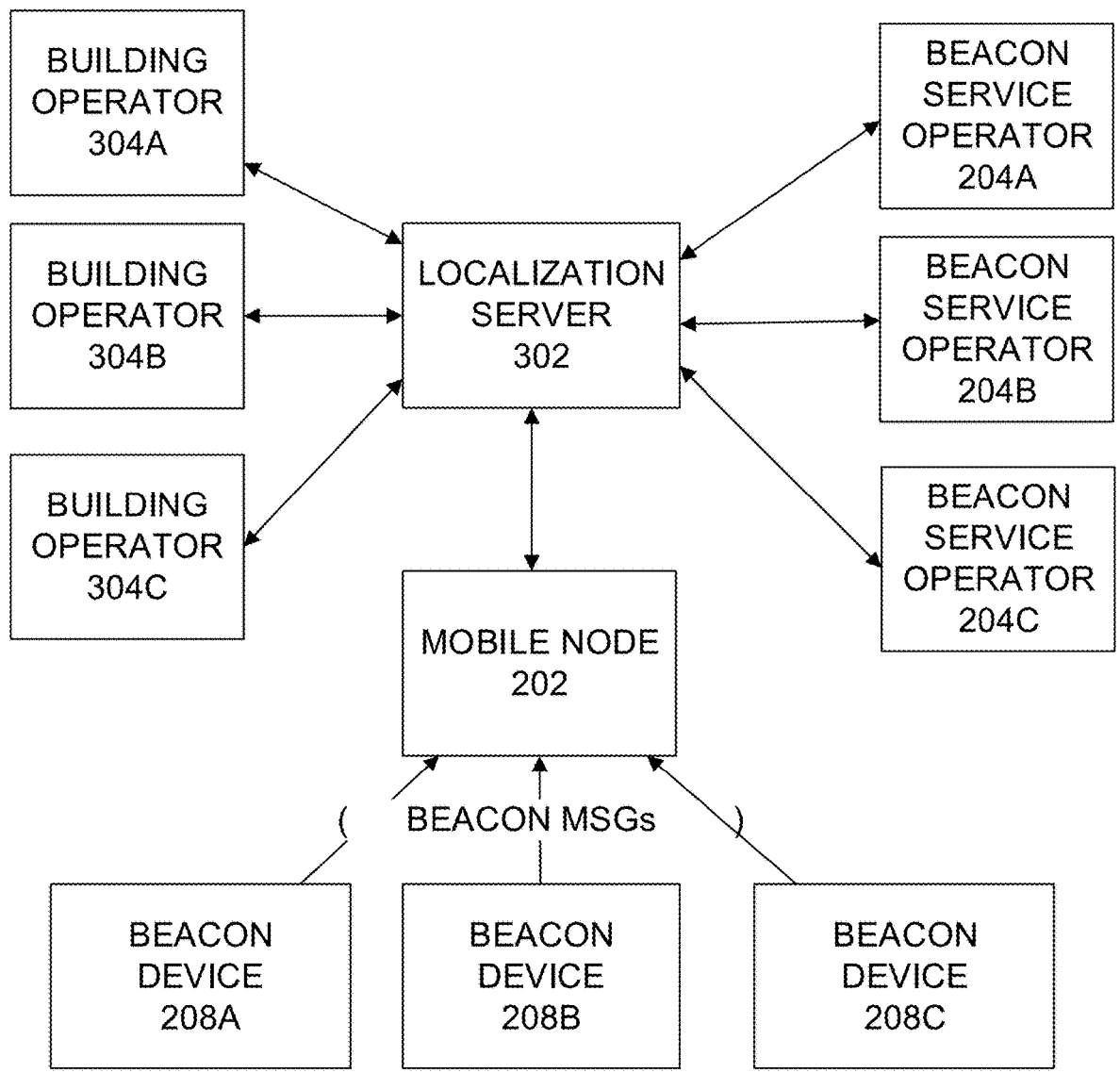
FIG. 3 is an entity relationship diagram illustrating an exemplary indoor localization system with the use of a localization server that collects crowdsourced information from a plurality of mobile nodes.

FIG. 3 illustrates an indoor localization system in which a mobile node determines its position with the assistance of an external localization server. FIG. 3 depicts the system 300, which includes elements from the system 200 depicted in FIG. 2, such as the mobile node 202, the beacon service operators 204A-C, and the beacon devices 208A-C. The system 300 also includes a localization server 302 and building operators 304A-C. The external localization server 302 maintains a database of beacon positions within each store by using crowd-sourced inputs from a plurality of mobile nodes. The external localization server 302 updates beacon positions by using beacon position update data from the mobile nodes while considering the confidence level of the input with the stored data. When a mobile node, such as the mobile node 202, first initiates the localization process within a building, it can receive the floor plan and the beacon reference positions in each store from the server. By using techniques described in greater detail below, a mobile node can localize itself in the building and also may produce updated positions of beacon devices and provide those updated positions to the localization server.

In some embodiments, the owners and/or management of a building (such as a shopping mall) depicted as building operators 304A-C, make available information on the property, such as the floor plan, wall/floor material, etc. Such information may be used by a localization server and/or by a mobile node for indoor localization. Building operators may be provided in turn with information on the movement of customers (which may be real time information), providing an opportunity for advertisement, navigation, and behavioral analysis.

In some embodiments, the beacon service operators 204A-C make contextual information available to a localization server. Localization servers obtain this contextual information through queries indexed by UUID. By using the provided contextual information, the localization server 302 maps beacon devices 208A-C into their related stores. The server provides updated position information regarding beacon devices in the building, and this updated position information can be used to detect change/misplacement of their beacon positions. In some embodiments, beacon position information is used to pinpoint cloned beacon devices which may be maliciously located in inappropriate locations in the building.

Figure 4:
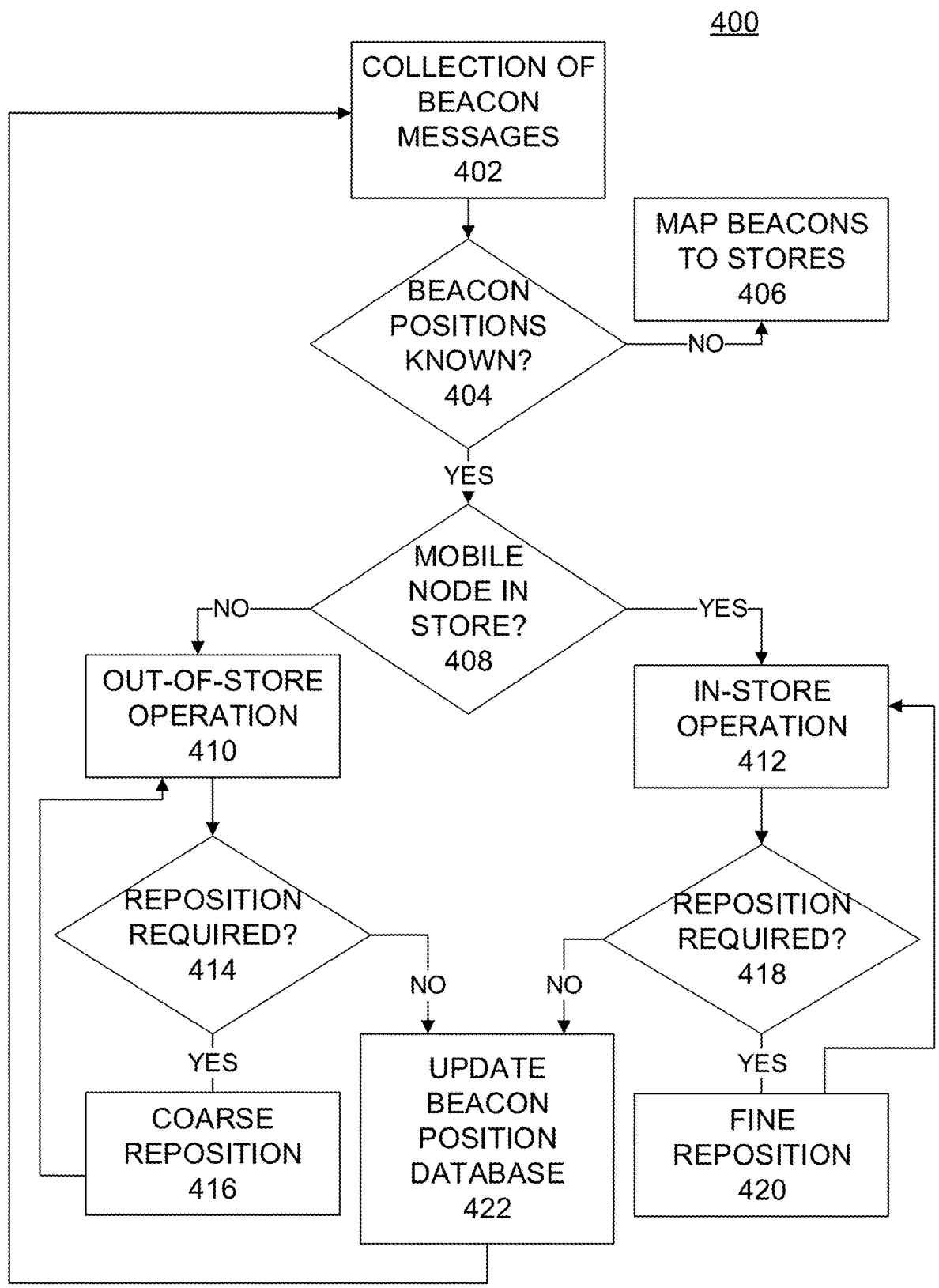
FIG. 4 is a schematic flow diagram illustrating an exemplary indoor localization method.

FIG. 4 is a schematic flow diagram illustrating an exemplary indoor localization method. In particular, FIG. 4 depicts the method 400. Systems and methods are described herein for enabling a user of a mobile node to determine his or her location in a building without requiring the use of a manual site survey for that building. An exemplary method for determining location is illustrated in the flow diagram of FIG. 4. The method 400 may be completed by the elements depicted in the system 300.

In step 402 of the method 400, a mobile node collects beacon messages. Periodically, the mobile node collects multiple beacon messages broadcast from nearby beacon devices. In some embodiments, each beacon device is a low-powered, low-cost transmitter that can notify nearby mobile nodes of its presence. The beacon device enables a smart phone or other mobile device to perform actions when in close proximity to it. The mobile node can then build an internal table of beacon information, such as the table 504 depicted in FIG. 5.

Figure 6A:
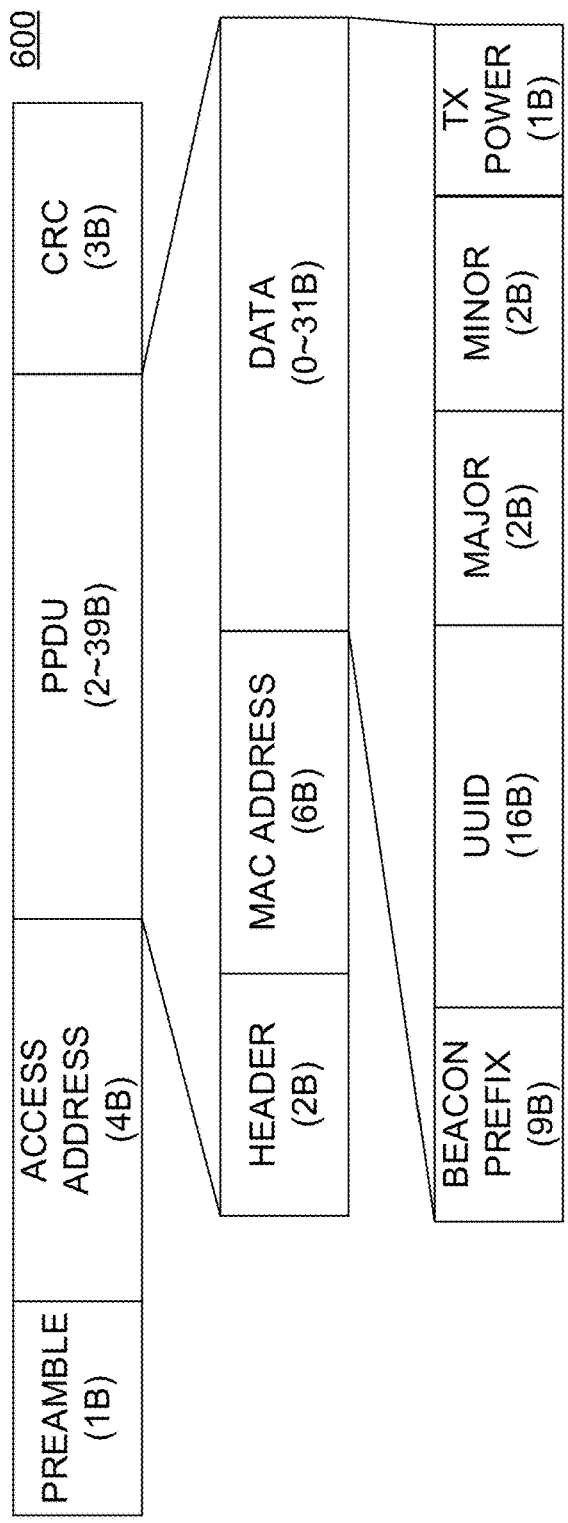
FIG. 6A illustrates an exemplary beacon message format.
Figure 6B:
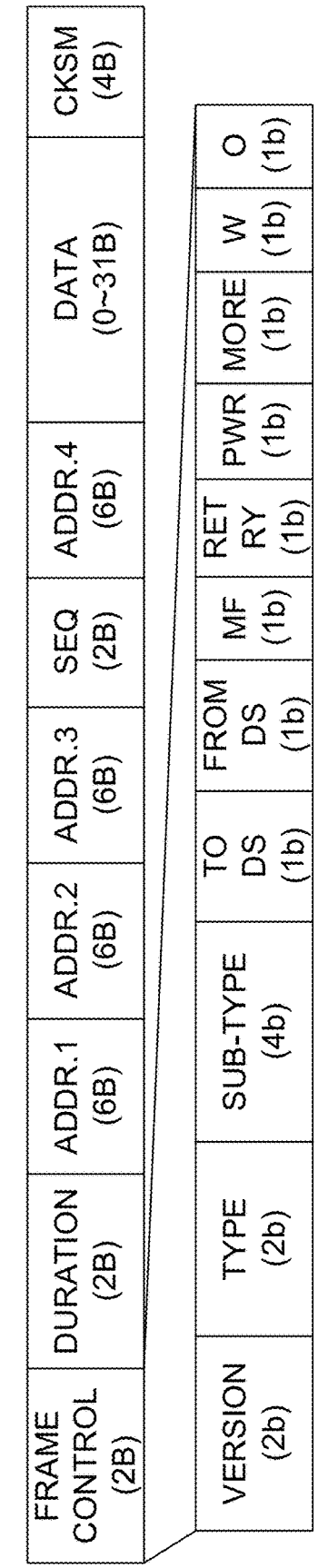
FIG. 6B illustrates an exemplary WiFi message format.

FIGS. 6A and 6B depict example message formats. In particular, FIG. 6A depicts the example message format 600, and FIG. 6B depicts the example message format 650. In exemplary embodiments, beacon devices transmit packets of data in intervals of from 20 ms to 10 seconds. The shorter the interval, the shorter the battery life, but the faster the device can be discovered. As shown in FIG. 6A, per the example format 600, an exemplary data packets can have a size of up to 47 bytes in length consisting of a 1byte preamble, a 4 byte access address, a 2-39 byte advertising protocol data unit (PDU), and a 3 byte cyclic redundancy check (CRC). In an embodiment, the PDU of the data packets includes a 2 byte header, a 6 byte MAC address, a universally unique identifier (UUID), a major number, a minor number, and a transmit power (TX power) indicator.

The UUID (which may be 16 bytes) is provided to an appropriate application or operating system in the mobile node. For example, all beacon devices of the same retailer may have the same UUID, and an application associated with the UUID (e.g. an application provided by the retailer) may be launched or accessed in response to receipt of a packet containing the UUID. The UUID can be looked up over the Internet to determine the contextual information of the beacon and/or to trigger an action on the mobile node, such as a push notification for special offer from a store.

The major number (which may be 2 bytes) is used to group a related set of beacons. For example, all beacons in a particular store within a shopping mall may have the same major number, allowing the application to identify the store in which the beacon is located. In some embodiments, the major number together with the UUID operate to identify a particular room (e.g. a particular store or office) and are referred to herein as a room identifier.

The minor number (which may be 2 bytes) is used to identify individual beacons and is referred to herein as a beacon identifier. Each beacon in a store has a different minor number. Different beacons may be placed at different locations within each store (e.g. positions such as clothing, men's shoes, women's shoes, etc.).

The transmit power (TX power) indicator (which may be 1 byte) indicates the strength of the signal sent from the beacon. For example, the transmit power indicator may indicate the expected strength of the signal measured at 1 meter from the beacon (RSSI—received signal strength indication). When the beacon signal is received at a mobile node, the actual received signal strength received at the mobile node can be compared with the transmit power to estimate the proximity of the mobile node is to the beacon. Such distance calculation capability is built in to existing mobile devices, such as mobile devices employing the iOS operating system. Obstacles such as furniture, people or communication congestion can weaken the signal. Hence the distance is only an estimate.

Figure 5:
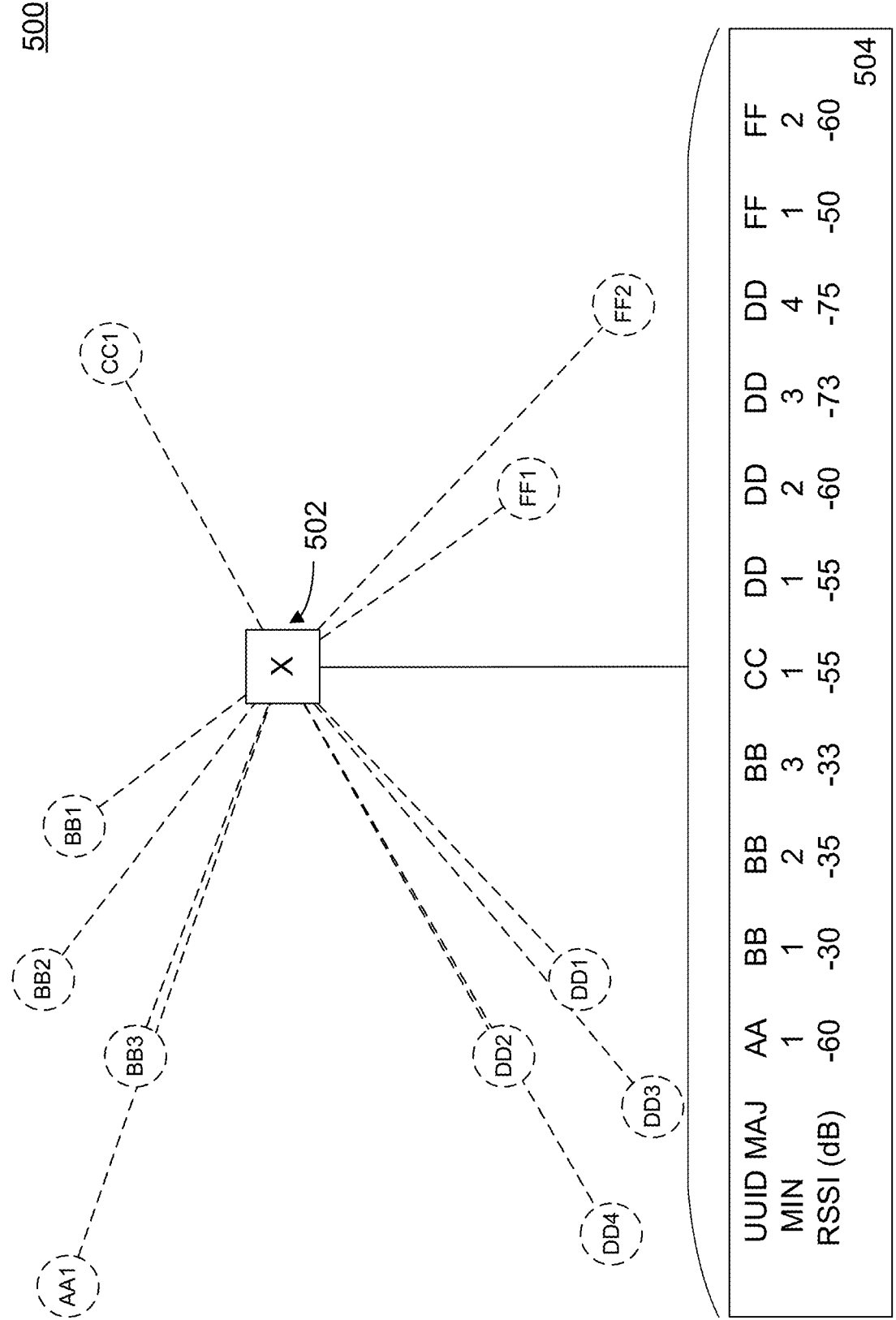
FIG. 5 illustrates collection of beacon messages by a mobile node in an exemplary indoor localization system.

FIG. 5 illustrates the collection of beacon messages by a mobile node in an exemplary indoor localization system. In particular, FIG. 5 depicts the overview 500. The overview 500 includes a mobile node at the position 502, a data table 504, and a plurality of initial estimate positions of beacons, depicted by dotted circles with a Major and Minor indication inside the circle. As illustrated in FIG. 5, the mobile node collects a set of beacon messages and records their UUID, major number (indicating a store), minor number (indicating a particular beacon), transmit power, and measured RSSI (received signal strength indicator) values (indicating a distance to the beacon considering beacon's TX power) into the table 504.

Returning to FIG. 4, the mobile node maps beacons to stores at step 406. After collecting a plurality of beacon messages, the mobile node can classify those messages based on their UUID, major number, and minor number fields and map those beacon devices to virtual positions within their matched store. In order to locate beacon devices into their appropriate store, the mobile node makes use of the building's floor plan.

In one method of obtaining a floor plan, the mobile node identifies the building based on the last GPS signal received before entering the building and then downloads the floor plan of the identified building. In another method of obtaining a floor plan, the mobile node submits a query to a beacon service provider based on the information in the beacon message (e.g., the UUID together with the major number) and retrieves the floor plan in response to the query. As depicted in FIGS. 2 and 3, a mobile node can choose to query to the Internet (network 206) or the localization server 302 to obtain the floor plan.

Figure 7:
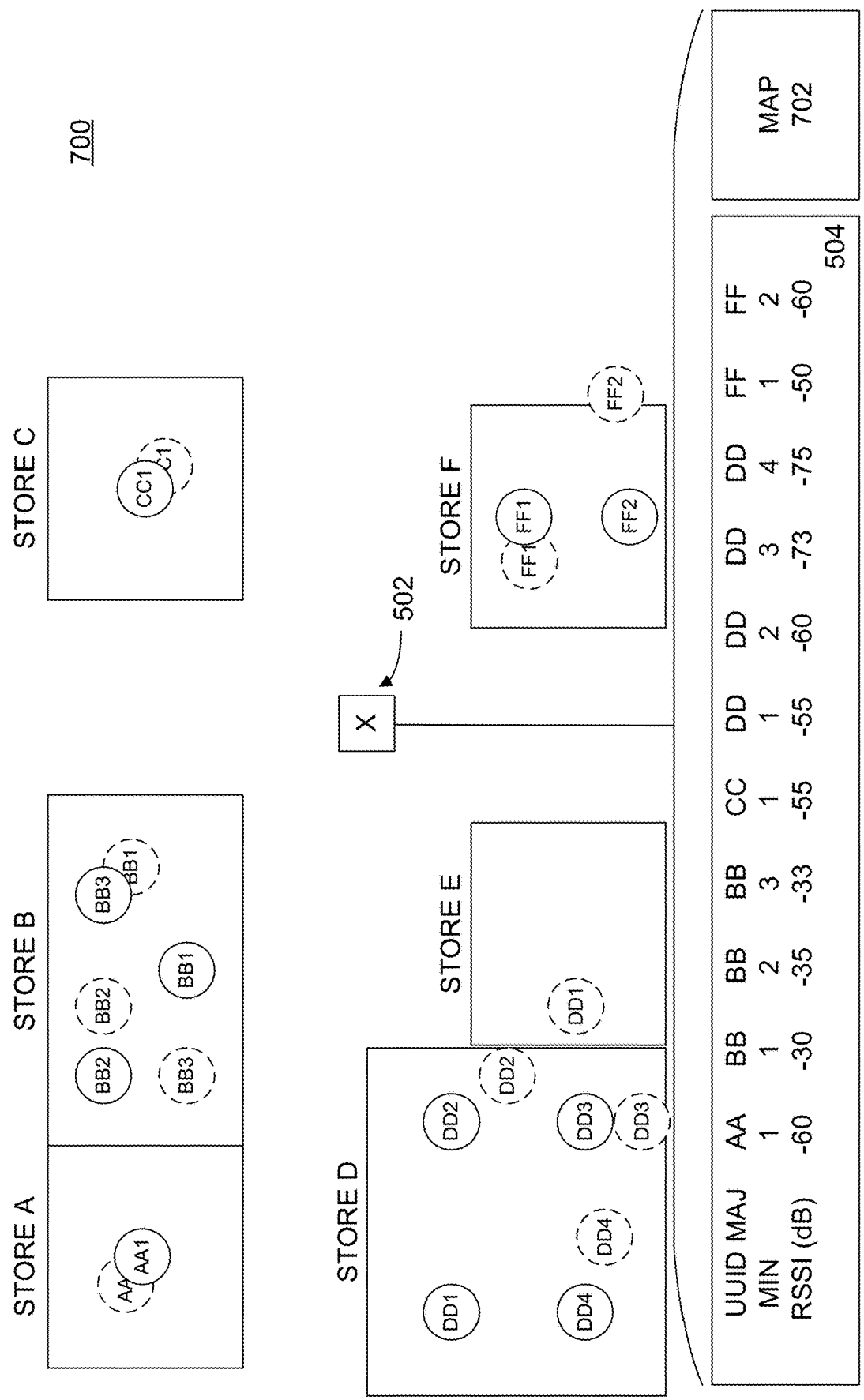
FIG. 7 illustrates a process of mapping beacon locations in stores in an exemplary indoor localization system.

With the use of the floor plan, the mobile node can establish virtual initial locations of the beacons within their respective stores as depicted in FIG. 7. FIG. 7 illustrates a process of mapping beacon locations in stores in an exemplary indoor localization system. FIG. 7 depicts the overview 700. The overview 700 includes the elements of the overview 500, but also includes layouts for stores A-F, obtained from the map 702, and artificial beacon positions depicted by solid line circles, with a similar identification method of Major and Minor as the dotted circles of the overview 500. It is noted that the localization server can provide the beacon position information if that data is already included in a database of the localization server. Therefore, the operations of mapping the beacons step 406 is generally performed only when there is no support from an external localization server or when the external server does not have beacon position data on the building.

Figure 8:
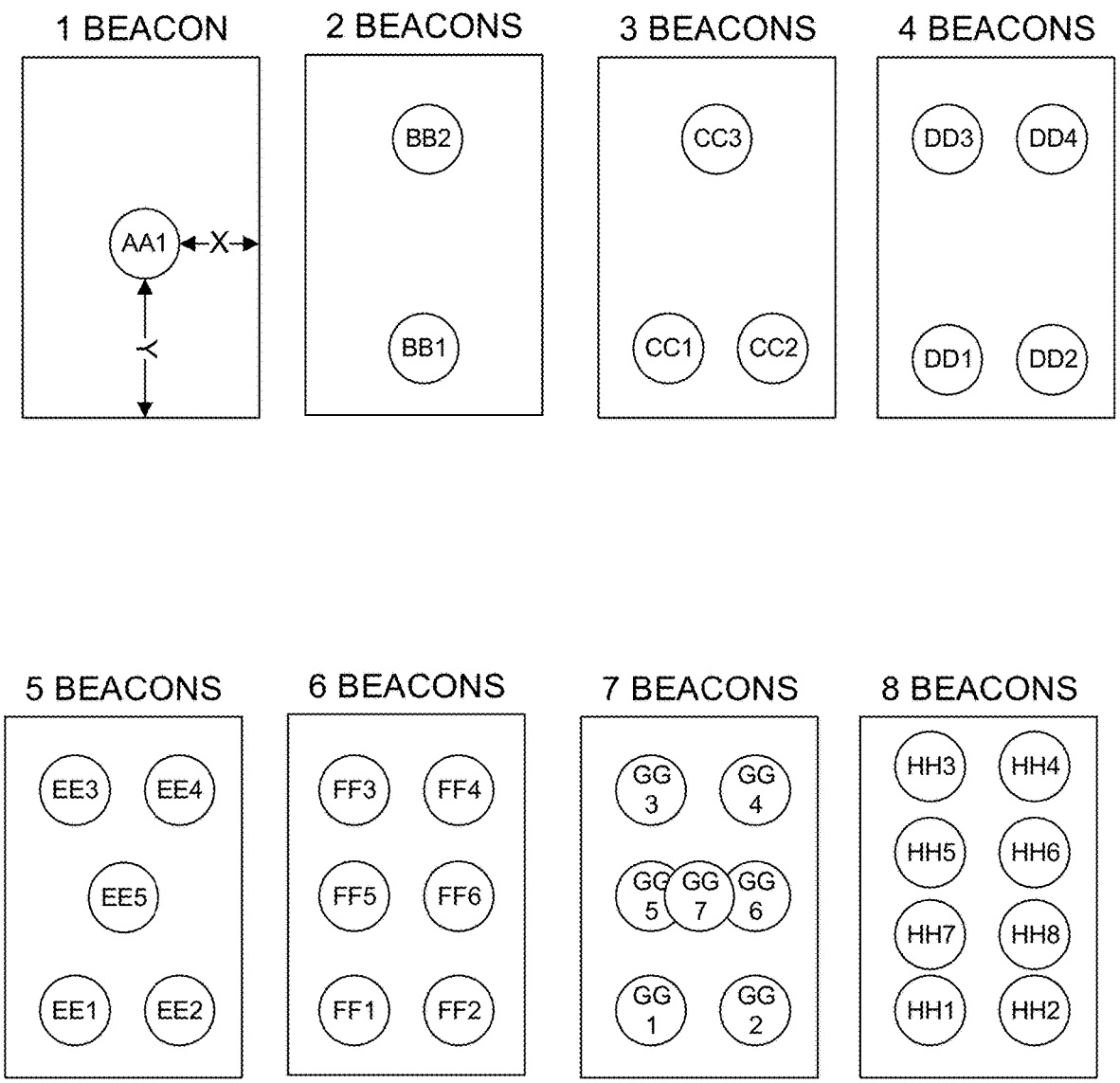
FIG. 8 illustrates example beacon layouts.

FIG. 8 illustrates example beacon layouts. When the mobile node does not have access to ground-truth positions of the beacon devices within each store, the mobile node virtually locates the beacon devices into artificial positions. In one exemplary method of determining initial estimated positions of the beacons, beacon location is determined based on the number of beacons in the store. For example, if there is one beacon device for a store, the beacon device is initialized to an estimated position at the center of the store, as depicted in FIG. 8. If there are two beacon devices for a store, one with the relatively higher RSSI value is initialized to an estimated position in front and the other is initialized to an estimated position in the rear along the centerline as depicted in FIG. 8. It is noted that the beacons may be initialized to estimated positions that are separated from the store's edges by an x-offset and a y-offset value. If there are three beacon devices for a store, the one with the highest RSSI value among them is initialized to an estimated position located in the front, and the other two are initialized to estimated positions arbitrarily located in the back row, forming a triangle shape as depicted in FIG. 8. It is noted that the estimated positions of the beacons are separated from the store's wall by x-offset and y-offset values. (The value of x and y can be defined as proportional to the horizontal & vertical length of the store, or set arbitrarily per each building.) If there are four beacon devices for a store, two with the relatively higher RSSI values are initialized to estimated positions in the front row and the remaining two are initialized to estimated positions in the back row arbitrarily, forming a rectangular shape as depicted in FIG. 8. It is noted that the estimated positions of the beacons are separated from the store's wall by x-offset and y-offset values. Additional example layouts of stores with 5-8 beacons are also depicted in FIG. 8.

Figure 9:
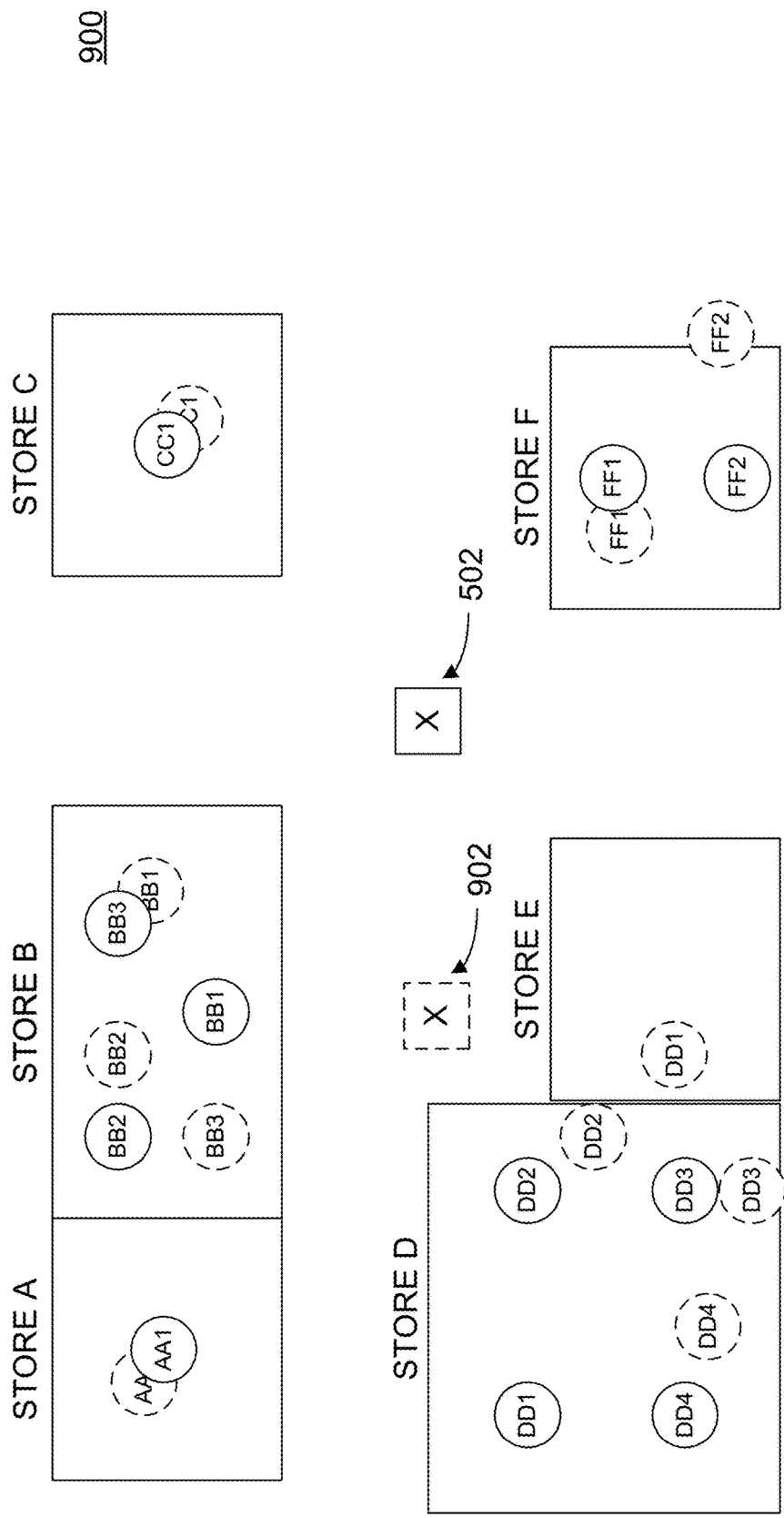
FIG. 9 illustrates a process of out-of-store (or coarse-positioning) localization of a mobile node in an exemplary indoor localization system.

Returning again to FIG. 4, after mapping beacon devices into virtual positions within each store, the mobile node undertakes to estimate its own location. At step 408, the mobile node determines if it is in a store. Based on the signal strength of each of the beacon messages, the mobile node determines whether it should operate in an in-store mode (step 412) or an out-of-store mode (step 410). FIG. 9 illustrates a coarse-positioning of the mobile node in an exemplary indoor localization system. In particular, FIG. 9 depicts the overview 900. The overview 900 is similar to the overview 700, except the coarse position of the mobile phone 902 is determined. In the overview 900, the coarse position 902 is located to the left of the position 502, and outside of the stores A-F.

In some embodiments, the mobile node makes a determination of whether to operate in an in-store or an out-of-store mode based on an RSSI threshold, e.g. In_Store_RSSI_Th. If RSSI values of all beacon messages from any store are not greater than the threshold, then the mobile node is estimated to be currently located outside of stores, and thus should follow procedures described below for out-of-store operation. The received signal strength may be normalized based on the transmitted TX power indicator before comparison with the threshold.

When operating in out-of-store operation, the mobile node uses the virtual positions of beacon devices and the measured RSSI values from received beacon messages to prepare an estimate of its own positions. The estimate may be generated using one or more methods including trilateration and non-linear least squares, among others.

In systems using trilateration, a mobile node determines its location by measuring distances from the beacons. Based on the initial predefined positions of the beacons, the mobile node determines a likely location of the mobile node that would account for the measured distance. Conceptually, circles of a measured radius can be drawn around each mobile node, and the mobile node is determined to be at or near the location where the circles overlap. However, trilateration may not provide reliable results in buildings where Bluetooth low-energy radio signals are degraded by walls, doors, and other physical objects. However, a wall/floor model of radio frequency propagation can implemented to model the structural signal degradations to address these limitations.

In systems using a non-linear least squares method, a parameterized function is fit to a set of observations by minimizing the sum of the squared residuals, where the residual is the difference between an observed value and the fitted value (e.g. Levenberg Marquardt algorithm). This method generally leads to more accurate results than the trilateration method, and the accuracy increases with information from additional beacons.

In preferred embodiments, beacons employing Bluetooth low energy (BLE) technology are employed. A building may be equipped with more beacon devices than Wi-Fi access points, allowing more precise localization than techniques based on the position of Wi-Fi access points.

At step 414, it is determined if the estimated positions of the beacons should be repositioned. If it is desirable to reposition the estimated locations of the beacons, coarse repositioning of beacon devices from the initial predefined positions is performed at step 416. After localizing the mobile node's initial estimated location by using the virtual positions of beacon devices and relative distances, the mobile node relocates positions of beacon devices within their associated store.

Figure 10:
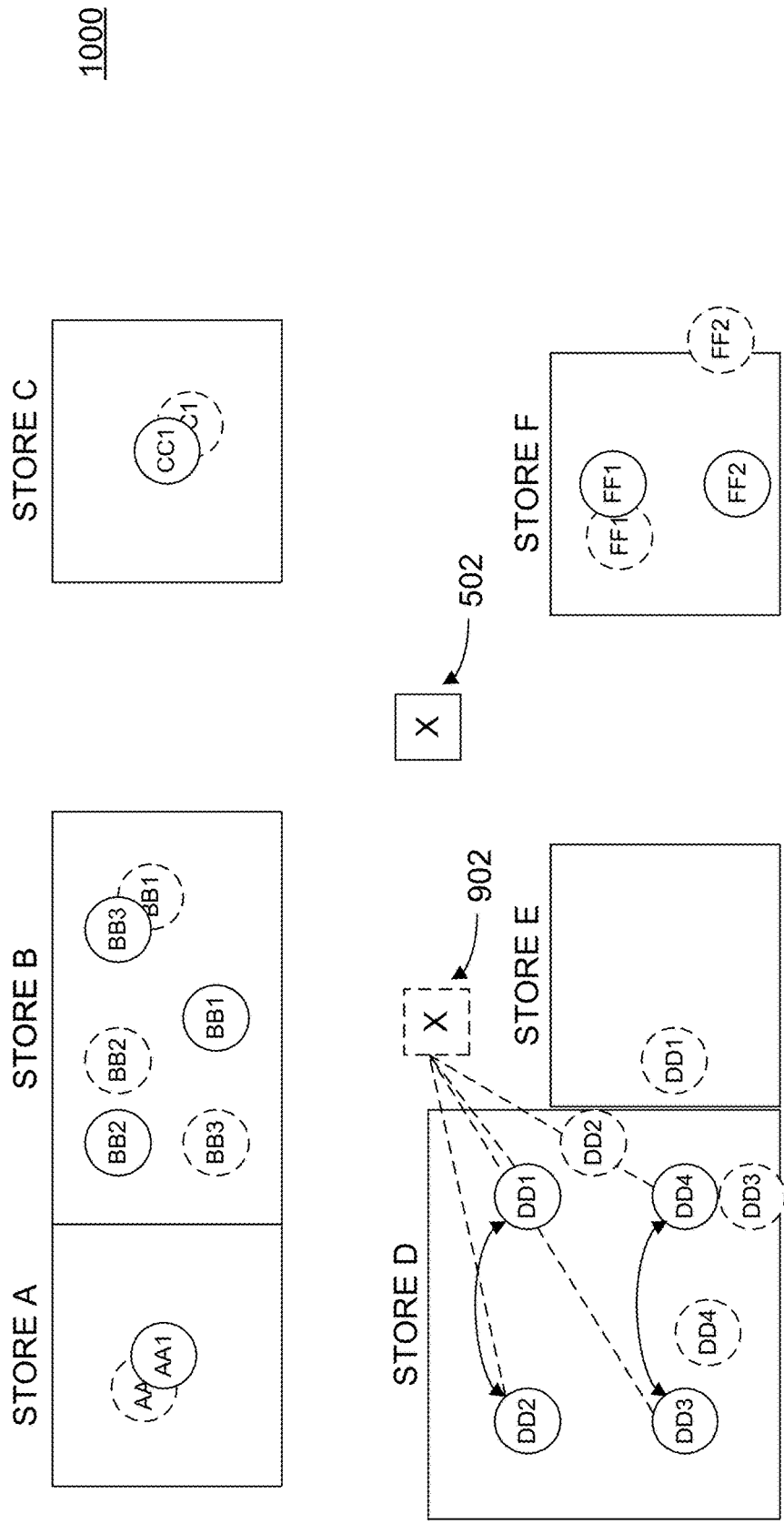
FIG. 10 illustrates a process of coarse beacon repositioning in an exemplary indoor localization system.

FIG. 10 illustrates a process of coarse beacon repositioning in an exemplary indoor localization system. In particular, FIG. 10 depicts the overview 1000. The overview 1000 is similar to the overview 900, however, the artificial locations of the beacons in Store D are repositioned. In the example illustrated in FIG. 10, the mobile node receives beacon signals from four beacons in store D, each of the signals being received with a different received signal strength. (For the sake of illustration, each of the beacons is assumed to have the same transmit power.) The received signal strengths of the four beacons are −55 dBm, −60 dBm, −73 dBm, and −75 dBm as depicted in the table 504 of FIGS. 5 and 7. The mobile node determines that these signal strengths are likely to be inconsistent with the initially-set virtual positions. For example the beacon whose signal was received with a strength of −60 dBm is expected to be closer to the mobile node than the beacon whose signal was received with the lower strength of −55 dBm, but this is the opposite of the initially-set virtual positions. Thus, in a coarse repositioning step, the mobile device swaps the virtual positions of the −55 dBm (DD1) and −60 dBm (DD2) beacons. Similarly, the virtual positions of the beacons with signals of −73 dBm (DD3) and −75 dBm (DD4) are swapped.

Figure 11A:
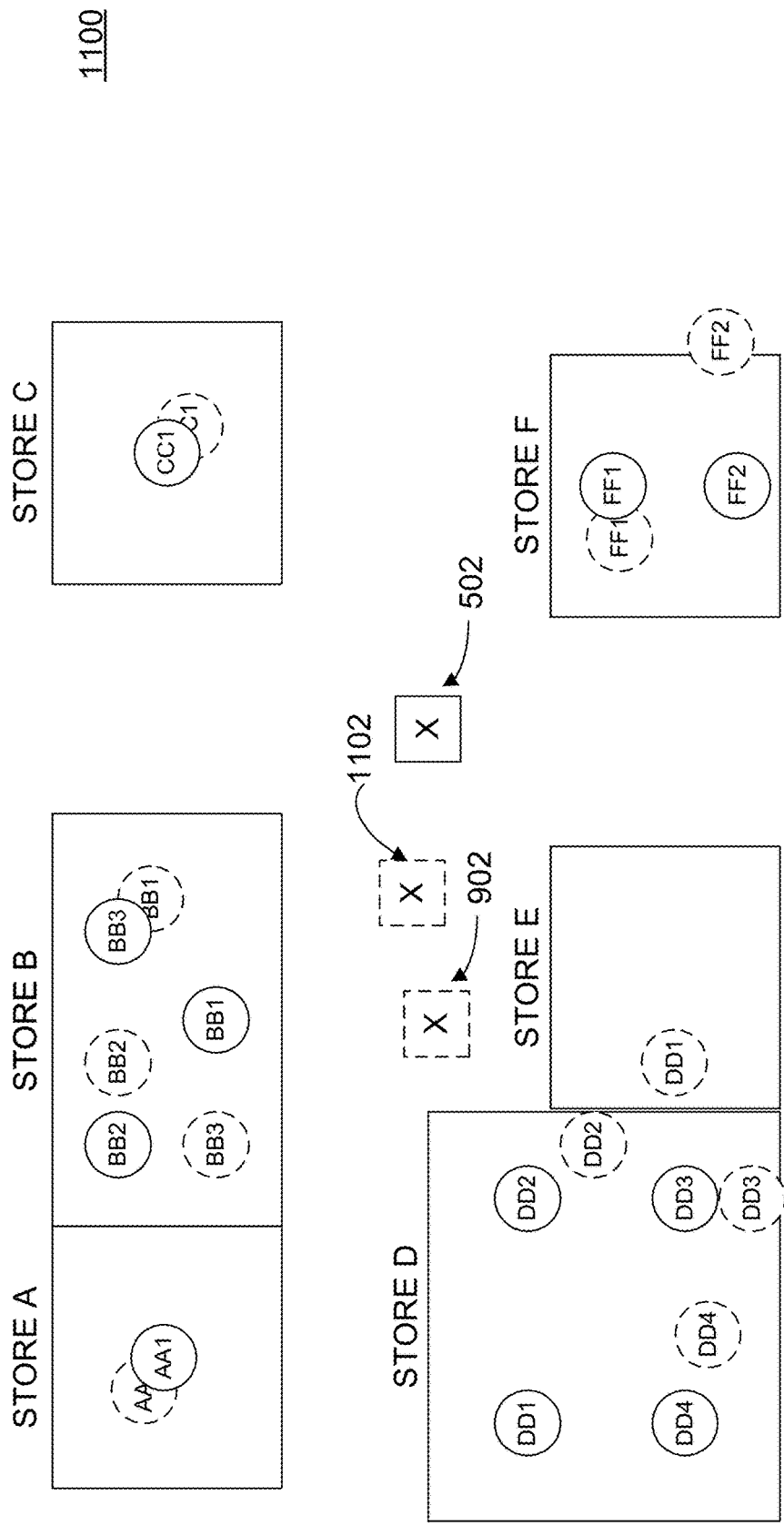
FIGS. 11A-C illustrate iterative beacon repositioning in an exemplary indoor localization system.
Figure 11B:
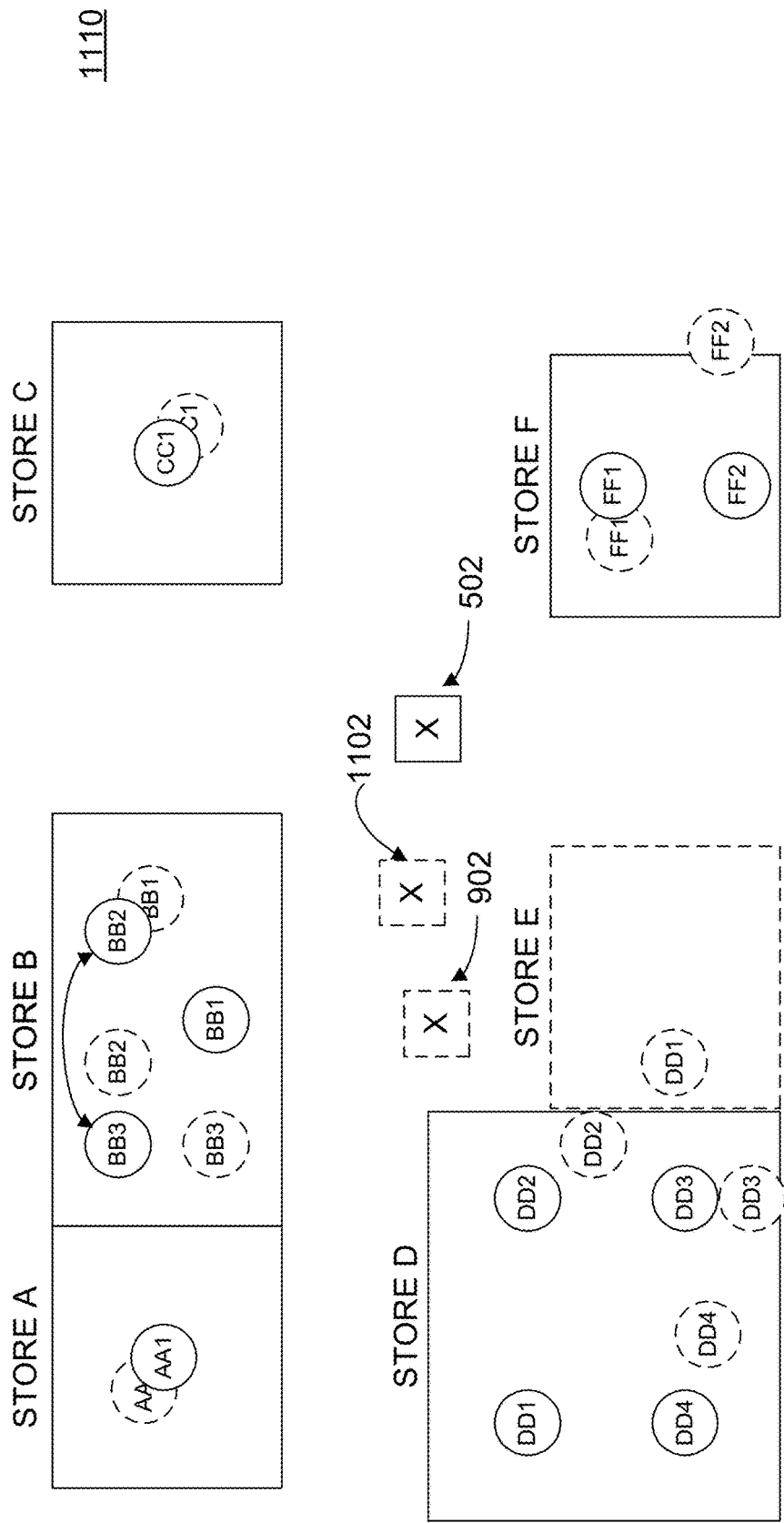
Figure 11C:
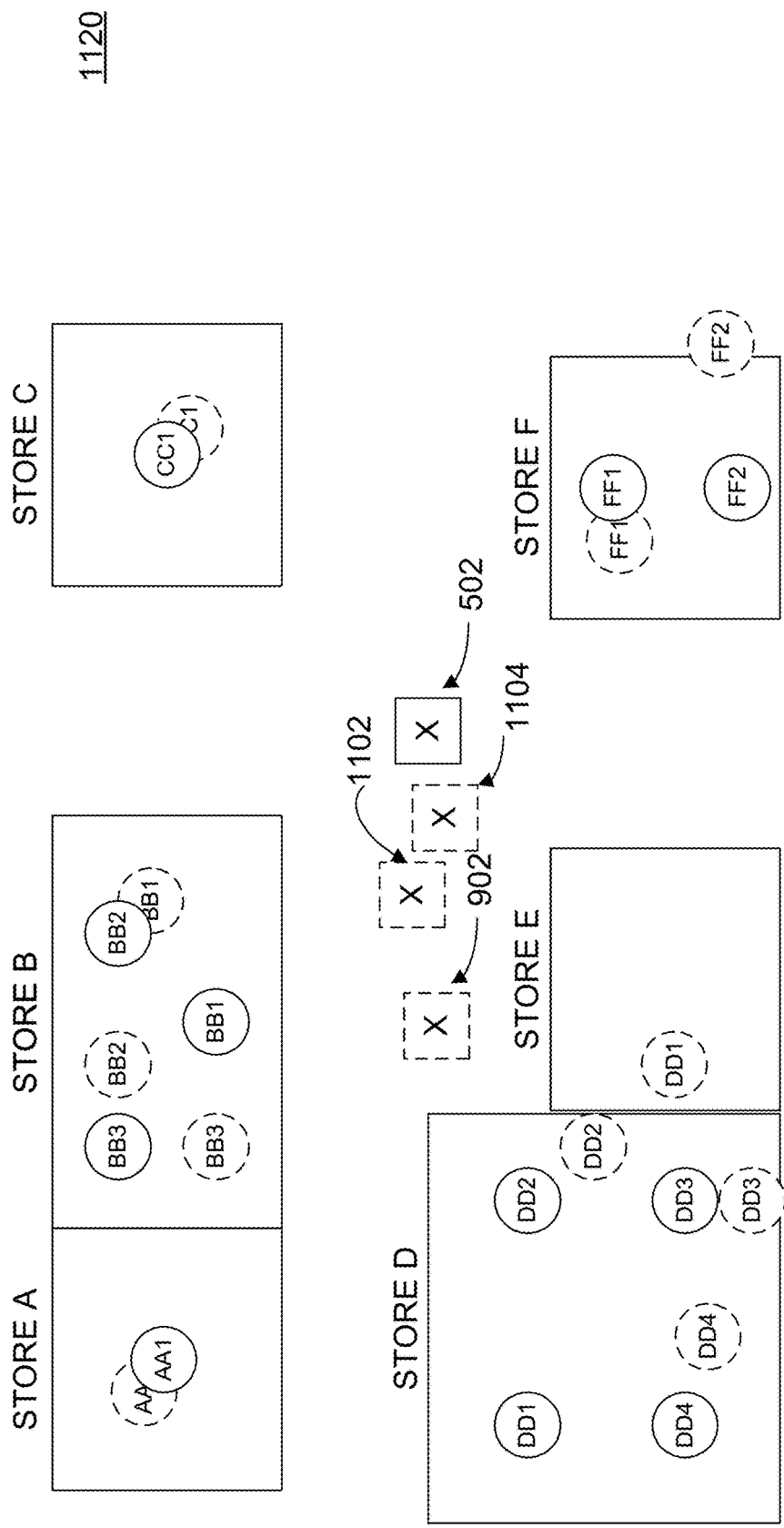

FIGS. 11A-C illustrate iterative beacon repositioning in an exemplary indoor localization system. FIGS. 11A-C depict the overviews 1100, 1110, and 1120, respectively. Each of the overviews 1100, 1110, and 1120 are similar to the overview 1000, and show the iterative process of repositioning of beacons and localization of the mobile nodes. After coarse repositioning of the beacon devices shown in FIG. 10, the mobile node re-calculates its own location using the updated beacon devices' positions and the relative distances, as depicted by the location 1102, located between the positions 902 and 502. The iteration of re-localizations of the mobile node and re-positioning of beacon devices continues until the all beacon devices are positioned to relatively more accurate positions within each store as depicted in FIG. 11A-C. In the overview 1110, the artificial locations of two beacons of Store B are swapped, and in the overview 1120, an updated position of the mobile node 1104 is determined. Then the result of mobile node location can be reported to the mobile user for navigation or other purposes.

Returning again to FIG. 4, the mobile node makes a determination to operate using an in-store mode of operation at step 412. In some embodiments, this determination is made based on a threshold, such as a threshold In_Store_RSSI_Th. For example, if RSSI values of all beacon messages from a particular store are greater than the threshold In_Store_RSSI_Th, then the mobile node is estimated to be currently located inside the store, and thus should follow procedures in step 412. Other techniques may also be used for making a determination to operate using an in-store mode of operation. For example, the mobile node may make a determination to operate in an in-store mode of operation if more than N beacon messages from a particular store are greater than a threshold, where N may be a predetermined number or may be a number based on the number of beacons in the store detected by the mobile node.

In an in-store mode, signals received from beacons can be used for more accurate positioning because those signals are stronger and are more likely to follow line-of-sight paths. Different techniques are available for fine-tuning position determinations in the in-store mode.

In some embodiments, a relative distance method is used for fine repositioning. While a user with a mobile node walks through a store, it is likely that the user will at some point be in close proximity to one of the beacon devices. In this context, close proximity may be determined by a received signal strength from the beacon exceeding a threshold, such as a threshold Proximity_RSSI_Th. Upon detection of a received signal strength exceeding the threshold, the mobile node performs steps for fine repositioning of the beacon devices. With the mobile node being in close proximity to one of the beacon devices (referred to herein as the target beacon device), the received signal strength of messages from other beacons is used as a measure of how far those other beacons are from the target beacon.

Figure 12:
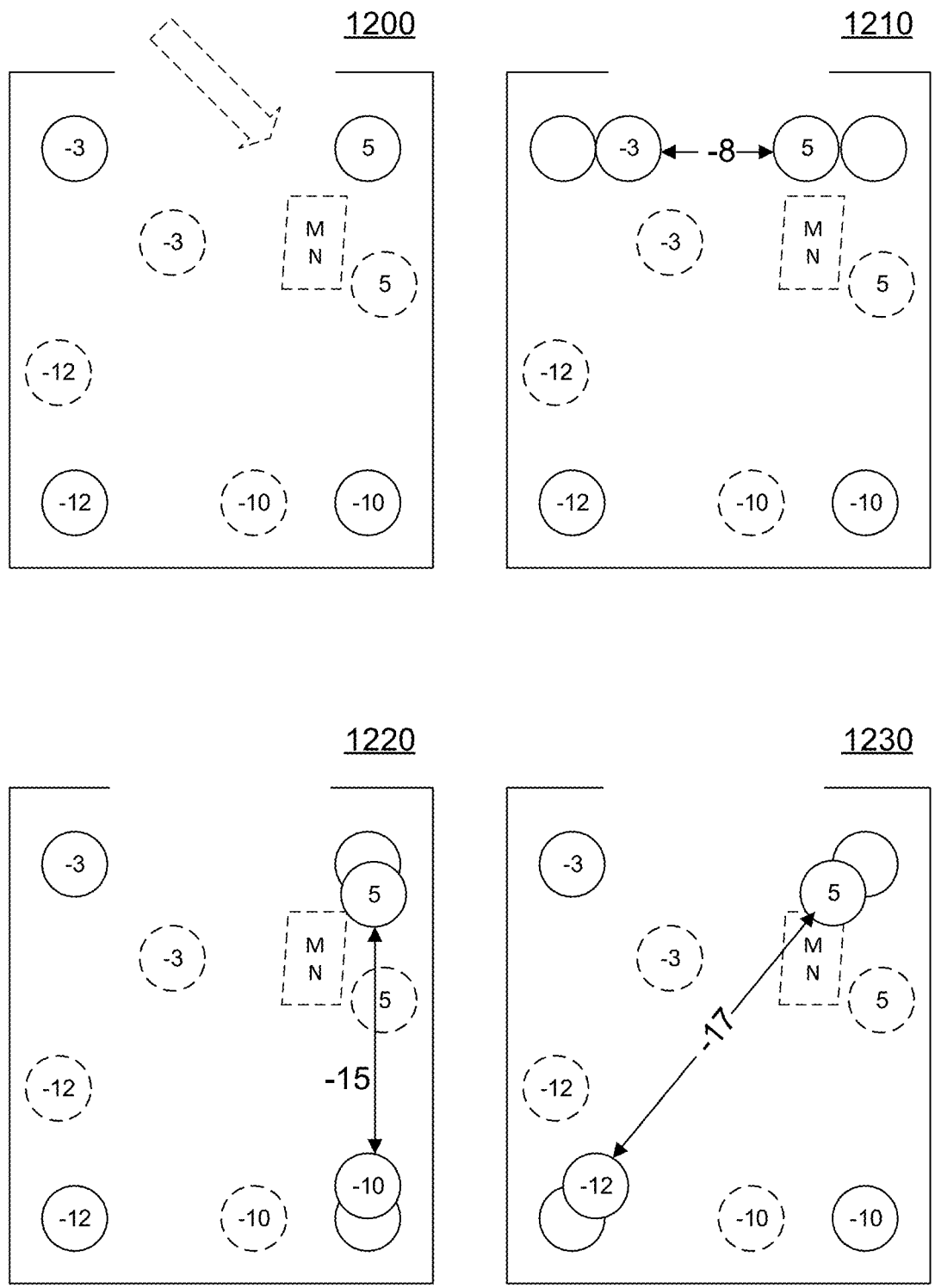
FIG. 12 illustrates fine repositioning of beacon devices using a relative distance method in an exemplary indoor localization system.

FIG. 12 illustrates fine repositioning of beacon devices using a relative distance method in an exemplary indoor localization system. In particular, FIG. 12 depicts the four views 1200, 1210, 1220, and 1230. In some embodiments, the fine repositioning of beacon devices proceeds in a sequence based on the received signal strength. An initial state is shown in view 1200. The view 1200 includes a mobile node entering a store from the top opening located at the top of the store overview. First, by using the RSSI differences between the target beacon device and the second highest RSSI beacon device, those two beacon devices are relocated based on their relative RSSI differences as depicted FIG. 12, view (1210). By applying the above procedure between the target and the remaining devices with sequentially lower RSSI, beacon devices are relocated within the store. The process between the target and the third highest RSSI value is depicted in view 1220, and the fourth highest RSSI value in view 1230. Also, if the mobile node approaches a second target beacon device in the store (exceeding Proximity_RSSI_Th), the procedure is repeated using the second target beacon device, and relative positions of beacon devices are refined again, resulting in convergence on the ground-truth positions, as depicted in FIG. 12.

In some embodiments, fine positioning is performed using a dead reckoning technique. In such embodiments sensors within a mobile node, such as an accelerometer, gyroscope, compass, etc., are used to monitor the distance, speed, and/or trajectory of a user traversing from one beacon to another. When a user is initially in proximity to a first beacon and later is in proximity to a second beacon, the mobile node uses the sensor data regarding the movements of the user to estimate the distance between the first and second mobile nodes. For example, the distance estimate may be based on a number of steps taken by the user between the first and second beacon. The number of steps may be measured using the accelerometer. The distance covered by each step may be a default distance or may be calibrated by, for example, measuring the distance traversed by the user per step in an outdoor environment subject to measurement by GPS. In some embodiments, the distance between beacons as measured by a number of steps of the user may be treated as a maximum distance, recognizing that actual distance between beacons may be shorter than the path traversed by the user, as the path traversed by the user may not have been a straight line between the beacons. The confidence level (described below) for the location of the first beacon can be inherited by the mobile node. The confidence level for the location of the mobile node may be diminished as the mobile node moves away from the first beacon and may be reset to the confidence level of the second beacon when the mobile node arrives in proximity to the second beacon.

Figure 13:
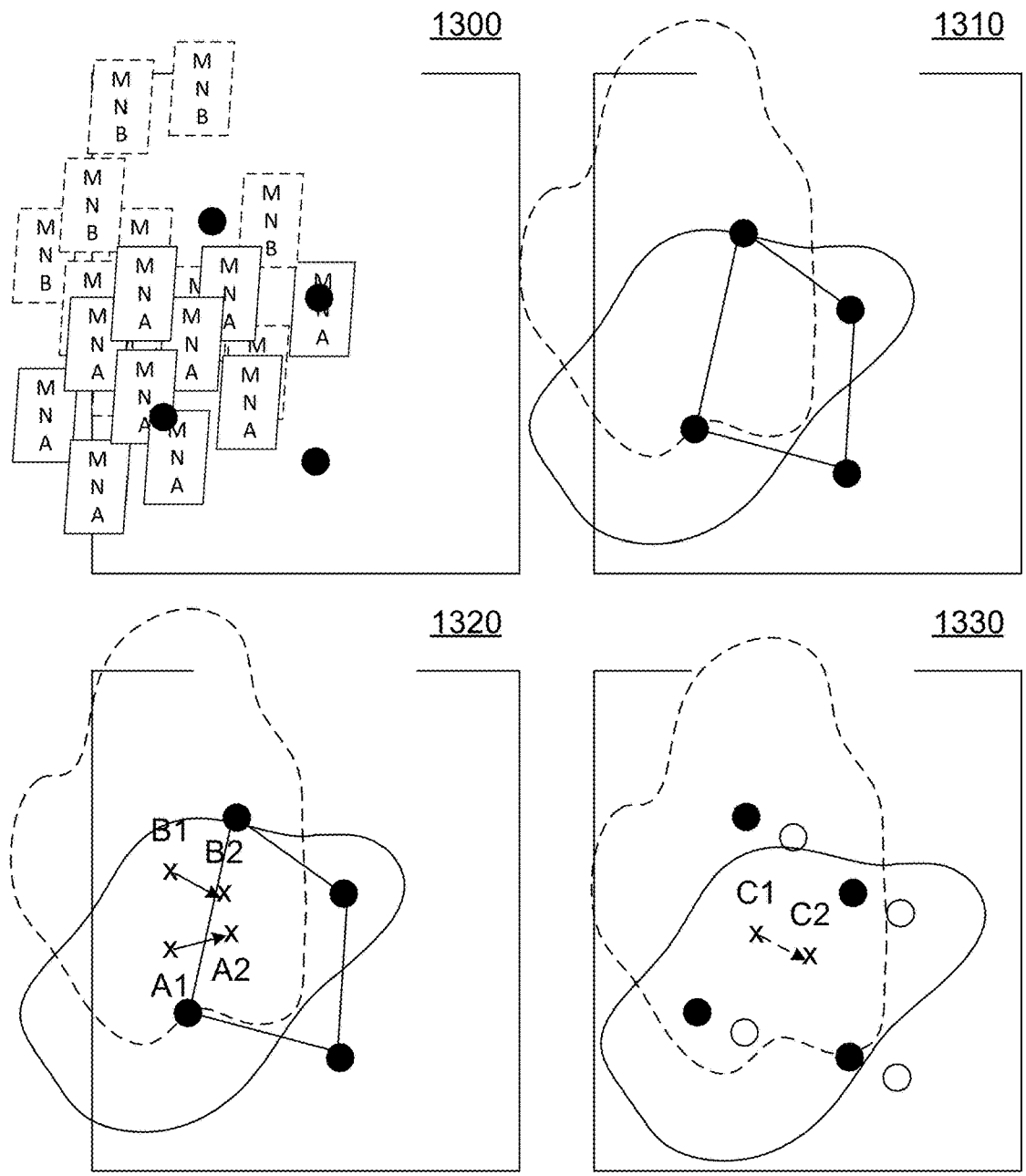
FIG. 13 illustrates fine repositioning of beacon devices using a center repositioning method in an exemplary indoor localization system.

FIG. 13 illustrates fine repositioning of beacon devices using a center repositioning method in an exemplary indoor localization system. In particular, FIG. 13 depicts the four views 1300, 1310, 1320, and 1330. The view 1300 includes an overview of a store, an initial position of beacon devices illustrated by four black circles, a plurality of determined locations of a mobile node associated with Employee A depicted by a box with solid lines, and a plurality of determined locations of a mobile node associated with Employee B depicted by a box with dotted lines. The view 1310 includes the overview of the store, a region representing the overall positions of Employee A depicted as a shape with a solid line, a region representing the overall positions of Employee B depicted as a shape with a dotted line, and the shape of the four beacons. The view 1320 includes the same elements of the view 1310, but also includes the vectors A1-A2 and B1-B2. The view 1330 includes the same components as the view 1320, but the regions associated with the determined locations of Employees A and B are shifted along their respective vectors, and the updated position of the beacons are shifted along the C1-C2 vector, and relocated to the positions depicted by the empty circles.

In some embodiments, fine positioning is performed using a centroid repositioning method. Such a method operates using information from mobile nodes associated with individuals who are expected mostly to remain within a store. For example, for each commercial store, there may be a few employees' mobile nodes that stay within a store for a large proportion of the day, each day. Therefore, by using a compilation of location information from those mobile nodes, the positions of beacon devices within the store can be refined. Using the localization server, location data of a long-dwelling mobile node (e.g., an employee's mobile node) can be accumulated. The mobile trajectory of the employees can also be employed using dead reckoning techniques as described above.

As an example of a centroid repositioning method, consider two employees in a store. After an initial calculation of a plurality of locations of the employees' mobile devices, the locations are mapped against the store floor plan, as depicted in the view 1300. Some of the calculated locations, however, are outside of the boundaries of the store and thus have a high probability of being incorrect. To refine the positions of the beacons, a centroid repositioning method is performed. The method moves the centroid of a region (e.g. a polygon) with vertices defined the location of beacon devices. The centroid of the beacon devices is repositioned by a vector (direction, distance) that tends to reposition the calculated locations of employees into the region of the store. To do this, first, a distribution is determined of locations of mobile nodes that are determined to be associated with employees, as depicted view 1300. Second, a region is determined that covers all the calculated locations of each employee near the store. A region is also determined that has beacon devices at its vertices. An example is depicted in view 1310. Third, a centroid is calculated for each employee's region, and a determination is made of a vector needed to move the employee's region to be fit inside the store. Then the total employee vector of region movement is obtained by adding each employee's vector. By using the total employee vector, the beacon centroid reposition vector is determined. An example is depicted in view 1320. Finally, the locations of beacon devices are repositioned, as a result, the region of employee motion fits more accurately within the store, as depicted in view 1330.

Figure 14:
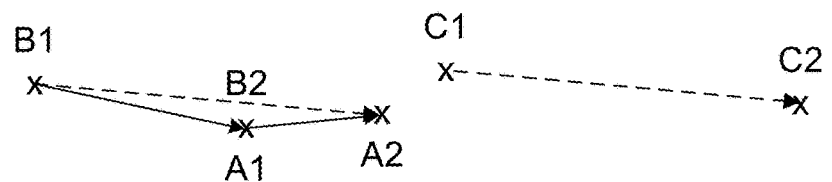
FIG. 14 illustrates an exemplary calculation of a beacon centroid repositioning vector.

FIG. 14 illustrates an exemplary calculation of a beacon centroid repositioning vector. In particular, FIG. 14 depicts the addition of vectors A1-A2 and B1-B2 on the left, and a resultant summation of the vectors, depicted as C1-C2 on the right. The vector C1-C2 represents the total distance and direction that the center of the vertices of the beacons are translated in view 1330 of FIG. 13.

In some embodiments, localization is performed with assistance from a localization server. If reference positions of beacon devices within the building calculated by each mobile node is uploaded to a localization server, then a newly-entering mobile node starts its localization procedure based on more accurate beacon positions retrieved from the localization server. When a localization server receives a large amount of position update information from many mobile nodes, a method is performed for updating the currently-saved beacon reference positions.

An exemplary method is described for updating beacon locations in a localization server. The exemplary method makes use of a confidence level associated with each mobile node's beacon position update information. For each beacon position update message uploaded to a localization server from a mobile node, the mobile node appends its calculated confidence level for this update. Based on the received pair of values (beacon position update and associated confidence level), the localization server decides whether and how to update the saved beacon positions based on the new data. If the confidence level is significant compared with the confidence level of the saved data, the server updates the saved beacon positions with a weighted average of both the saved and the new data. A new confidence level may also be determined as a weighted average of the saved and new confidence levels.

In an exemplary embodiment, a mobile node calculates a confidence level of its beacon position update dataset based on parameters such as the mobile node's certainty as to its own position, the RSSI of the beacon, and dwell time.

The mobile node's certainty as to its own position may depend in part on the recent availability of GPS information. For example, when a mobile node first enters a building, it may have high precision GPS information received just before entering the building. Then, any beacon position update information calculated from around those position has higher confidence level.

In some embodiments, the confidence level is based at least in part on the RSSI of beacon signals. When a mobile node receives beacon signals with a relatively low RSSI, there is a possibility that the low RSSI is attributable to intervening obstacles and/or multipath interference, each of which can result in reduced accuracy of RSSI-based distance calculations. Thus, a beacon position calculated based on low-RSSI signals is considered to have a lower confidence level. Conversely, a high RSSI is more likely to be indicative of a line-of-sight path, from which more accurate distance calculations can be made. Thus, position calculations based on high-RSSI signals are assigned a higher confidence level.

Confidence levels may also be set based at least in part on the amount of time spent by a mobile node in a building and/or in a particular store (dwell time). Confidence levels are higher for position calculations made by mobile nodes with a longer dwell time, as opposed to calculations made by mobile nodes with a shorter dwell time. By considering the position certainty, RSSI, and dwell time in calculation of confidence level, the localization server can apply greater weight to data sets with higher confidence levels in a beacon position database.

Some embodiments of the proposed systems can be implemented using infrastructure already in place, such as infrastructure for the iBeacon system. Mobile application developers can make an indoor localization service based on the proposed methods to target large indoor shopping malls, outlets and department stores like Nordstrom, Target, Walmart, BestBuy, Macy's, Sears, etc. Building owners and management can offer localization services for their customers with minimal additional costs. With the localization services provided to each mobile node, mobile nodes can locate their positions within a building and can be guided to a chosen store of interest.

Beacon-based navigation systems as described herein can also be implemented in a home environment.

In some embodiments, with the use of a localization server, the relocation, removal, and installation of beacon devices can be detected automatically. Those detections can be valuable information for the beacon service operators.

A feature provided in some embodiments is the ability to detect spoofing attacks from malicious beacon devices. In such embodiments, spoofed beacon messages broadcasting a false UUID are detected with an uncoordinated RSSI value from the false beacon device.

While the foregoing embodiments are described primarily in terms of possible use in a shopping mall, it should be understood that the disclosed systems and methods can also be implemented in other deployments. For example, the foregoing examples were provided with reference to stores (e.g. stores A-F of FIG. 10) that are provided with beacon devices and an out-of-store area (e.g. a shopping mall atrium) that is not provided with beacon devices. However, the indoor navigation system may also be implemented in other environments.

Similarly, when the system is implemented in a shopping mall, it is not required for the atrium to be free of beacon devices, or for every store to be supplied with beacon devices. Thus, the in-store mode described above may be more generally referred to as a fine-positioning mode, while the out-of-store mode described above may be more generally referred to as a coarse-positioning mode. The coarse-positioning mode may be employed when the mobile node determines that it is likely not located in a room (e.g. a store or atrium) that is not provisioned with beacon devices. The fine-positioning mode may be employed when the mobile node determines that is likely located in a room that is provisioned with one or more beacon devices.

Figure 15:
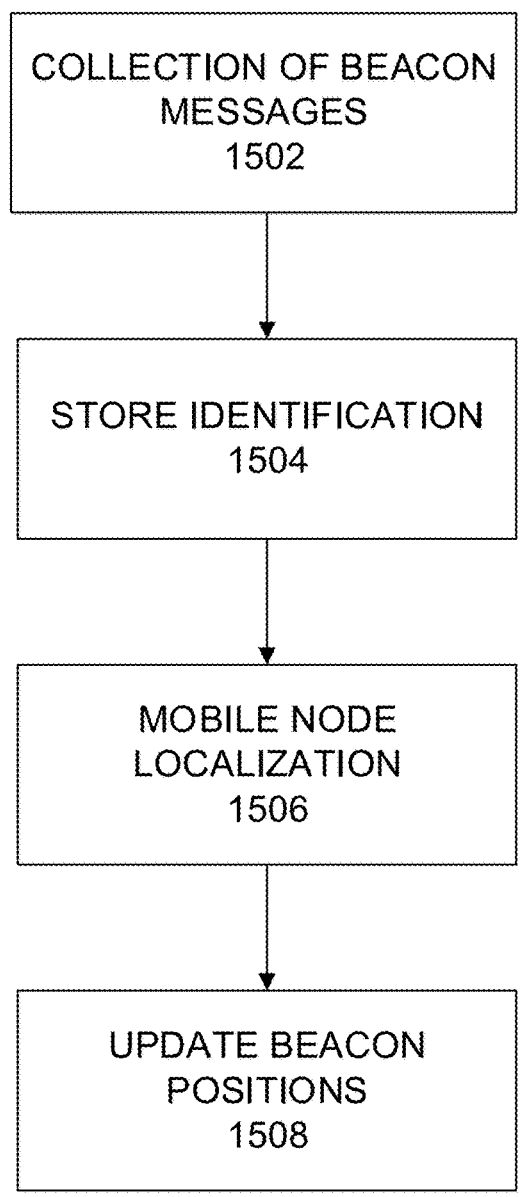
FIG. 15 is a flow diagram illustrating an exemplary indoor localization method.

FIG. 15 is a flow diagram illustrating an exemplary indoor localization method 1500. The method 1500 includes a collection of beacon messages at step 1502, store identification at step 1504, mobile node localization at step 1506, and updating beacon positions at step 1508.

At step 1502, beacon messages are collected by a mobile node entering a store. The beacon messages are collected from multiple beacon devices installed within the store. The mobile node uploads information retrieved from the beacon messages along with an RSSI (received signal strength indicator) value to a localization server. At step 1504, a store is identified. In one embodiment, the store is identified by referring to the UUID (universally unique identifier) contained in the beacon messages, and the localization server can identify the store and establish estimated beacon device positions within the store.

At step 1506, the server localizes the mobile node using, for example, a trilateration method. The server then determines whether the current mobile node belongs to one of the employees of the store by using various methods such as, for example, checking an employee database. If the mobile node does not belong to one of the store's employees, the server provides location information to the customer and/or to the registered store operator for customer interactions. Interactions may include welcoming, advertisement, and promotions.

The localization server performs a step of updating the beacon positions. If the mobile node belongs to one of one of the store's employees, the server updates the location history of the employee for calibration of beacon positions. If the location trajectory indicates a large deviation from the estimated trajectory (e.g. employees' locations are erroneously marked outside the store), the server is triggered to update reference beacon positions at step 1508. The server accumulates crowd-sourced inputs from multiple mobile nodes. The calculated reference positions of beacon devices in each store are updated by using one or more of the centroid reposition methods described herein. Such methods allow recorded beacon positions to approach to the ground-truth positions that, in turn enabling improved localization of in-store customers.

Systems and methods proposed herein provide new designs for in-store mobile localization using Bluetooth low energy (BLE) or other beacon devices without the requirement of manual site surveys.

In some embodiments, beacon positions with respect to a floor plan are refined by a total beacon centroid repositioning method that moves the centroid of all beacon devices using a repositioning vector to reduce localization errors. In some embodiments, beacon positions with respect to a floor plan are refined using a partial beacon centroid reposition method that moves the centroid of a set of certain beacon devices that have relatively high position errors. Embodiments disclosed herein may employ both total and partial centroid repositioning methods.

Embodiments disclosed herein can be implemented using currently available beacon devices, including BLE beacon devices such as iBeacon devices. By using crowd-sourced information from long-dwelling clerks in stores, embodiments disclosed herein can fine tune the locations of beacon devices which, in turns offers accurate localization services for visiting customers.

An entity relationship diagram illustrating an exemplary system with an external localization server that maintains database of beacon positions within each store by using crowd-sourced inputs from mobile nodes is depicted and discussed in conjunction with FIG. 2.

Figure 16A:
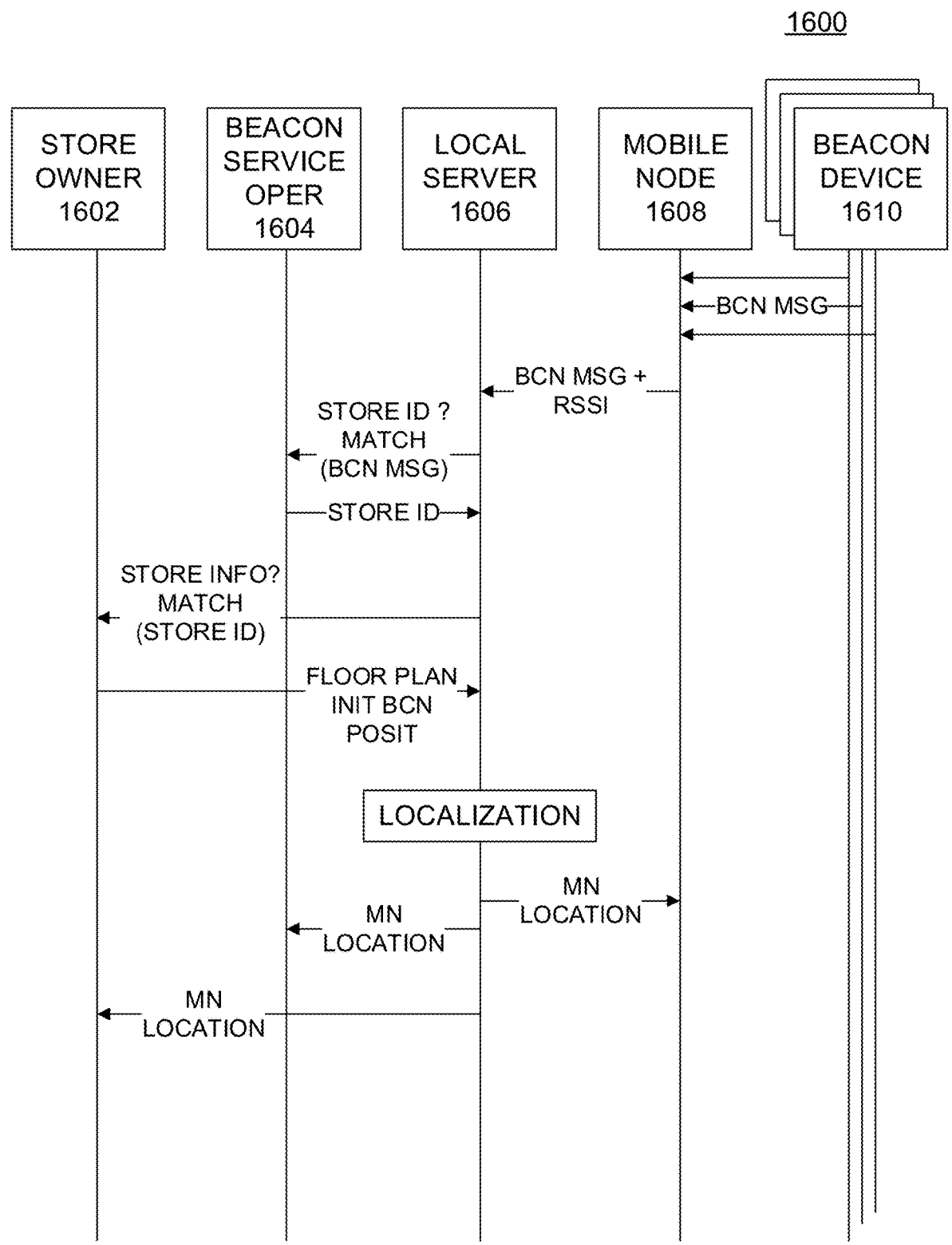
FIG. 16A is a procedure sequence diagram of an exemplary indoor localization method.
Figure 16B:
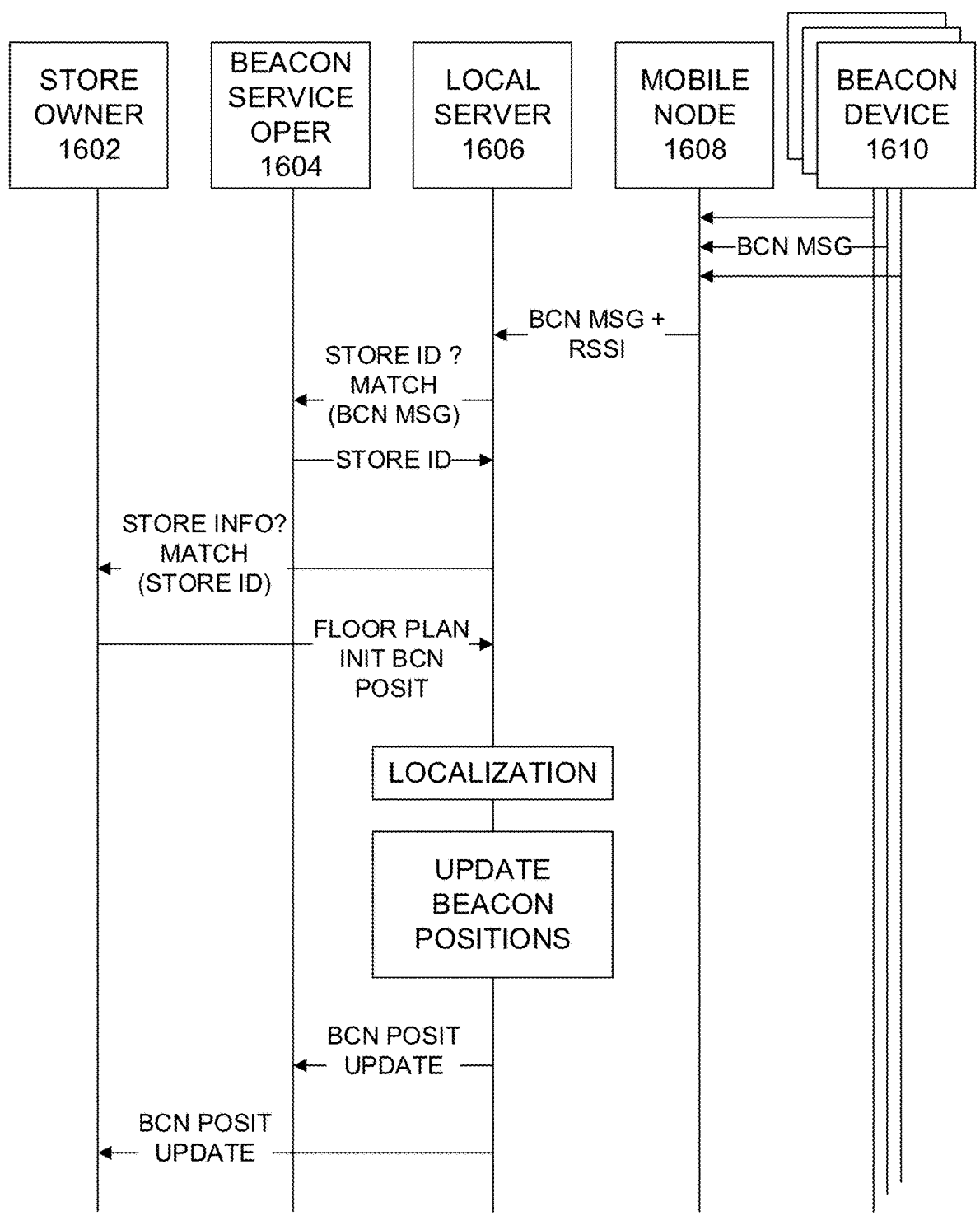
FIG. 16B is a procedure sequence diagram of an exemplary indoor localization method.

FIGS. 16A and 16B depict procedure sequence diagrams of an exemplary indoor localization methods. In particular, FIGS. 16A and 16B depict the procedures 1600 and 1620, respectively. The procedure depicts a process of transmitting messages between a store owner 1602, a beacon service operator 1604, a local server 1606, a mobile node 1608, and beacon devices 1610.

The flow diagrams of FIGS. 16A and 16B illustrate exemplary operations of a localization system, including interaction between different entities. The localization server calculates mobile node locations using the received beacon messages and associated RSSI values. The localization server also updates beacon positions by using the long term location trajectory of the store's employees. When the server first initiates a localization process for a store, it can receive the floor plan and the initial beacon positions from the store operator.

Beacon service operators (e.g. Shopkick, Facebook, etc.) provide contextual information regarding beacon devices to the localization server by using queries of UUIDs. By using the provided contextual information, the localization server can locate the store where beacon devices belong. The server can provide updated information regarding beacon device positions within the store, which can be used to detect change/misplacement of the beacon devices by the store. Furthermore, beacon position information can be used to identify cloned beacon devices that may be maliciously located in inappropriate locations in the building.

The store owner/operator can provide detailed information regarding the property such as floor plan, wall/floor material, estimated initial beacon positions within the store, etc. to support a more precise localization service. In turn, store operators can be provided real-time updates from customers, providing an opportunity for advertisement, navigation, customized survey and customer behavioral analysis. The procedure 1600 of FIG. 16A may be accomplished in response to determining that the mobile node 1608 is not associated with an employee, whereby the localization server 1606 transmits the location of the mobile node 1608 to the store owner 1602, the beacon service operator 1604, and the mobile node 1608. The procedure 1620 of FIG. 16B may be accomplished in response to determining that the mobile node 1608 is associated with an employee, whereby the localization server 1606 updates beacon positions and transmits the updated beacon positions to the store owner 1602 and the beacon service operator 1604.

Figure 17:
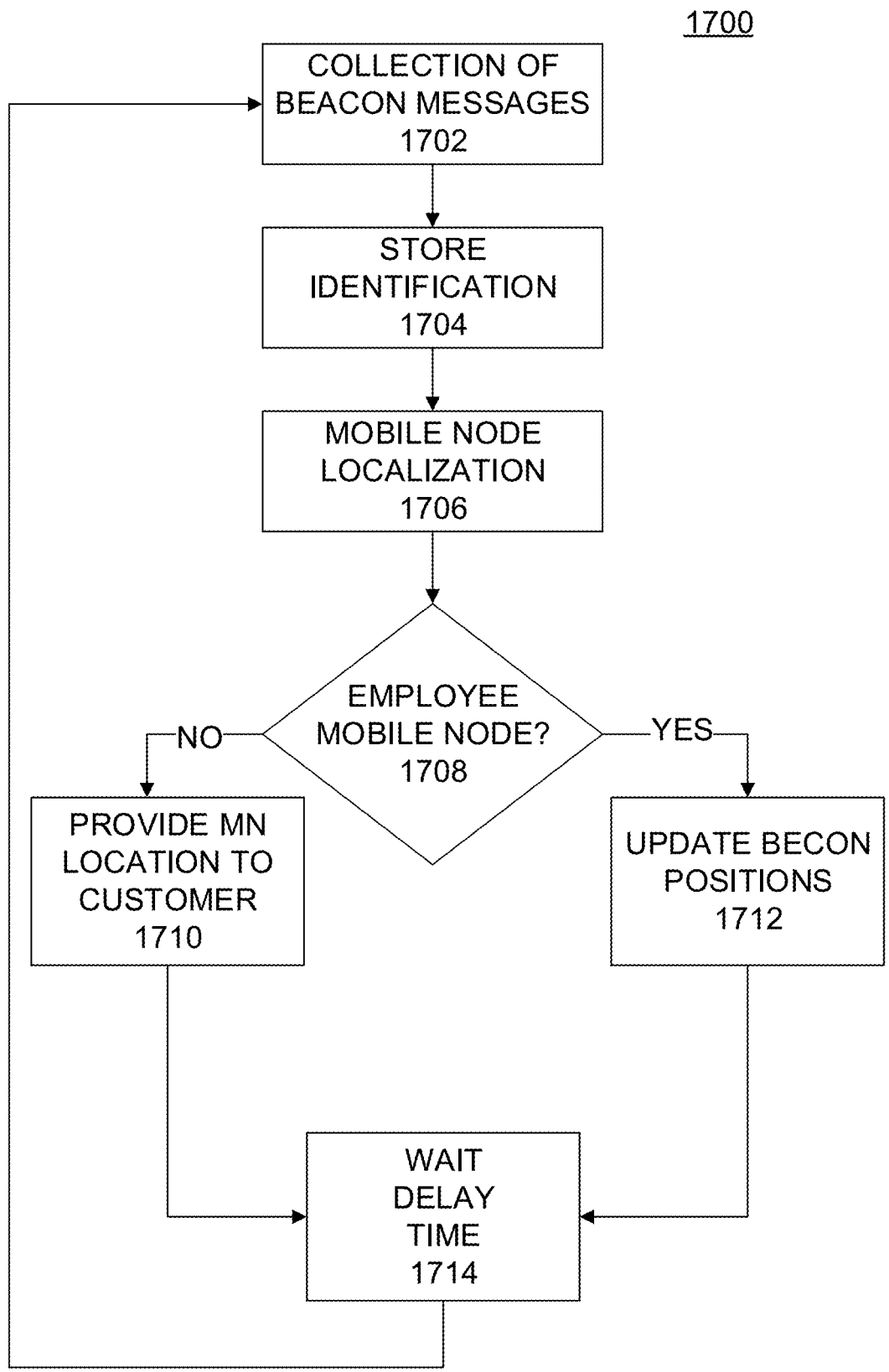
FIG. 17 is a flow diagram illustrating an exemplary method performed by a localization server.

FIG. 17 depicts a flow diagram illustrating an exemplary method 1700 performed by a localization server. The method 1700 includes collecting beacon messages at step 1702, identifying stores at step 1704, localizing the mobile node at step 1706, determining if the mobile node is associated with an employee at step 108, providing the mobile node location to the customer at step 1710 in response to determining that the mobile node is not associated with an employee, updating the beacon positions at step 1712 in response to determining that the mobile node is associated with an employee, and waiting a delay time at 1714. Described herein are techniques for a user to determine his indoor location using a mobile node, even in buildings where no manual site survey has previously been performed. An example of such a procedure is illustrated in the flowchart of FIG. 4.

Periodically, the mobile node collects multiple beacon messages broadcast from nearby beacon devices (step 1702). A beacon device is a low-powered, low-cost transmitter that can notify nearby mobile nodes of its presence. It enables a smart phone or other mobile device to perform actions when in close proximity to it. The mobile node or the localization server builds an internal table of beacon information as depicted in table 1806 of FIG. 18.

Figure 18A:
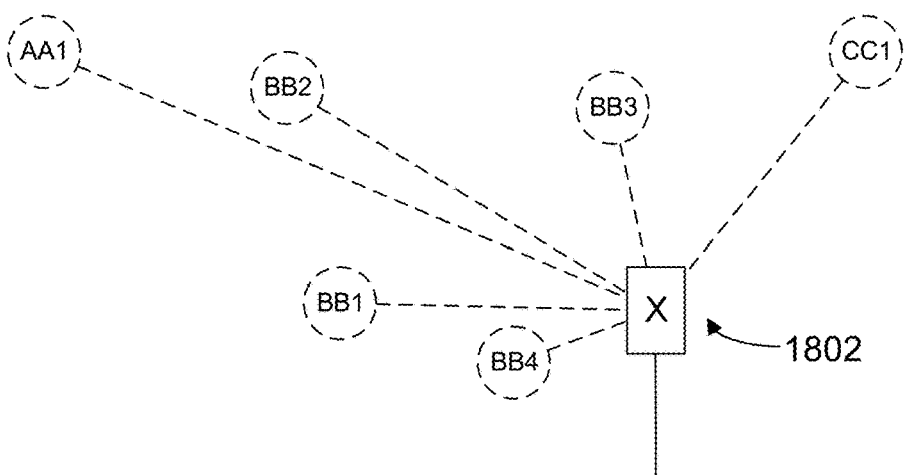
FIG. 18A illustrates collection of beacon messages by a mobile node.

FIG. 18 illustrates collection of beacon messages by a mobile node. In particular, FIG. 18 depicts the overview 1800. The overview 1800 includes a position associated with a mobile node 1802, a data table 1806, and initial positions of beacons depicted by circles with dashed lines, the circles containing the Major and Minor identifications from the beacon messages.

Beacon devices transmit packets of data in intervals from 20 ms to 10 seconds. An example beacon message format is depicted in FIGS. 6A and 6B, although other message formats may also be used. The shorter the interval, the shorter the battery life, but the faster the device can be discovered. In an exemplary embodiment, the packets are up to 47 bytes in length and consist of: 1 byte preamble, 4 byte access address, 2-39 bytes advertising PDU, and 3 bytes CRC as follows.

In the example message format, a UUID (universally unique identifier) (16 bytes) is picked up by a compatible app or operating system in the mobile node. As an example, all beacons from a particular retailer (e.g., NIKE) may have the same UUID.

A major number (2 bytes) is used to group a related set of beacons. For example, all beacons in a particular store may have the same major number. That way the application will know in which specific store the customer is located (e.g. all beacons in a specific NIKE store in the San Francisco Premium Outlet may have the same major number).

A minor number (2 bytes) is used to identify individual beacons. Each beacon in a store will have a different minor number (e.g. different beacons in the NIKE store in San Francisco Premium Outlet have different minor number values). The different minor number values may be associated in a database with different store locations, such as locations (e.g. locations in the clothing department, men's shoes department, women's shoes department, etc.).

Transmit power (TX power) (1 byte) is used in calculations to determine how close the mobile node is to a beacon. The distance to a beacon can be read either as rough information (e.g. immediate/far/out of range) or as a more precise measurement in meters. In some embodiments, the TX power is the strength of the signal measured at 1 meter from the device (RSSI—Received Signal Strength Indication). As the strength of the signal decreases predictably with greater distance, knowing the RSSI at 1 meter, and the current RSSI (Bluetooth chipset can calculate RSSI of the received signal), it is possible to calculate the distance. Obstacles such as furniture, people or communication congestion can weaken the signal. Hence the distance is only an estimate. For the sake of illustration in this disclosure, all beacon devices are sometimes treated as having the same transmit power. It is to be understood that, in practical implementations, different beacons may have transmit powers, so that the transmit power byte is used in distance calculations to normalize the received signal strength.

As depicted in FIG. 18, a mobile node collects a set of beacon messages and records their UUID+major number (identifying a particular store), minor number (indicating a device ID), and measured RSSI (received signal strength indicator) values (indicating a distance to the beacon considering the beacon's transmit power) in the table 1806. After receiving several beacon messages, the mobile node uploads the messages to the localization server.

After collection of multiple beacon messages, the localization server classifies those messages based on their "UUID+major" and "minor" fields and maps those beacon devices to different stores. In order to locate beacon devices within their appropriate store, the mobile node obtains the store's floor plan & initial beacon positions by 1) querying the set of received UUID+major to the appropriate beacon service provider to find out the store identification, then 2) querying the floor plan & initial beacon positions of the store to the appropriate store operator. These queries are depicted in FIG. 16 with a "?" in the communication line. Then, by using the floor plan and the roughly estimated beacon positions, the server virtually locates initial beacon device positions within their stores as depicted in FIG. 18B.

Figure 18B:
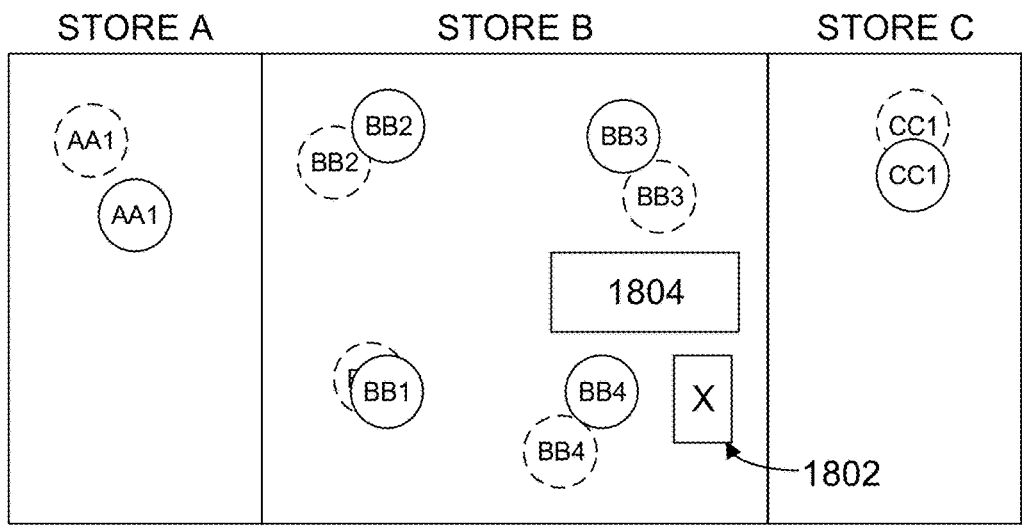
FIG. 18B illustrates mapping of beacons to stores.

FIG. 18B depicts the view 1810, which is similar to the view 1800, but includes the map of Stores A-C, and a mapping of beacon locations depicted by solid line circles, and object 1804. It is noted that the localization server does not need to perform the above queries if it has the store information in its location database in advance. Therefore, the operations in this step are performed only when the server does not have beacon position data of the store.

From the estimated positions of beacon devices and measured RSSI values of received messages from those beacons, the mobile node can localize itself using various methods such as Trilateration, Non-Linear Least Squares, or other techniques.

Trilateration is one method for determining the location of points by measuring distances. This technique is used in GPS receivers. To locate a mobile node indoors according to embodiments disclosed herein, radio signal strengths are used from beacon devices at known or estimated positions. The strength of radio frequency (RF) signals is measured between the beacon devices and the mobile node. Once the signal strength measurements are gathered, the information can be converted into a distance using an indoor pathloss formula as described below. When the distances have been calculated, they are used in trilateration equations to localize the mobile node on the horizontal x-y plane. In some embodiments, trilateration is also used to find the altitude of the mobile node along the z axis.

Figure 19:
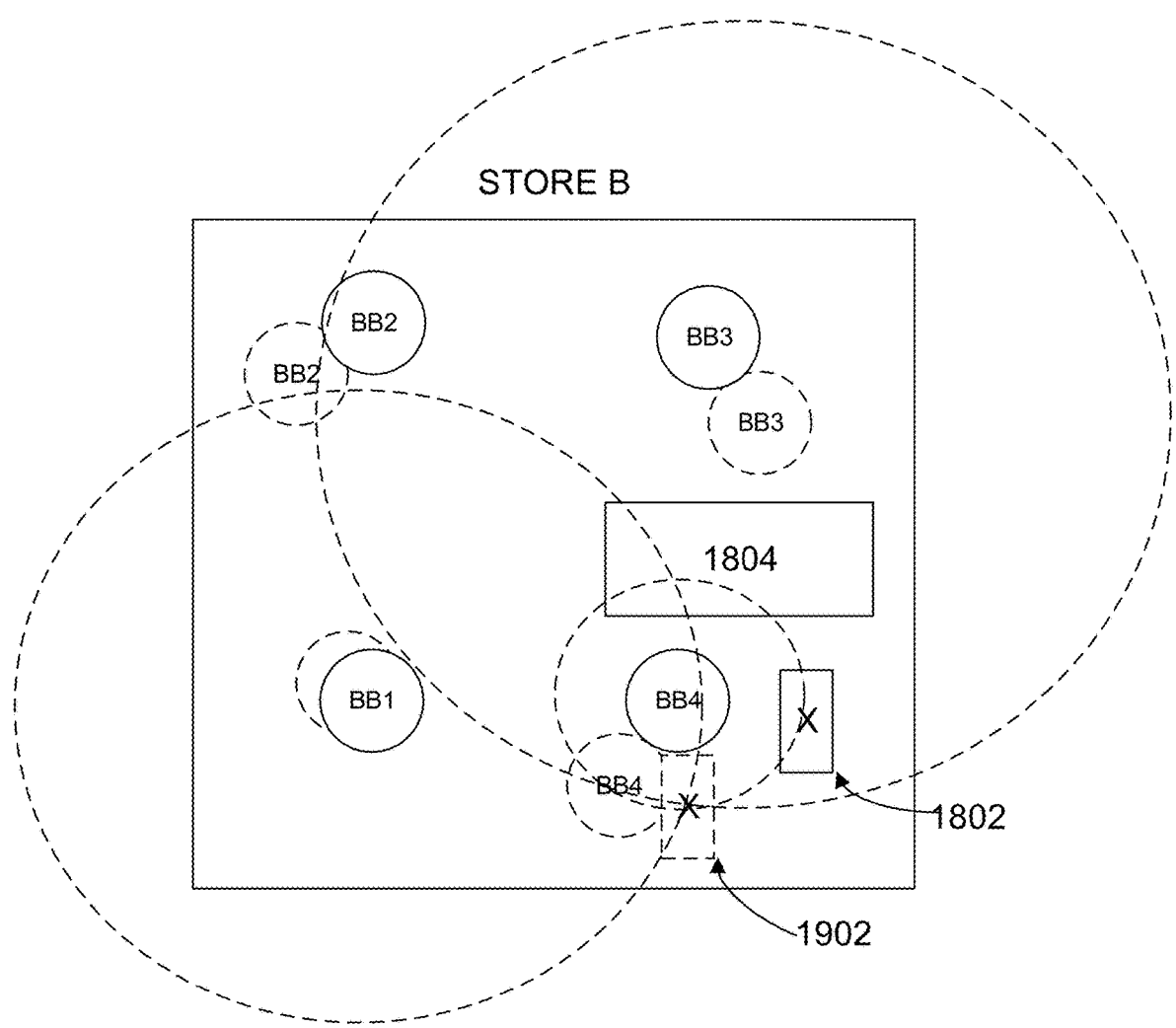
FIG. 19 illustrates localization of a mobile node.
Figure 20:
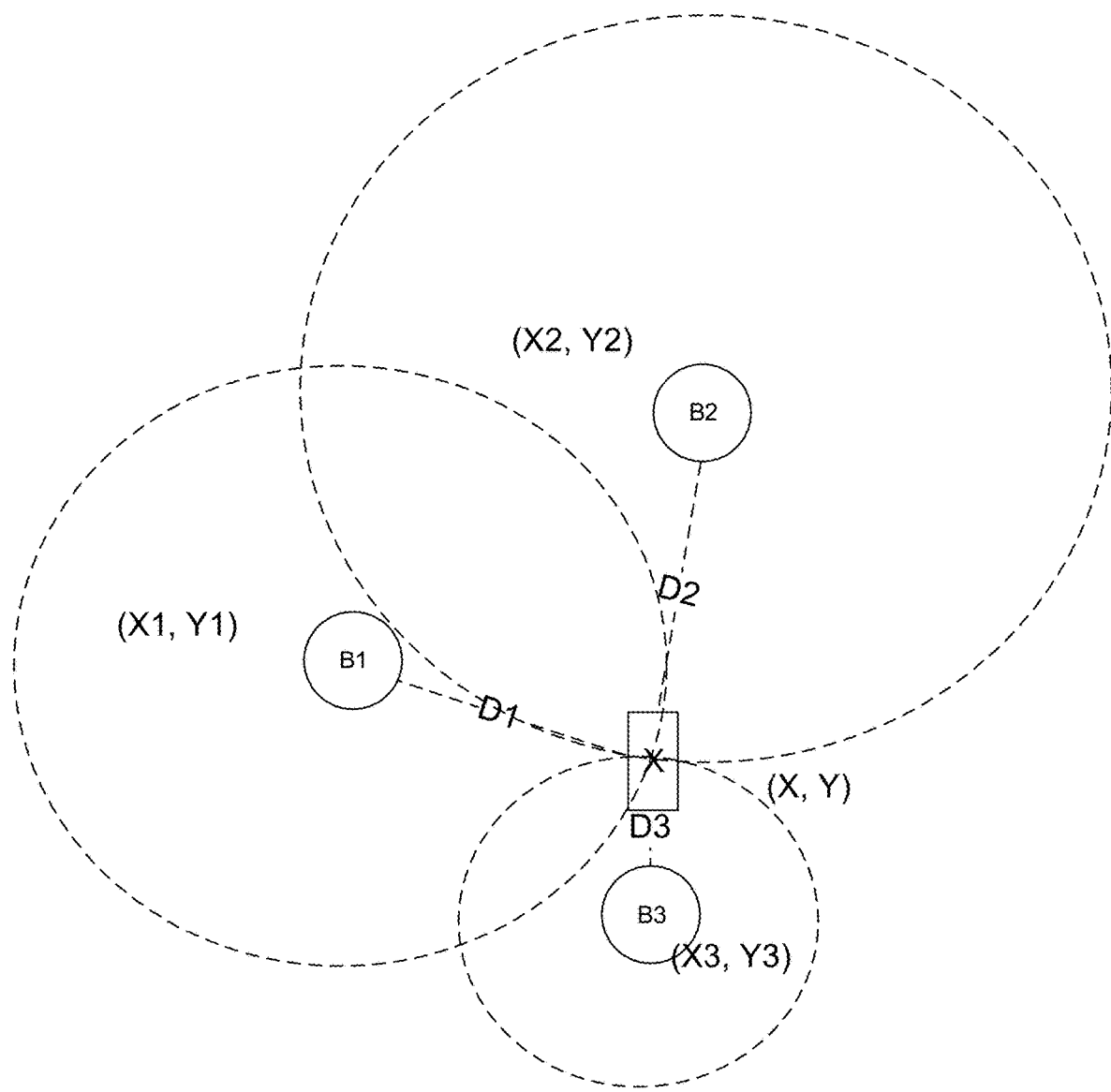
FIG. 20 illustrates localization of a mobile node using trilateration.

FIG. 19 illustrates localization of a mobile node. In particular, FIG. 19 depicts the view 1900. The view 1900 includes the elements from the view 1810 of FIG. 18B, and beacon signals used in trilateration, depicted as large dashed circles. In an exemplary indoor location system, 2D trilateration is used to find a mobile node located in a store. The location may be determined with respect to an x-y plane. The locations of three beacons are used, along with the distances between the beacon devices and the mobile node for trilateration. The concept of trilateration is illustrated in FIGS. 19-20, where the box in the center represents the mobile node being localized. The beacon devices are labeled B1, B2, and B3, and the distances between the beacon and the MN are labeled d1, d2 and d3 respectively. When three circles are drawn having center positions on each beacon and a radius determined by the measured distances, the intersection between all three circles is the location of the mobile node, depicted by the location 1902.

In order to calculate the mobile node location in a closed form, the equations given below can be used. In the following equations $x_i$ and $y_i$ represent the position of beacons $B_i$, where i=1, 2, 3.

$$(x-x_1)^2+(y-y_1)^2=d_1^2 \qquad (\text{Eq.1})$$

$$(x-x_2)^2+(y-y_2)^2=d_2^2 \qquad (\text{Eq.2})$$

$$(x-x_3)^2+(y-y_3)^2=d_3^2 \qquad (\text{Eq.3})$$

To simplify these quadratic equations, (Eq.3) is substituted from (Eq.1) and (Eq.2), which will leave two linear equations.

$$2(x_2-x_1)x+2(y_2-y_1)y=(d_1^2-d_2^2)-(x_1^2-x_2^2)-(y_1^2-y_2^2) \qquad (\text{Eq.4})$$

$$2(x_3-x_1)x+2(y_3-y_1)y=(d_1^2-d_3^2)-(x_1^2-x_3^2)-(y_1^2-y_3^2) \qquad (\text{Eq.5})$$

The location of the mobile node (x, y) can be found by solving (Eq.4) and (Eq.5) using Cramer's rule:

$$x = \frac{\begin{vmatrix} (d_1^2 - d_2^2) - (x_1^2 - x_2^2) - (y_1^2 - y_2^2) & 2(y_2 - y_1)y \\ (d_1^2 - d_3^2) - (x_1^2 - x_3^2) - (y_1^2 - y_3^2) & 2(y_3 - y_1)y \end{vmatrix}}{\begin{vmatrix} 2(x_2 - x_1) & 2(y_2 - y_1) \\ 2(x_3 - x_1) & 2(y_3 - y_1) \end{vmatrix}}$$ (Eq.6)

$$y = \frac{\begin{vmatrix} 2(x_2 - x_1) & (d_1^2 - d_2^2) - (x_1^2 - x_2^2) - (y_1^2 - y_2^2) \\ 2(x_2 - x_1) & (d_1^2 - d_3^2) - (x_1^2 - x_3^2) - (y_1^2 - y_3^2) \end{vmatrix}}{\begin{vmatrix} 2(x_2 - x_1) & 2(y_2 - y_1) \\ 2(x_3 - x_1) & 2(y_3 - y_1) \end{vmatrix}}$$ (Eq. 7)

Other localization techniques may also be used. For example, mobile node may use distance measurements from the two strongest beacon signals to generate two candidate location points (which can be visualized as the intersection of two circles, each centered on a beacon). The RSSI of a beacon signal from a third beacon can then be used to determine which of the two candidate location points should be selected.

One potential disadvantage of the use of signal strength is that the calculated distance may not reflect the exact distance between a beacon and a mobile node. The signal strength from a beacon may be subject to unexpected attenuation by interference from other signal frequencies, temperature, humidity, and various objects (such as objects 1804 depicted in FIG. 19) within a store. The equation converting signal strength to distance can be tuned for some of the parameters listed, but generally it is hard to correctly model individual links between beacons and mobile nodes. Therefore, with every distance calculation that is calculated there will some amount of error.

Figure 21A:
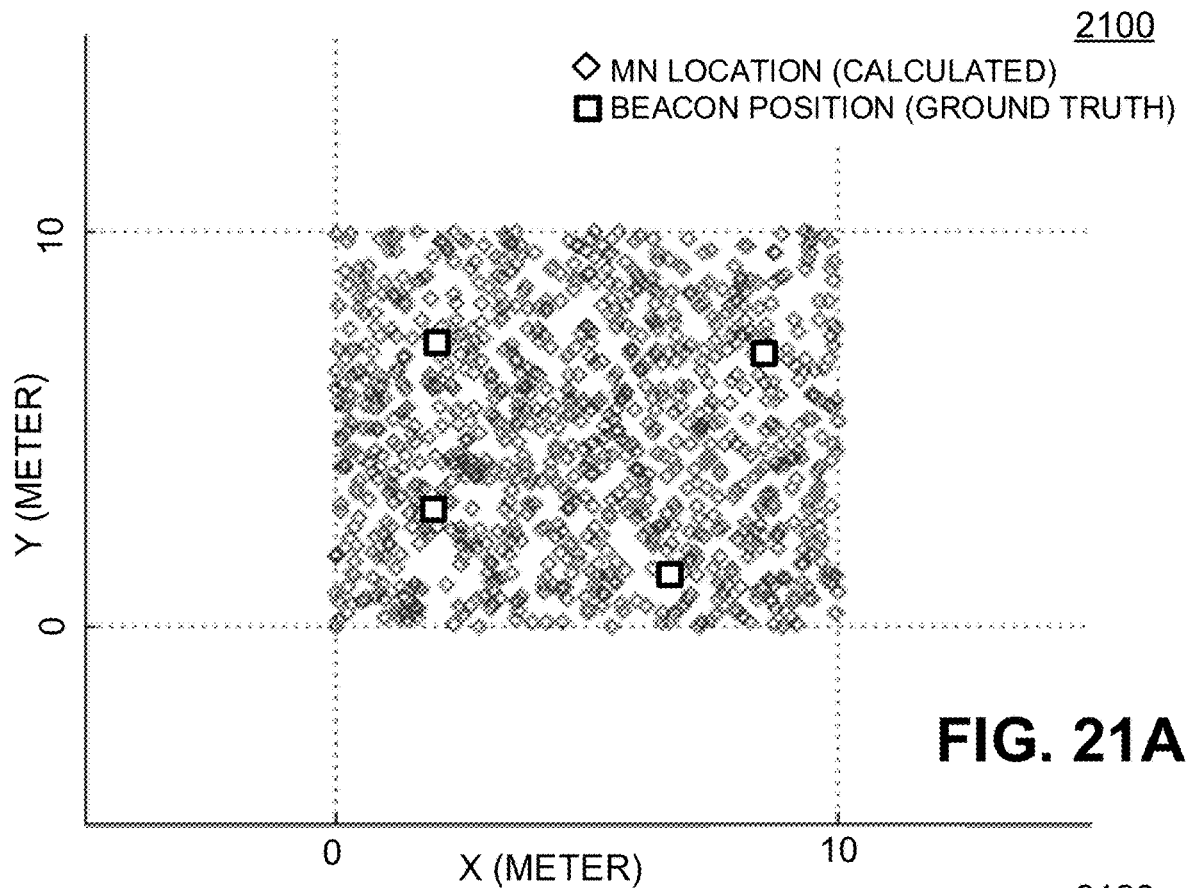
FIG. 21A is a graph illustrating calculation of mobile node position in the absence of distance error.
Figure 21B:
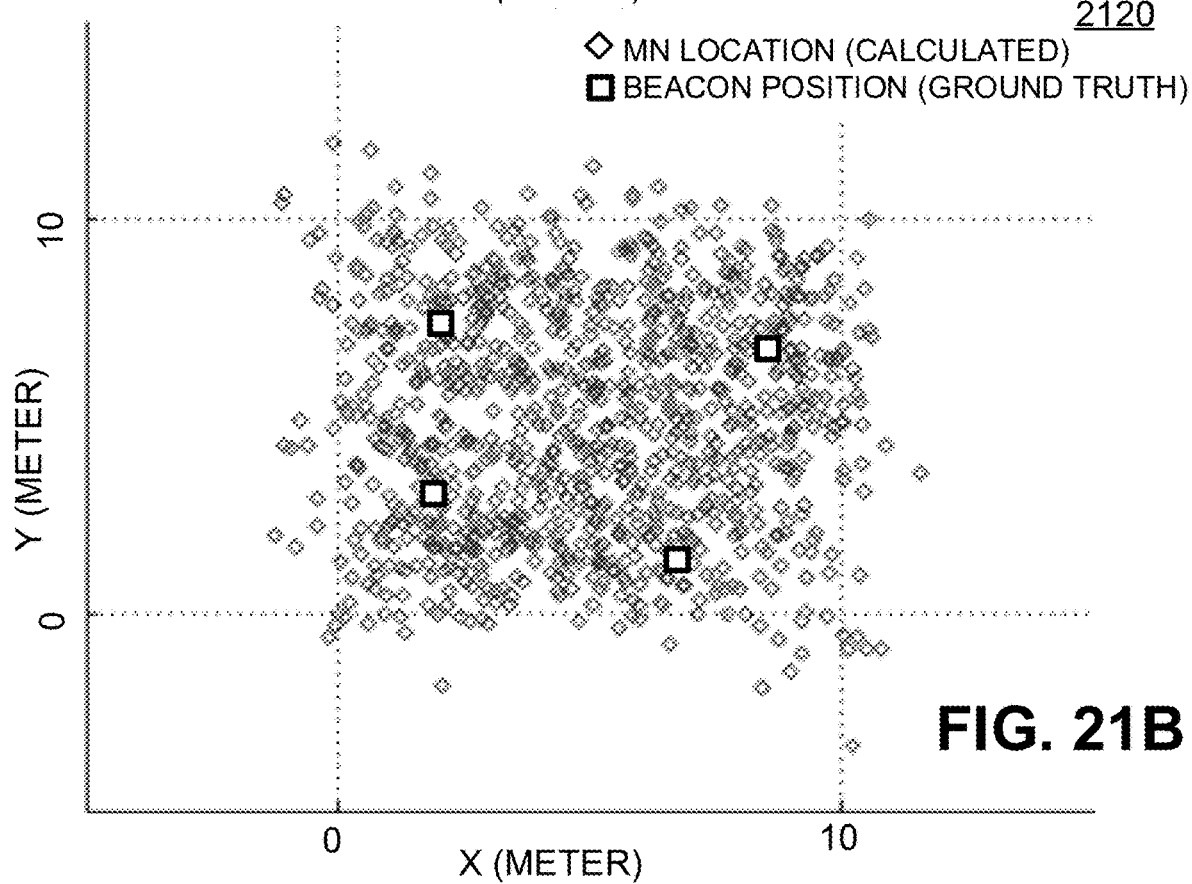
FIG. 21B is a graph illustrating calculation of mobile node position in the presence of log-normal (σ2=1) shadowing distance error.
Figure 26A:
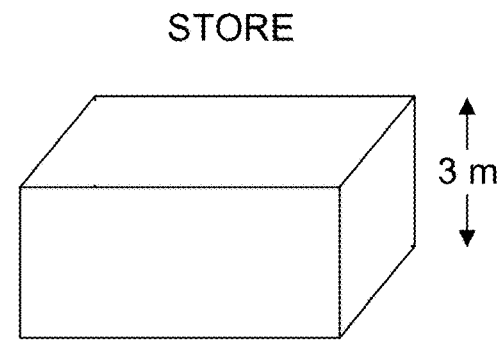
FIG. 26A illustrates an exemplary store layout used in simulations described herein.
Figure 26A:
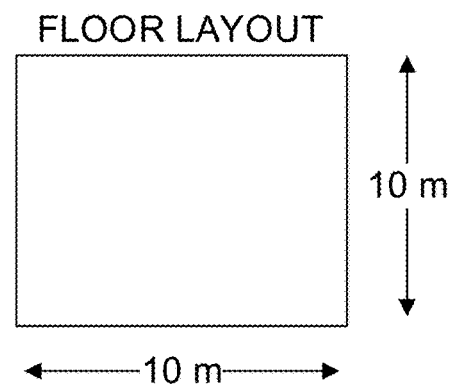

FIGS. 21A-B shows the results of a simulation illustrating the effect of distance error in localization. In the simulation, four beacon devices were positioned within a store size of 10 m×10 m. Parameters used for the simulation are set forth in Table 1. The simulated store layout is illustrated in FIG. 26A.

TABLE 1

| Parameter | Value |
|---|---|
| Environment description | Single-floor store |
| | Store size: 10 m × 10 m × 3 m (See FIG. 26A) |
| Beacon location | In each 1/n$^{th}$ equally divided space, place beacon in random xy-locations (uniform distribution) at z = 1.5 m above the floor level of the store. (In this report, we limit the number of beacons to 4.) |
| Mobile Node | In each time interval T, place the mobile node in random xy-locations (uniform distribution) at z = 1.5 m above the floor level of the store. |
| Channel Model And Penetration Losses | Beacon Device Tx power 4 dBm (for Bluetooth Class 2 Radio) Pathloss model PL(d) = 40.05 + 20*log 10(fc/2.4) + 20*log10(min(d,5)) + (d > 5) * 35*log10(d/5) + 18.3*F^((F + 2)/ (F + 1) − 0.46) + 5*W [dB] d = max(3D distance [m], 1) fc = frequency [GHz] F = number of floors traversed W = number of walls traversed in x-direction plus number of walls traversed in y-direction Shadowing Log-normal with 5 dB standard deviation, independent and identically distributed (i.i.d.) across all links. |

After randomly locating a mobile node within a store, simulated RSSI values were measured relative to the four beacon devices, and the location of the mobile node was determined using the three highest RSSI values and the known beacon positions. The graph 2100 of FIG. 21A shows cumulative results of mobile node localizations of 1,000 iterations.

Under ideal conditions, in the absence of RSSI variations that affect distance measurements, MN can be correctly located to its ground-truth locations as depicted in FIG. 21A. However, when there is RSSI variations due to environmental effects in a store, a mobile node can be erroneously determined to be at some distance from its ground-truth location, as depicted in the graph 2120 of FIG. 21B.

Other localization errors can arise when the positions of beacon devices have not been accurately estimated. There can be differences between claimed beacon positions by store owners and ground-truth beacon positions due to pointing errors, beacon replacement, object rearrangement within a store, etc. Therefore, with every mobile node location calculation based on the claimed beacon positions, there can some error attributable to mistaken beacon positions. Embodiments disclosed herein provide methods for addressing error attributable to mistaken beacon positions.

Figure 22A:
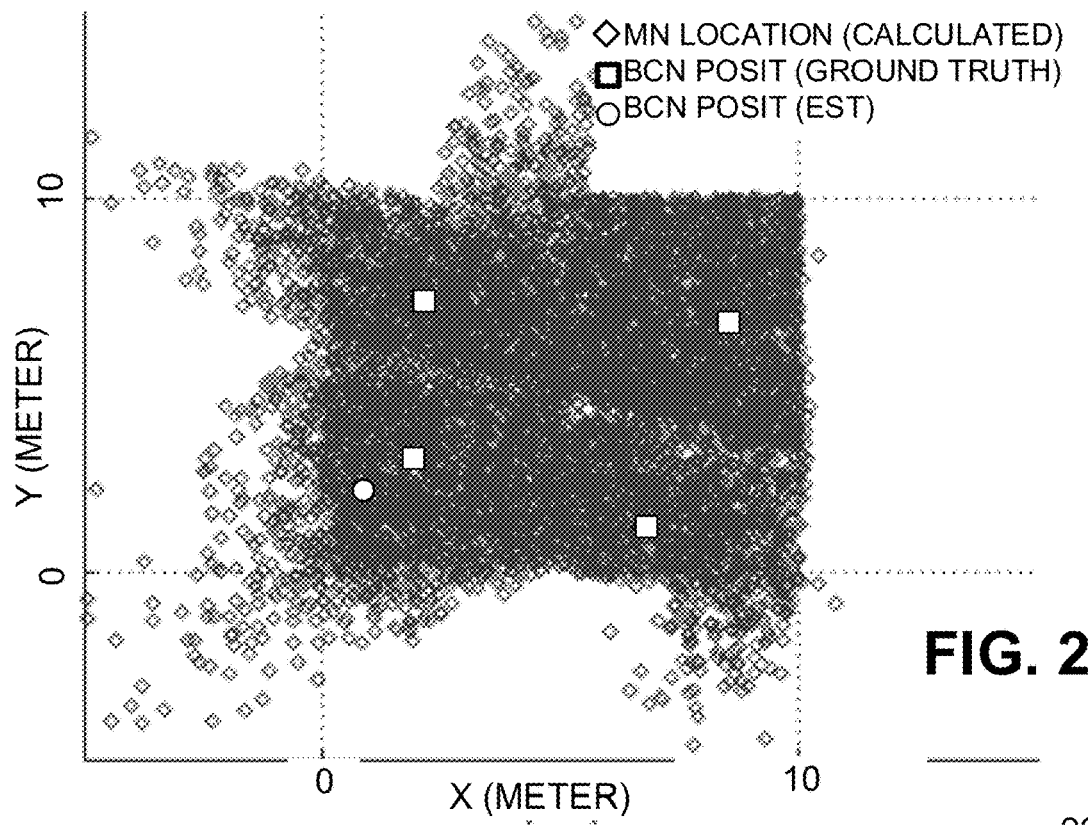
FIG. 22A is a graph illustrating mobile node localization results of a 10 m×10 m store with a beacon position error on the lower-left beacon.
Figure 22B:
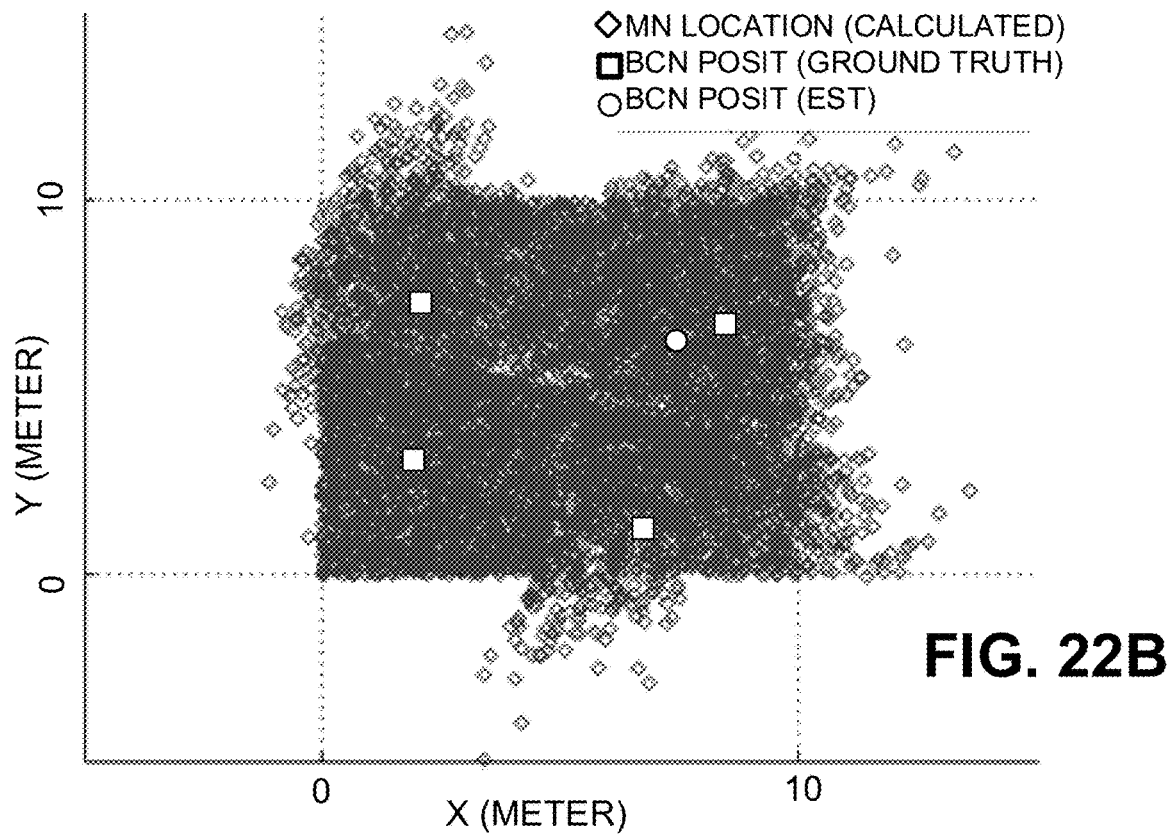
FIG. 22B is a graph illustrating mobile node localization results of a 10 m×10 m store with a beacon position error on the upper-right beacon.

FIGS. 22A-B illustrate results of an additional simulation using a model of the store of 10 m×10 m supplied with four beacons. In the graph 2200 of FIG. 22A, a simulation was run using beacon position error on the lower left beacon. In the graph 2220 of FIG. B, a simulation was run using beacon position error on the upper right beacon. Inspecting the mobile node localization results of 10,000 iterations, it can be observed that the beacon device with location errors contributes to localization errors near to it, while mobile nodes on the opposite side of the store are not affected by the misplaced beacon. This is due to the fact that trilateration mainly selects the three highest RSSI beacon devices for its localization. Mobile node locations near the misplaced beacon position are calculated using the erroneous beacon position, which contributes to locating the mobile node outside the store. The present disclosure provides techniques for improving estimated beacon locations.

In some embodiments, calculated locations of mobile nodes are saved and used to improve estimated beacon locations if the claimed mobile node is classified as a mobile node of one of the employees. This classification can be done by using one or more combinations of the following methods.

In an explicit identification method, a localization server is provided with information identifying mobile nodes of employees. This information can be obtained from store management or from a beacon service provider.

In duration/frequency method, a determination is made that a mobile node is associated with an employee based on extended presence of that mobile node in the store. If a certain mobile node regularly calculates its location in a particular store, regularly over a large proportion of a day, the localization server identifies the mobile as being owned by one of the store's employee and records its trajectory for calibration purposes.

Many stores have particular areas that only employees are allowed to enter. In a zone calculation method, a mobile node's position is calculated, and a determination is made of whether the mobile node is located in an employee-only area. Location of a mobile node in an employee-only area, particularly for extended periods of time and/or on repeated occasions, contributes to and/or results in classification of the mobile node as being associated with an employee.

Analogously, many stores are open to the public only at certain times. Thus, in a time calculation method, a determination that a mobile device is present in the store at times outside ordinary business hours, particularly for extended periods of time and/or on repeated occasions, contributes to and/or results in classification of the mobile node as being associated with an employee. A time calculation method may be implemented without any explicit input as to the hours during which the store is open to the public. For example, mobile nodes that are determined on a repeated basis to be among the first arrive at the store (or among the last to leave) may be determined to be associated with employees.

Returning to FIG. 16A, the localization server computes the location of a mobile node of a customer and delivers that location information is delivered to the customer, the store owner, and/or the beacon service operator.

As demonstrated in the simulation results described above, there can be localization errors from two major factors 1) distance error from interfering objects and 2) beacon position error from erroneous reference positions. These two types of errors are likely to occur simultaneously, thereby expanding localization errors. According to embodiments described herein, at least two methods can be used for updating beacon positions to minimize localization errors, a total centroid repositioning method and a partial centroid repositioning method.

A first method for updating beacon positions is a total centroid positioning method, as discussed here and above in conjunction with FIGS. 13 and 14. For each commercial store, there might be a few mobile nodes associated with employees who stay within a store for a large portion of the day, for many days of the week. A large number of location calculations of those mobile nodes can be used to finely tune positions of beacon devices within a store. At a location database maintained by the localization server, location data of each employee's mobile node is collected. For example, consider a store with two employees having mobile nodes with locations that are calculated as depicted in view 1300 of FIG. 13. A number of these calculated locations are determined to be outside the perimeter walls of the store. It is considered to be unlikely that these calculated locations outside the store are accurate. In a total centroid repositioning method, a total centroid repositioning vector is calculated, and centroid of all beacon devices in the store is moved by the total centroid repositioning vector. This method moves a centroid of a region that is made by all beacon devices at vertices. By moving centroid of all beacon devices by a certain vector (direction, distance) the calculated location of employees outside the perimeter of the store is minimized.

In some embodiments, a beacon position update procedure is be performed at the localization server in a periodic manner. After collection of multiple beacon messages along with corresponding RSSI values from multiple mobile nodes associated with an employee of a store, the localization server calculates location trajectories of each employee mobile node based on the current beacon positions. After inspecting the pattern of erroneous locations of employees outside the store, the server initiates a centroid repositioning method, such as the total centroid repositioning method or the partial centroid repositioning method described herein.

Figure 27:
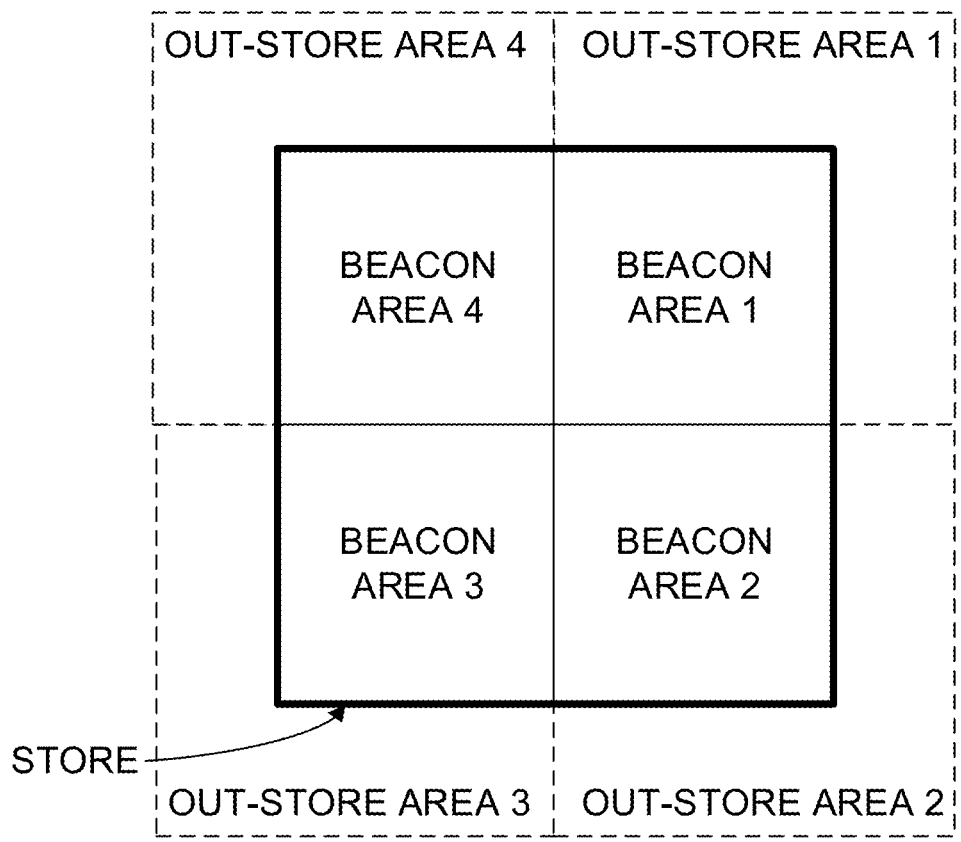
FIG. 27 illustrates use of predetermined out-of-store areas for selection between total centroid relocation and partial centroid relocation.

FIG. 27 illustrates use of predetermined out-of-store areas for selection between total centroid relocation and partial centroid location. In some embodiments, a determination of whether to perform a partial or a total centroid repositioning method is made with the use of separate out-of-store areas, as illustrated in FIG. 27. If out-of-store estimated employee locations are spread across all out-of-store areas, the total centroid repositioning method is applied. If out-store estimated employee locations are concentrated within a certain out-of-store area, the partial centroid repositioning is applied. In this case, only beacons residing in the corresponding beacon area should update their positions. For example, if employees' erroneous locations are concentrated in Out-Store Area 1 in FIG. 27, only beacon positions in Beacon Area 1 are updated using the partial beacon repositioning method.

Based on the updated beacon positions resulting from applying one of the centroid repositioning methods, the server re-calculates location trajectories of employees using the same beacon message samples. If the total number of out-of-store estimated locations of employees is decreased, the newly updated beacon positions are adopted. Then the server repeats the beacon repositioning procedure again. Otherwise, if the total number of out-of-store estimated locations of employees is not decreased, the newly updated beacon positions are not adopted, and the iterative beacon repositioning procedure is stopped until the next set of beacon message samples is collected. Also, any set of abnormal beacon position updates (e.g. beacon positions outside the store) is discarded by the localization server.

After each successful (i.e. decreasing out-of-store areas) iteration of a centroid repositioning method, the server again inspects the pattern of out-of-store areas of employees in order to choose one of the centroid repositioning methods (total or partial) for the next iteration. This iterative procedure, done with a finite sample of beacon messages received from employees, can be done at offline manner. Therefore, the server can calibrate beacon positions with multiple iterations of centroid repositioning methods until it finds optimal beacon positions resulting the minimal out-store areas of employees.

In a step of the total centroid repositioning method, as illustrated in view 1300 of FIG. 13, locations of mobile nodes associated with employees are determined. As illustrated in view 1310 of FIG. 13, regions that include the calculated locations of the employees are determined. The regions may represent, for example, the smallest convex polygon that includes all calculated employee mobile node locations within a set of calculated locations. The set of calculated locations used may be, for example, all calculated locations within a particular time period, all calculated locations of a particular employee's mobile node, or some other set. A centroid (or geometric center) of each of the regions of movement is determined. A vector of movement is then determined as the vector capable of moving the region into the store. For example, the vector can be determined to be the vector that would maximize the area of the region of movement that falls within the perimeter of the store. In another embodiment, the vector is determined to be the vector that would maximize the portion of the perimeter of the region of movement that falls within the perimeter of the store. Other techniques of determining the motion vector may also be used.

In some embodiments, the following technique is employed for determining a centroid repositioning vector.

If the calculated region of movement vector of employee k is described as $\vec{E}_k$, each vector can be described as $(x_1, y_1)$ $(x_2, y_2), \ldots, (x_n, y_n)$. Then, the beacon repositioning vector $\vec{B} = (x_B, y_B)$ can be the sum of the all employee region movement vectors with the scaling variable t (t={1, 2, ..., T}) as follows:

$$\vec{B} \triangleq (x_B, y_B) = \frac{1}{t}\sum_{k=1}^{n}(x_k, y_k) \quad \text{(Eq.8)}$$

The localization server finds the optimal value of the scaling parameter t by iterative calculations such that:

$$\arg\min_{t \in \{1,2,\ldots,T\}}\left\{\sum_{k=1}^{n}(\text{out-store area of } employee_k)\right\} \quad \text{(Eq.9)}$$

In this implementation, the server calculates the beacon-repositioning vector with one arbitrary scaling parameter t, and then moves the centroid of all beacon positions. The resulting location results of employees based on the updated beacon positions are recorded. With several iterative calculations, the server finds the optimal scaling parameter which minimizes erroneous locations of employees.

In embodiments in which a centroid repositioning vector is generated from a plurality of regions of motion, a total beacon repositioning vector may be generated by adding each vector together, by averaging the vectors, or by other methods of combining vectors. Examples of total beacon repositioning vectors are illustrated in FIG. 14. For example, each employee's repositioning vector can be added together to generate a total beacon repositioning vector. FIG. 13 view 1330 and FIG. 14 illustrate addition of repositioning vectors to generate a total beacon repositioning vector.

In methods that make use of total centroid repositioning, the calculated positions of all beacons in the store are shifted by an amount determined by the total beacon repositioning vector. An exemplary result of total beacon repositioning is illustrated in view 1330 of FIG. 13.

Figure 23A:
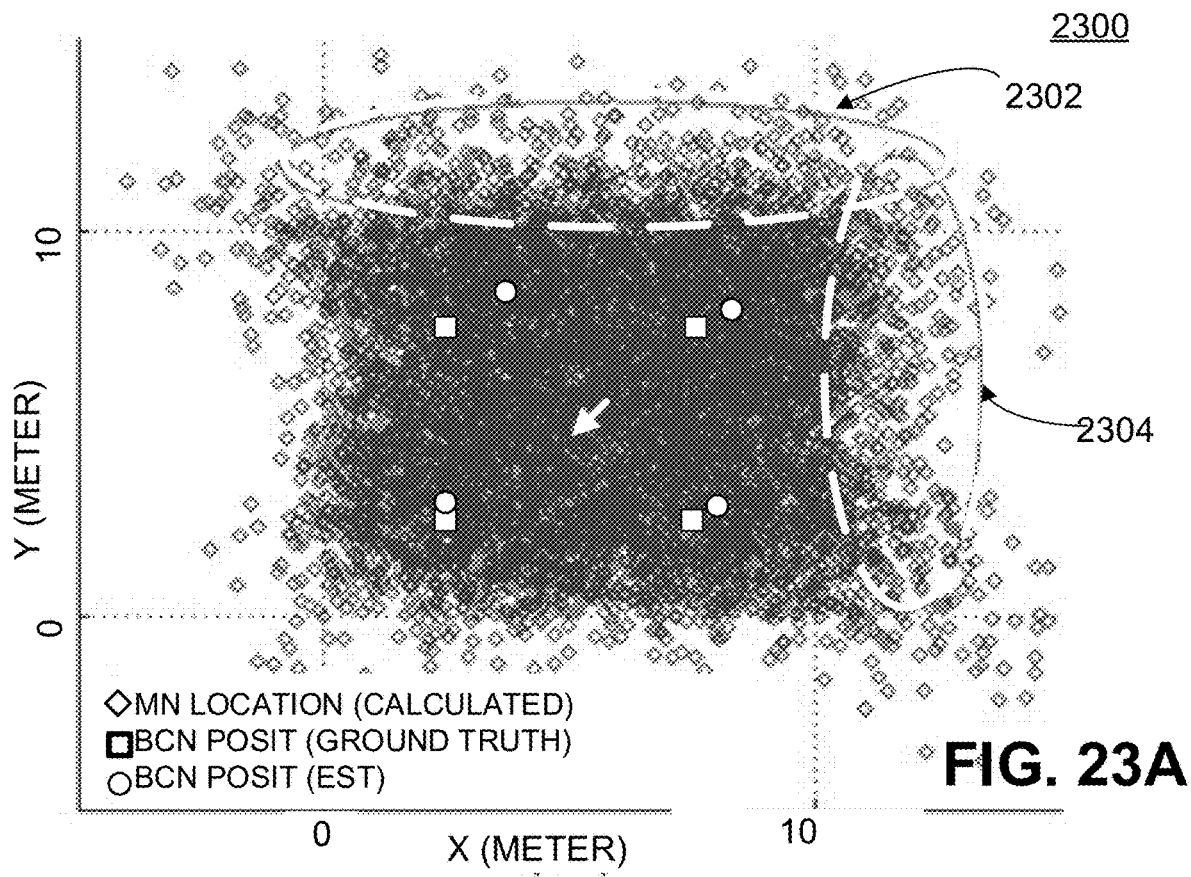
FIG. 23A is a graph illustrating calculated mobile node positions before total centroid repositioning.
Figure 23B:
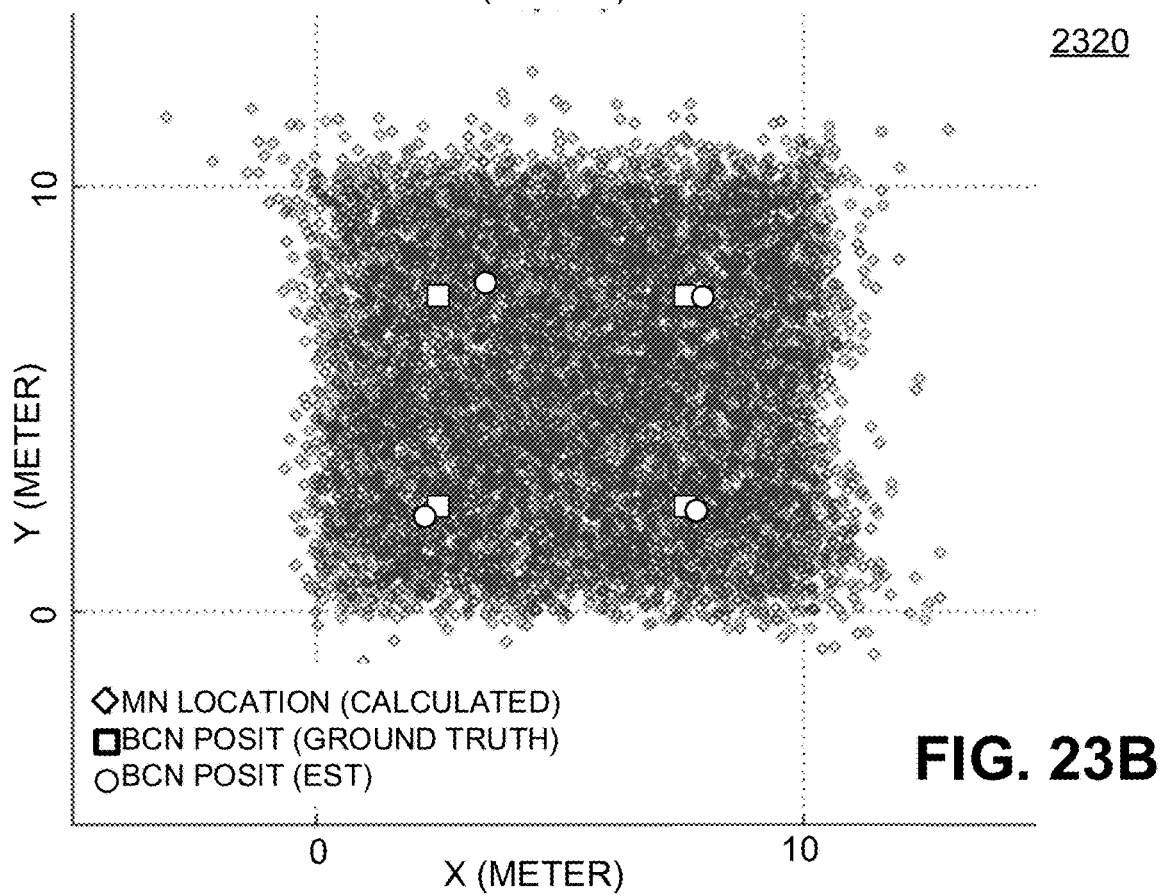
FIG. 23B is a graph illustrating calculated mobile node positions after total centroid repositioning.

FIGS. 23A and B depict a graph illustrating calculated mobile node positions before and after, respectively, total centroid repositioning. In FIGS. 23A and B, estimated beacon positions (white circles) deviate from the ground-truth beacon positions (black squares) which resulted mobile node location distributions outside the store, especially towards upper-right directions, as depicted by regions 2303 and 2304 on graph 2300. In order to reduce the error location distributions in the upper-right direction, the centroid of beacon devices is moved towards to the lower-left direction, as depicted by the arrow in graph 2300 of FIG. 23A.

In the total centroid repositioning method, the centroid of all beacon devices is moved. In a partial centroid repositioning method, the centroid of a partial set of beacon devices is moved. The beacons whose centroid is moved are selected beacons that are determined to be associated with position errors. Therefore, in some embodiments, the partial centroid repositioning method is applied to cases where employees' location distribution illustrates which beacon devices are erroneously located.

Figure 24:
FIG. 24 illustrates a partial centroid repositioning method.

FIG. 24 illustrates a partial centroid repositioning method. In particular, FIG. 24 includes the four views 2400, 2410, 2420, and 2430, which are similar to the views of FIG. 13. For example, consider a case of an employee in a store, where the calculated locations of the employee are as depicted in view 2400 of FIG. 24. It is not very plausible that those calculated locations outside the store are correct. As illustrated in view 2410 of FIG. 24, much of the error region (the region of calculated employee movement that falls outside the perimeter of the store) is nearest the beacon at the top left of the illustration at areas depicted as 2412. In some embodiments, the centroid of the error region may be determined, and the beacon having the calculated position nearest the centroid of the error region may be selected for repositioning. As discussed with respect to FIGS. 22A and B, calculated employee locations that are outside the perimeter of the store are likely to be located near a beacon with an erroneously estimated position.

When a determination is made to move the estimated positions of only a portion of the beacon devices, a partial centroid repositioning vector is used. In a partial centroid repositioning method, the centroid of region defined by selected erroneously-located beacon devices. By moving the centroid of the selected erroneously-located beacon devices by a certain vector (direction, distance), calculated locations of employees are moved back within the perimeter of the store.

Figure 25A:
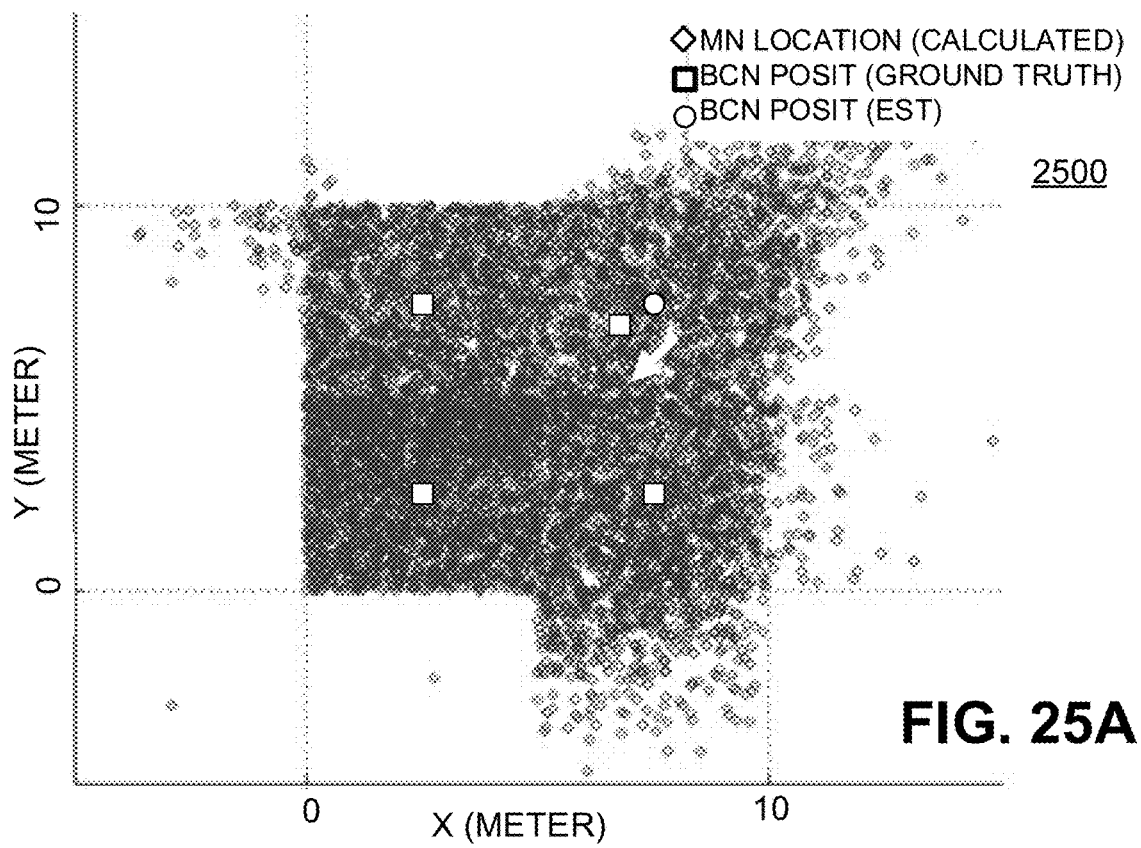
FIG. 25A is a graph illustrating calculated mobile node positions with error in the top-right beacon position, before partial centroid repositioning.
Figure 25B:
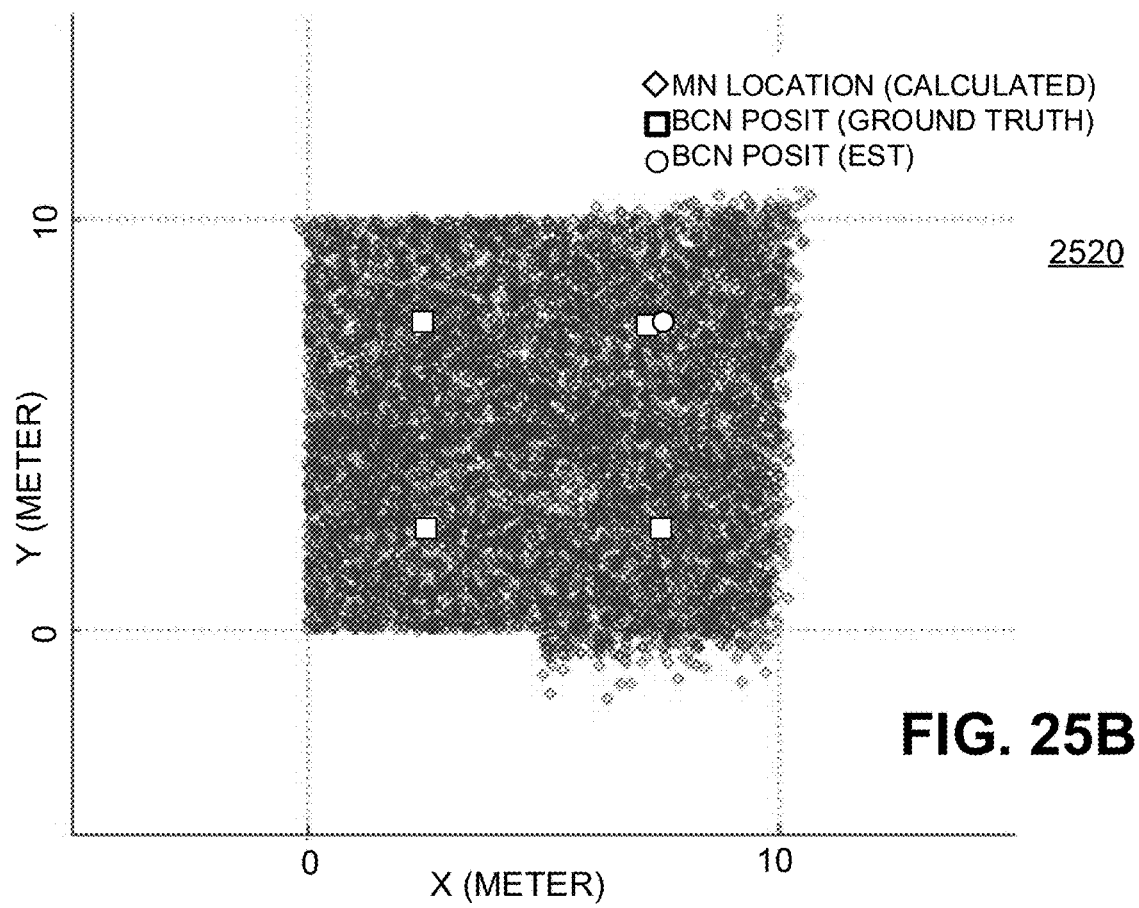
FIG. 25B is a graph illustrating calculated mobile node positions after partial centroid repositioning.

FIGS. 25A and B depict a graph illustrating calculated mobile node positions, before and after, respectively, partial centroid repositioning. An exemplary operation of the partial centroid repositioning method is illustrated in FIGS. 25A and B. As illustrated in FIG. 25A, the estimated beacon position of the upper-right beacon (white circle) deviates from the ground-truth beacon position (black circle) resulting in calculated mobile node location distributions outside the store, especially towards upper-right direction. In order to reduce the error of location distributions in the upper-right direction, the centroid of the upper-right beacon device is moved towards to the lower-left direction as depicted by the arrow in the figure. When mobile node locations are recalculated using the new estimated location of the upper-right beacon device, fewer calculated mobile node positions are located outside the store, as illustrated in FIG. 25B.

The exemplary systems and methods describe herein can be implemented with existing beacon devices, such as iBeacon devices. In some embodiments, an indoor localization service is provided based on the proposed methods to target each individual store. Store operators can be provided with precise localization services for their customers without any additional costs except pre-installed beacon devices. With the localization services provided to customers, customers can locate themselves within a building and can be guided to the section of the store in which they are interested. In some embodiments, beacons are installed in a residential setting, and are used for localization (e.g. of objects) within a home.

In some embodiments, in a server-based scenario, a localization server detects relocation, removal, or installation of beacon devices within a store. Such information can be provided to beacon service operators.

In some embodiments, the methods disclosed herein are used to detect spoofing attacks by cloned beacon devices. Any spoofed beacon messages broadcasting a false UUID are detected during store identification with an uncoordinated RSSI value from the false beacon device. For example, when several mobile nodes report the same received beacon message of Store X with very high RSSI, value while all other beacon messages received at the same time indicate that the mobile nodes are very far from the Store X, then the Store X beacon is likely to be misplaced or spoofing its location.

Figure 28:
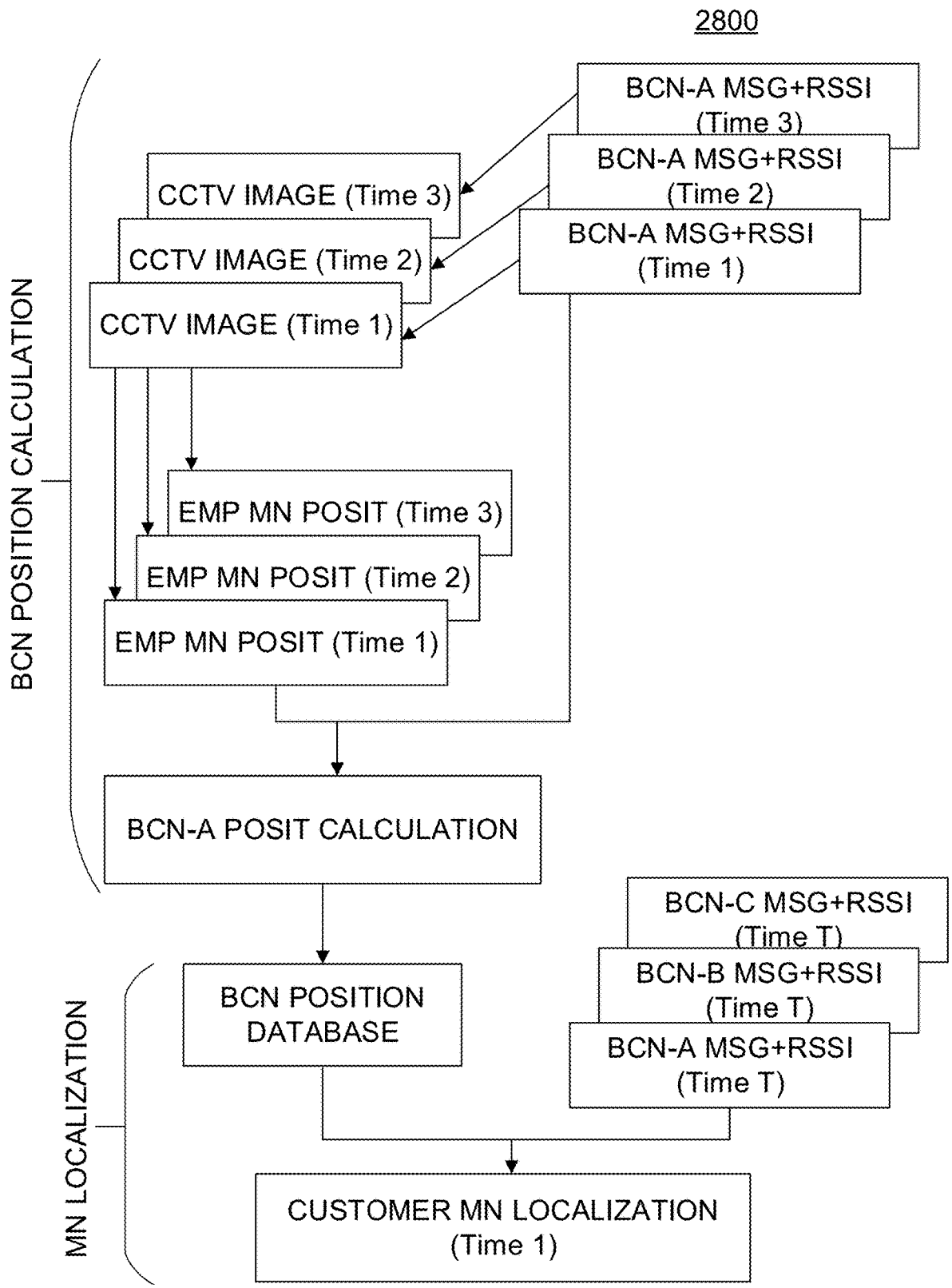
FIG. 28 illustrates an overview of a proposed beacon position calculation and customer mobile node (MN) localization.
Figure 29:
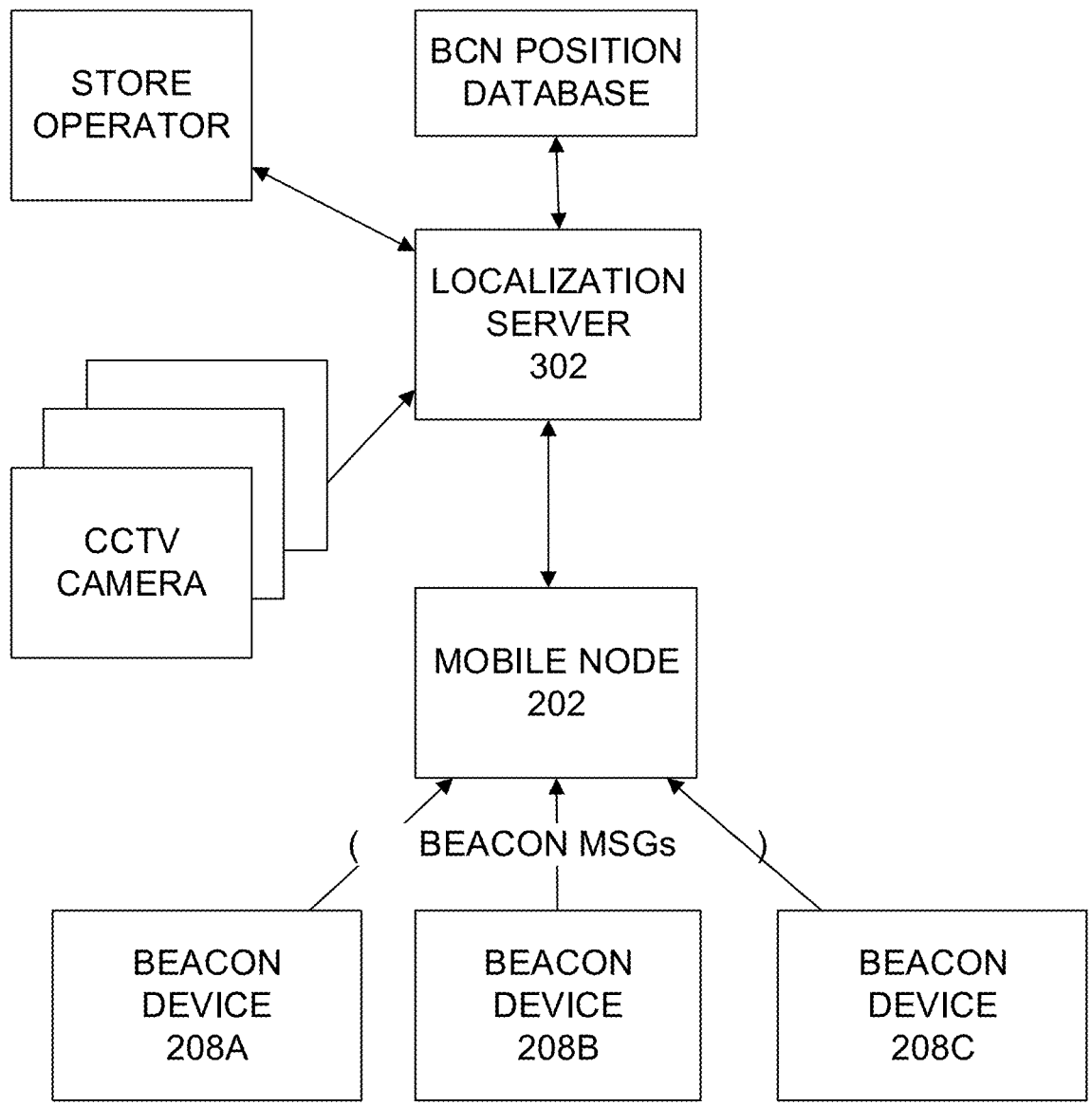
FIG. 29 is an entity relationship diagram of an exemplary embodiment.

FIG. 28 illustrates an overview of a proposed beacon position calculation and customer mobile node (MN) localization. FIG. 29 is an entity relationship diagram of an exemplary embodiment. FIG. 29 includes the system 2900 that includes similar elements as depicted in system 200 depicted in FIG. 2, but also includes CCTV (Close Circuit Television) cameras, a beacon position database and store operators. The system 2900 may be use to perform the overview depicted in FIG. 28 and throughout the disclosure.

Before localization of customer mobile nodes in a store, the reference positions of installed beacon devices are found. When an employee's Mobile Node (MN) receives beacon messages broadcast from nearby beacons, it uploads 1) beacon identification information 2) a RSSI (Received Signal Strength Indicator) value and 3) a timestamp indicating the reception time of each message, to a localization server. Based on the above information, the localization server obtains CCTV-images taken at the time specified in the received timestamps. If the matched employees carrying the identified mobile nodes appear in any CCTV images, the server estimates locations of the employee's mobile on the store's floorplan at each designated time. By using both the image-estimated locations of employee's mobile node and the RSSI-calculated relative distances towards a certain beacon device, the position of the beacon device (e.g. Beacon-A) is calculated. The calculated reference positions of beacon devices in each store can be updated by using the proposed method, which will make beacon positions approach the ground-truth positions that in turn enable precise localization of customer mobile nodes.

The server localizes customer MNs using trilateration method when MN uploads at least three simultaneously (or near-simultaneously) received beacon messages and their RSSI values. The server provides location information to the customer and/or to the registered store operator for customer interactions such as welcoming, advertisement, and promotions.

The proposed method provides an in-store mobile localization method that works 1) with any type of beacon devices 2) with little support from the installed surveillance camera, and 3) without manual site survey procedures. At least the following techniques are disclosed herein:
- In [Beacon Position Calculation], methods to refine beacon positions in a store by using CCTV images captured at surveillance cameras.
- In [Beacon Position Calculation], methods to estimate locations of employees' mobile nodes using CCTV-images.

Features of some disclosed embodiments include the following:
- The systems and methods disclosed herein do not require any new infrastructure but only utilizes the previously installed infrastructure of 1) Anchor (beacon) devices such as Wi-Fi APs, Bluetooth Beacons and 2) surveillance camera system. Such systems do not affect operations of the beacon's original applications, but give the additional benefit of localization of customers' mobile nodes that can further enable applications such as navigation within a store, micro-scale customer interactions.
- By using crowd sourced information from long-dwelling employees in a store, the system disclosed herein can fine tune the positions of beacon devices which in turns gives precise localization services to visiting customers.

FIG. 29 describes entity relationships between a localization server, mobile nodes, CCTV camera, and a store operator in the proposed system.

The localization server 302 can be operated by either external service provider or by the store operator. The server maintains database of beacon positions for each store calibrated by using crowd-sourced inputs from employees' mobile nodes. It also provides location information to customers. The server can update beacon positions by using the CCTV-estimated MN locations as reference positions and relative distances between the fixed beacon positions and time-varying MN locations. Then the server calculates customer MN's location using their relative distances toward several beacon devices by calculating RSSI values of beacon messages.

A store owner/operator (e.g. BestBuy, Walmart, IKEA etc.) can provide a minimum amount of information about its store such as floor plan, CCTV installation information, and a list of installed beacon devices within the store to support localization service. In turn, store operators can be provided by (real-time) update of customer locations in return which will give tremendous opportunity for advertisement, navigation, customized survey and customer behavioral analysis.

Figure 30:
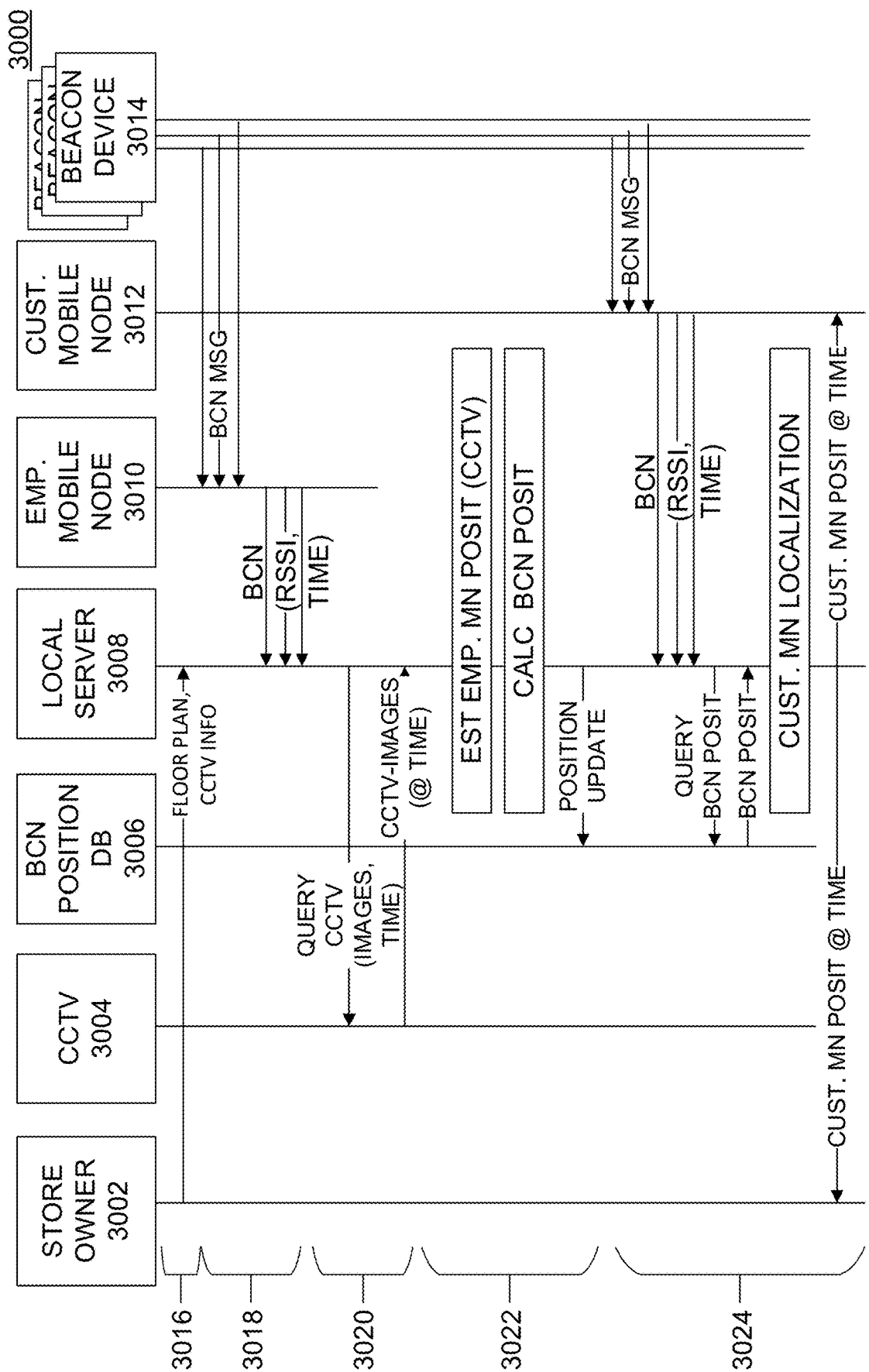
FIG. 30 is a procedure sequence diagram of an exemplary embodiment.

FIG. 30 is a procedure sequence diagram of an exemplary embodiment. FIG. 30 depicts the procedure 3000 that depicts messages between a store owner 3002, a CCTV 3004, a beacon position database 3006, a localization server 3008, an employee's mobile node 3010, a customer's mobile node 3012, and beacon devices 3014. A customer can learn his/her in-store location by using his/her Mobile Node (MN) 3012. The localization server 3008 can provide customer locations within a store where no manual site survey has been performed. (Throughout this disclosure, the terms "localization" and "positioning" are used interchangeably, while the localization is mainly used for Mobile Node operation and the positioning is mainly used for determining reference position of beacons.)

Figure 31:
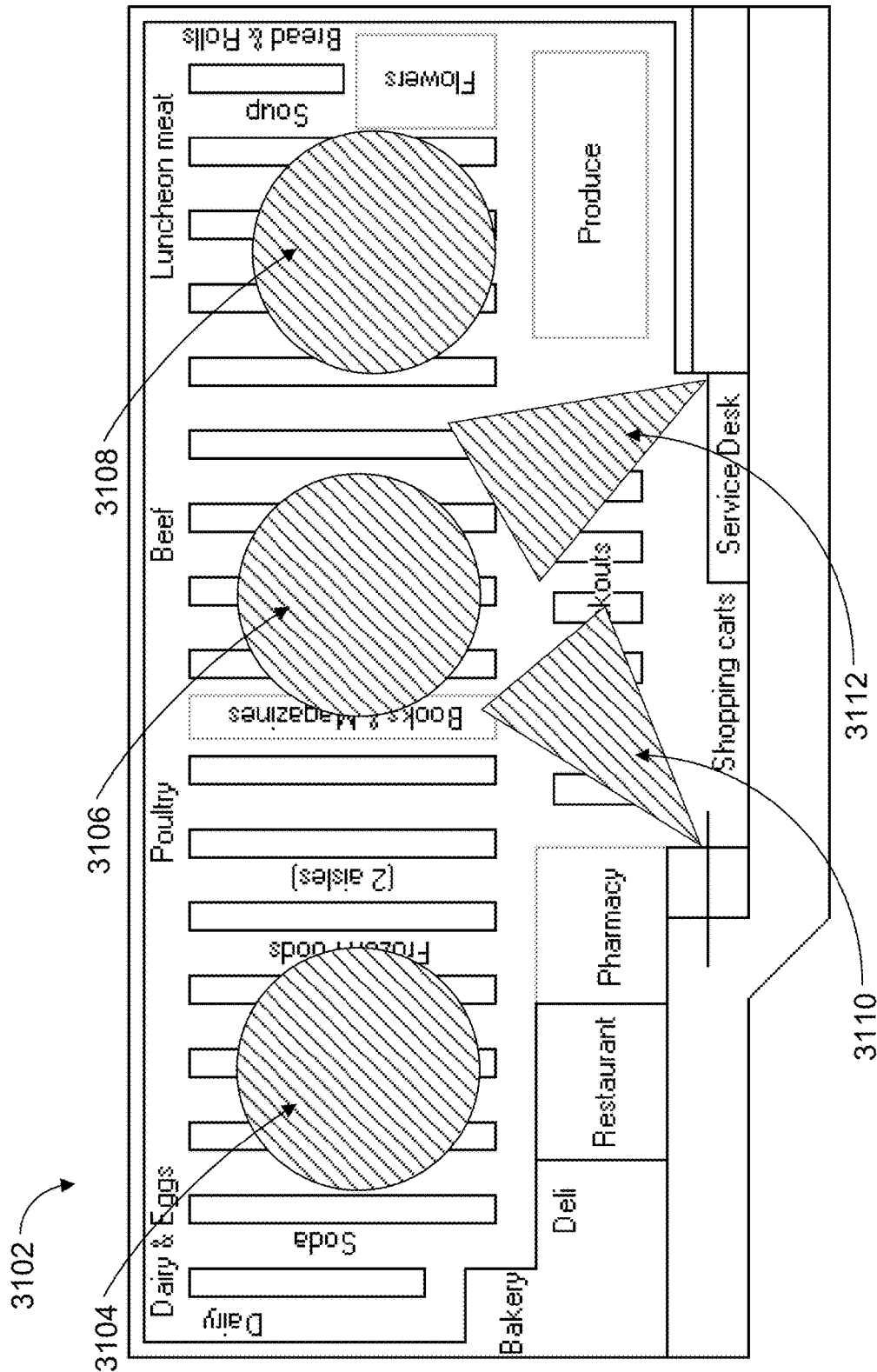
FIG. 31 is an example of a store's floor plan with a CCTV installation map for use in an exemplary embodiment.

FIG. 31 is an example of a store's floor plan with a CCTV installation map for use in an exemplary embodiment. FIG. 31 includes the overview 3100 that includes the store layout 3102, and areas of CCTV monitoring 3104-3112.

Returning to FIG. 30, at step 3016, preparation occurs. Before a localization server starts its localization service, it collects information about the store such as the floor plan, CCTV information, and beacon information. The floor plan and CCTV information will make the server to roughly estimate the size and layout of the store and each specific regions that are monitored by each CCTV camera as depicted in FIG. 31.

The store operator can also provide a list of installed beacon device IDs to differentiate the store's beacon devices from those of nearby stores. If the operator also provides the initial installed position of beacon devices within the store, the sever can use that information as the initial reference positions of beacon. However, small beacon devices such as Bluetooth Beacons can be easily moved to different positions due to layout/interior changes and also can be tampered with or displaced by customers. Therefore, it is helpful for the localization server to maintain the up-to-date beacon positions database for precise localization of customers.

At step 3018, beacon messages are collected. Within a store, an employee's MN 3010 collects multiple beacon messages broadcast from nearby beacon devices 3014. Then the MN 3010 can build an internal table of beacon information as depicted in view 3200 of FIG. 32.

Figure 32:
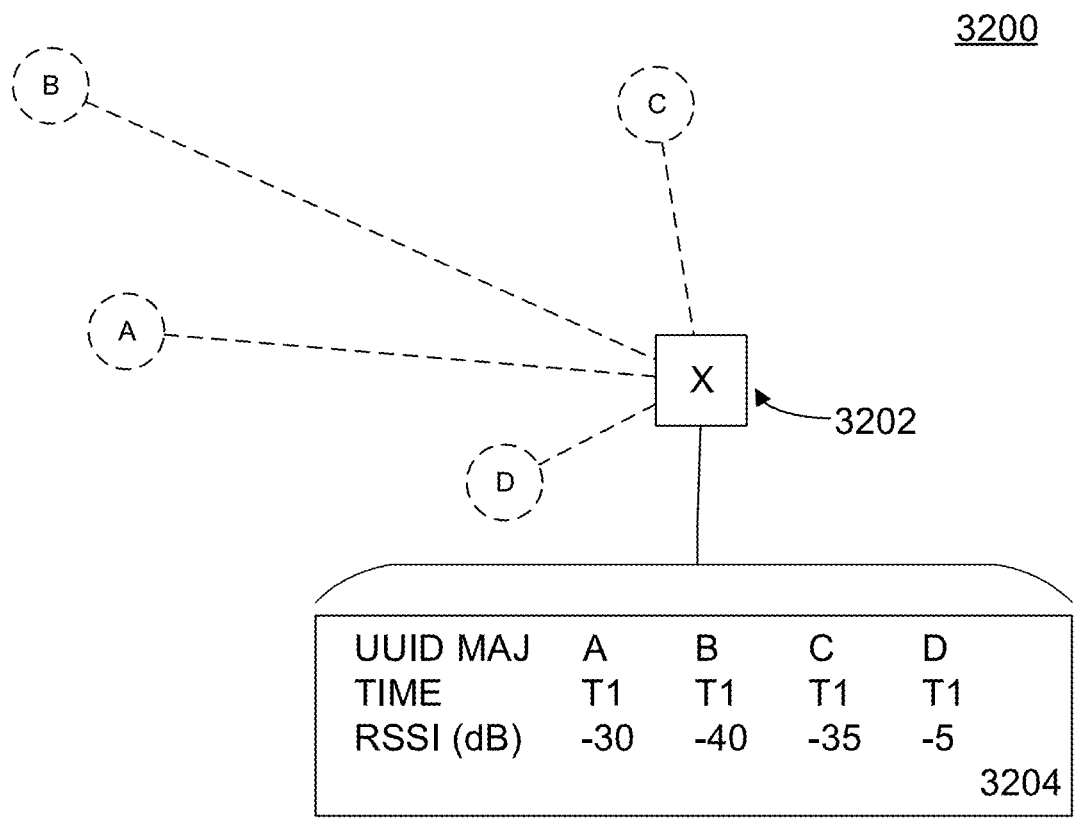
FIG. 32 illustrates collection of beacon messages in some embodiments.

FIG. 32 illustrates collection of beacon messages, in some embodiments. In particular, FIG. 32 depicts view 3200 that includes a position of a mobile node 3202, a table of beacon message data 3204, and initial positions of beacons A-D, depicted as dashed circles. As depicted in FIG. 32, MN collects a set of beacon messages and records their unique beacon ID, measured RSSI (Received Signal Strength Indicator) values (indicates a distance to the beacon device), and its message reception timestamp. After receiving several beacon messages, Mobile Node 3010 uploads the above information to the localization server.

Returning to FIG. 30, at step 3020, CCTV image processing occurs. When beacon messages received at certain timestamps are uploaded by an employee X's mobile node 3010 to the localization server 3008, the server performs the following procedure:

1) Query CCTV images taken at Time 1, 2, 3 from all CCTV cameras (FIG. 30). For position update of a certain beacon device, the server obtains CCTV images taken at specific times recorded by employee MNs when the beacon messages are received from the beacon.
2) Estimate employee X's mobile node 3010 location as depicted in FIG. 33.

Employee Detection

Figure 33:
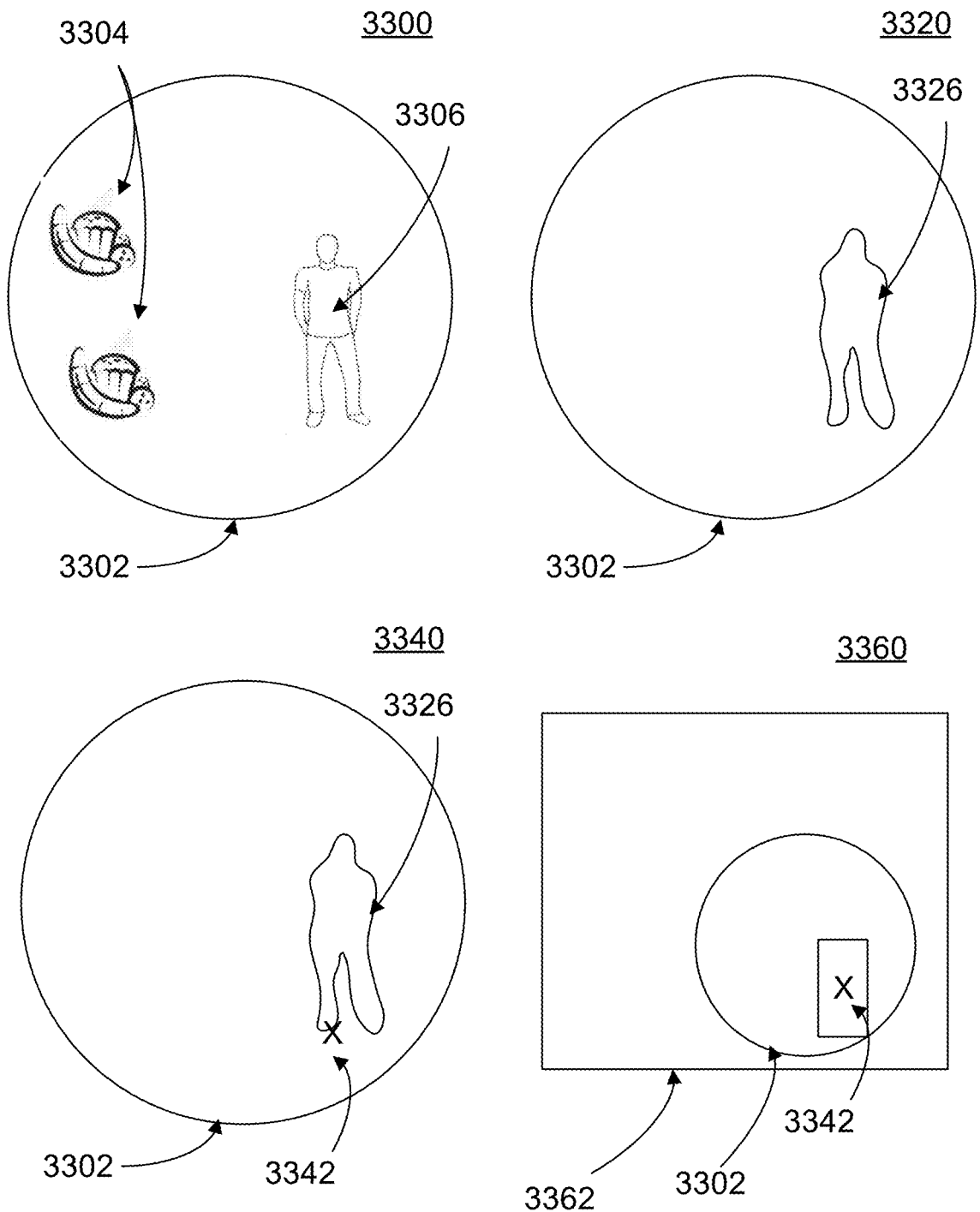
FIG. 33 illustrates estimation of an employee's mobile node locations in some embodiments.

FIG. 33 illustrates estimation of an employee's mobile node locations, in accordance with an embodiment. In particular, FIG. 33 depicts the overviews 3300, 3320, 3340, and 3360. The view 3300 includes an image 3302 from a CCTV. The image includes object 2204 and employee 3306. The server extracts the employee X's location (carrying the MN) within each of the CCTV video images. In examples presented in this disclosure, it is assumed without loss of generality that the beacon position update procedure is performed using a single employee's mobile node. Other embodiments may make uses of multiple employees' mobile nodes. There are periods during which only employees roam around within a store before or after the operation hours of the store; also some stores' employees wear uniforms, making it straightforward to locate employees within CCTV-images.

In alternative embodiments, the method can be utilized by using customers' MNs. If there are not many customers within a store resulting only few people captured in each CCTV image, it is straightforward to map a person in an image with his/her mobile node identity.

Employee Object Extraction

In order to detect objects and find their locations relative to the store's floor plan, a sequence of foreground objects can be created from captured image frames by separating the foreground from the background. This can be done by applying method such as background subtraction for static cameras. Background subtraction involves calculating a reference image, subtracting each new frame from this image, and thresholding the result. The result of thresholding is a binary segmentation of the image, which highlights regions of non-stationary objects. These highlighted regions reflect an employee object. It is desirable to recognize the object and determine who the person is. The localization server can utilize an employee picture database for the employee identifications. As shown in view 3320, the portion of the image 3302 has removed the objects 3304 and identified the shape 3326 as being associated with the employee 3306.

Ground-Touching Pixel Calculation

In order for the server to determine the real world location of the object in the CCTV images, the ground-touching point of each found object is found. The ground-touching point of an object is the pixel where the object meets the ground plane. For example, the point of a human target is the center point of the target's shoes. As shown in the view 3340, the image 3302 includes the identified shape 3326 and identified the point 3342 as the point where the object touches the ground.

MN Location Estimation

The next step is to project the ground-touching point's pixel coordinates to the floor plan of the store by transformation function. The result is the actual coordinates of the target object, relative to the store's floor plan. Also it may be assumed the z-axis location of MN as the about half height of the employee. As shown in view 3360, the portion of the image 3302 is correlated to a position in the store 3362, and the determined location 3342 is placed in a location in the store 3362.

There are several possible methods to determine whether or not a MN is identified as one of the employees' MN. This classification can be done by using one or more combinations of the following methods:

Explicit identification: For localization calibration purposes, the localization server is provided by identification information of employees' mobile node (e.g. MAC address) from the store owner and/or the beacon service operator.

Frequency/Duration calculation: If a certain MN regularly calculates its location for a very long time of a day repeated regularly, the localization server can identify the MN is owned by one of the store's employee and record its trajectory for calibration purposes.

Zone calculation: Many stores have a separation between customer zone and employee-only zone. If a certain MN roams within a store without limitation, it can be identified as one of the employees' MNs.

Time calculation: Many store have a preparation time before they allow customers enter into the store every day. Therefore, by observing one or a few MNs appearing in a store firstly on each day can be a hint for identification of employee.

Returning to FIG. 30, at step 3022, the beacon position is calculated. From the estimated locations of employee MNs and measured RSSI values of beacon messages sent from a certain beacon device to employee MNs, the localization server can calculate the beacon's position using the well-known Trilateration algorithm as depicted in FIG. 34.

Figure 34:
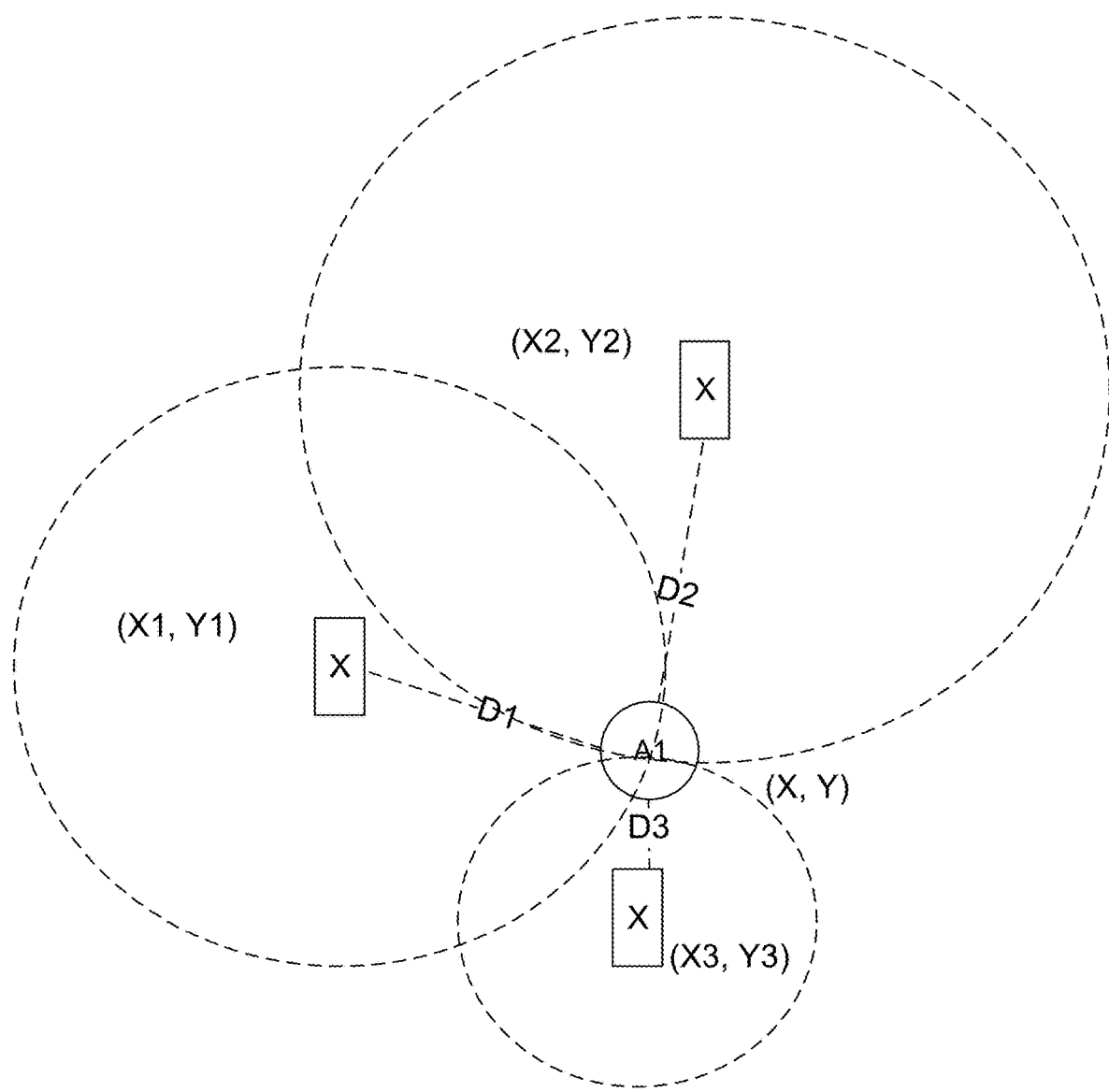
FIG. 34 illustrates beacon position calculation in some embodiments.

FIG. 34 illustrates beacon position calculation, in accordance with some embodiments. Similar to the trilateration performed in conjunction with FIGS. 19-20, the localization of a beacon can be performed as well. FIG. 34 depicts the location of three mobile nodes, depicted by a rectangle with an "X", each located at a distance D from a beacon, depicted by a solid circle. Each of the mobile nodes have a circumference, drawn at radius of D, representing the distance between the mobile node and the beacon. The location of the three intersecting dashed circumferences is the determined location of the beacon.

Figure 35:
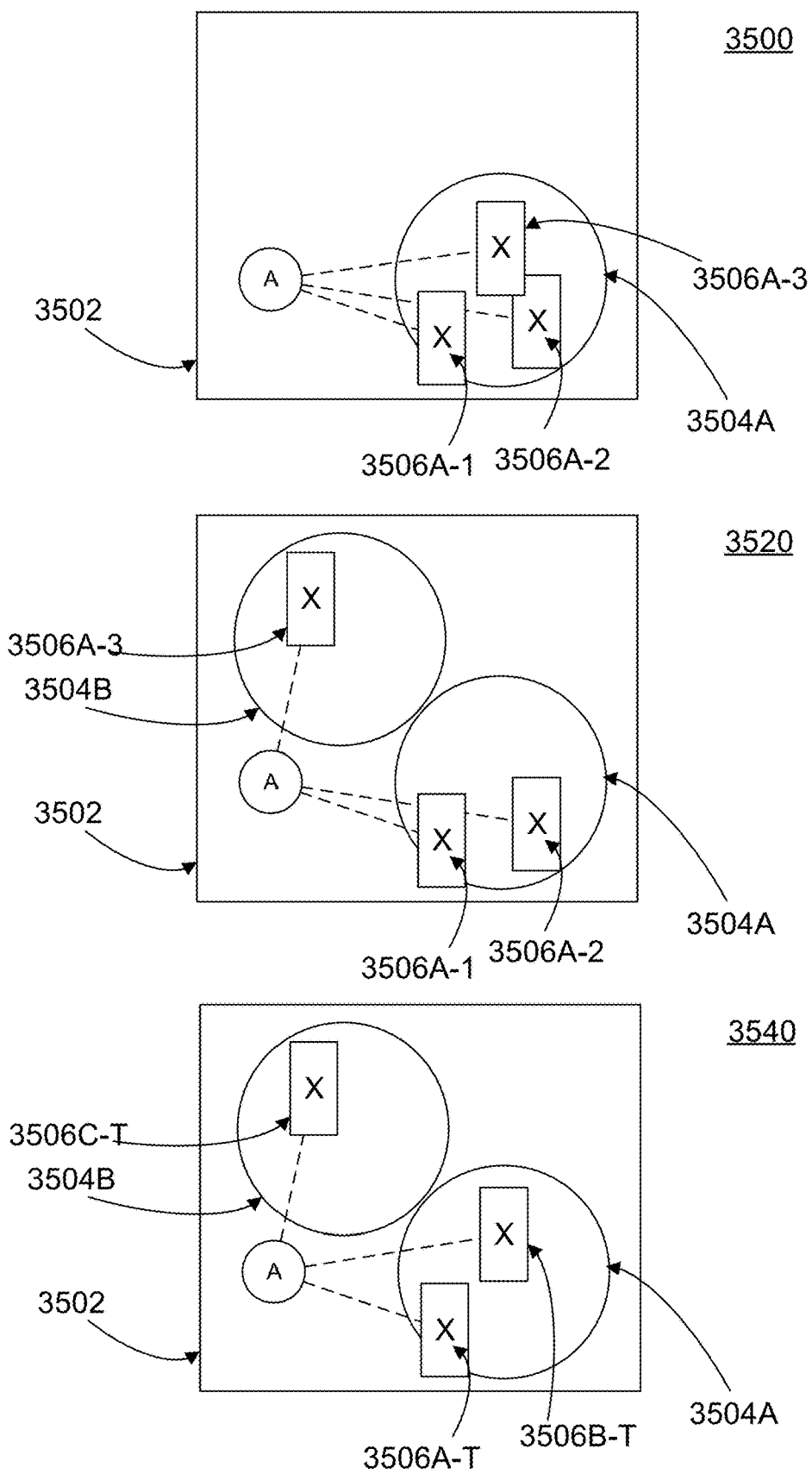
FIG. 35 illustrates exemplary operation to obtain three reference employee MN's locations.

FIG. 35 illustrates exemplary operation to obtain three reference employee MN's locations, in accordance with an embodiment. In the meantime, there are several cases for obtaining reference locations of employee MN's locations for the beacon position calculation as depicted in FIG. 35. Depicted in each of the views 3500, 3520, and 3540, is a Beacon A located within a store layout 3502. Positions of MN's are depicted as rectangles with an X and identified as "3506" with a letter denoting the identity of an employee associated with the MN and a "-#" or "-T" denoting the time. Positions of the views from the CCTV's are depicted as large circles and identified as 3504, with the letter denoting the identity of the CCTV associated with the image.

The view 3500 depicts a mobile node 3506A detected by a single CCTV camera 3504A in three different locations at three different times (T1, T2, T3).

The view 3520 depicts a mobile node (MN1) can be detected by multiple CCTV cameras in three different locations at three different times (T1, T2, T3). In this example, the mobile node 3506 associated with employee A is detected by CCTV 3504A at Time 1 and Time 2, and detected by the CCTV 3504B at Time 3.

The view 3540 depicts multiple mobile nodes (3506A, 3506B, and 3506C) can be detected by multiple CCTV cameras in three different locations at the same or different time epochs. In this example, the mobile nodes 3506 associated with employees A and B is detected by CCTV 3504A at any times, and the mobile node 3506 associated with employee C is detected by CCTV 3504B at any time.

Therefore, there are many cases of easily securing multiple reference MN locations and relative distances for calculation of a certain beacon position.

Figure 36A:
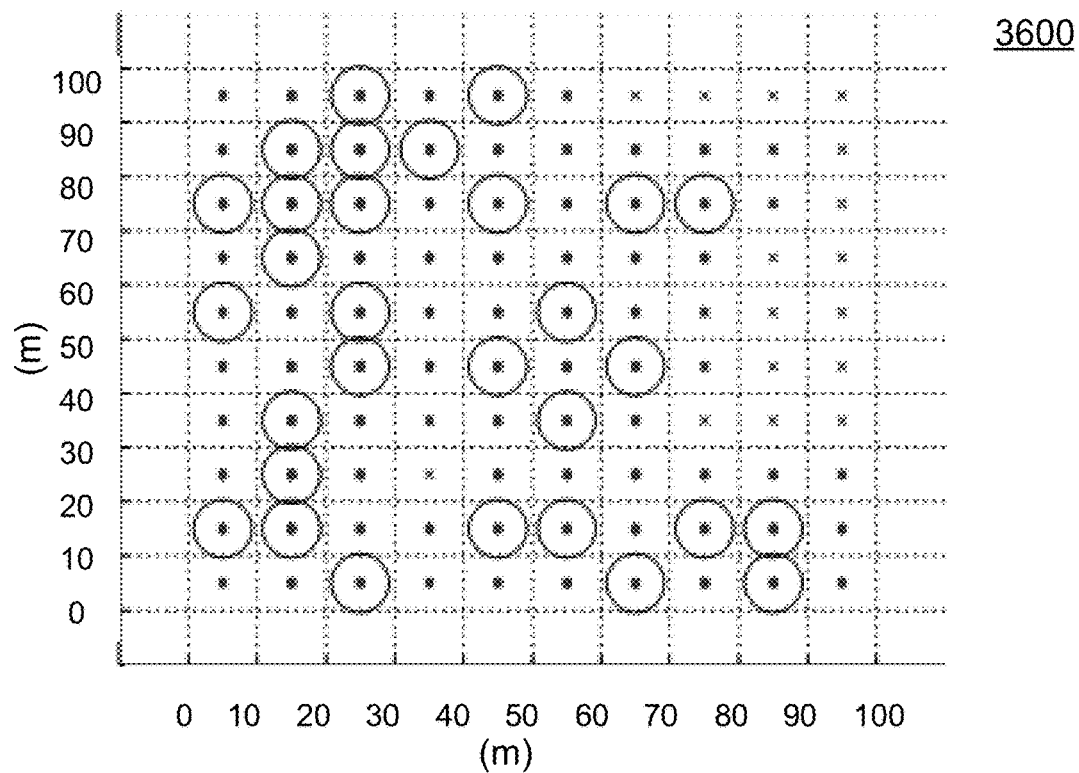
FIGS. 36A and 36B illustrate beacon position calculation results of a 100 m×100 m store when (36A) 30% and (36B) 40% of the store is CCTV-covered respectively (no wireless channel error).
Figure 36B:
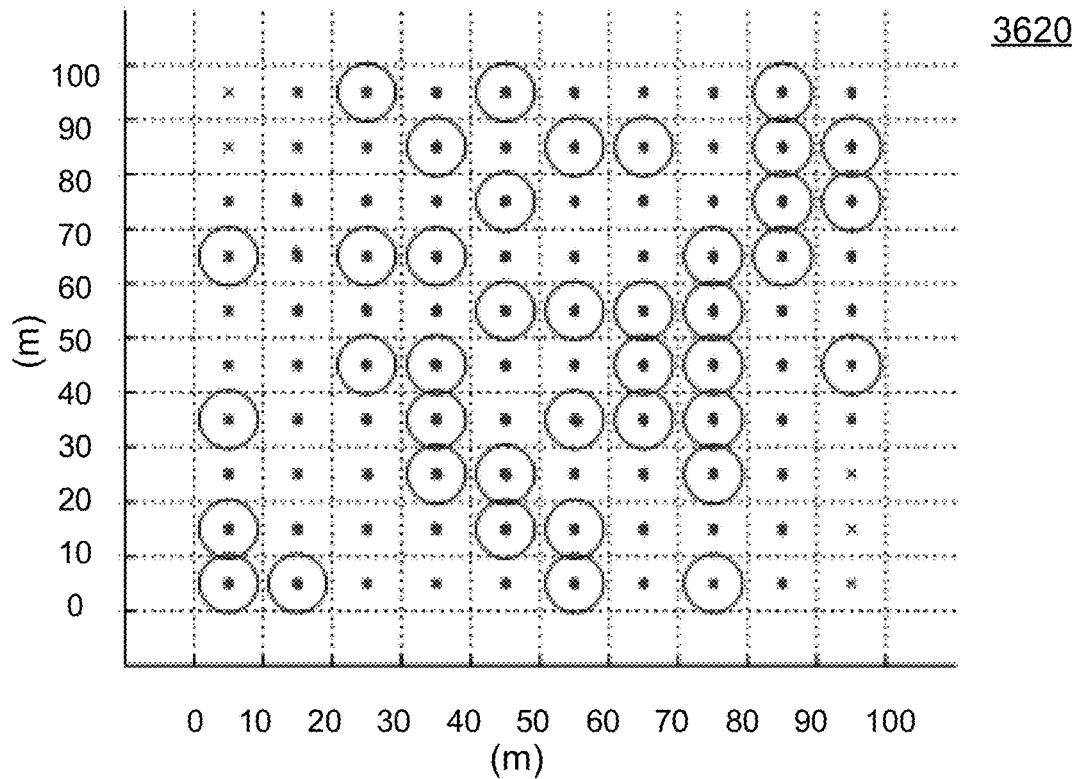
Figure 37A:
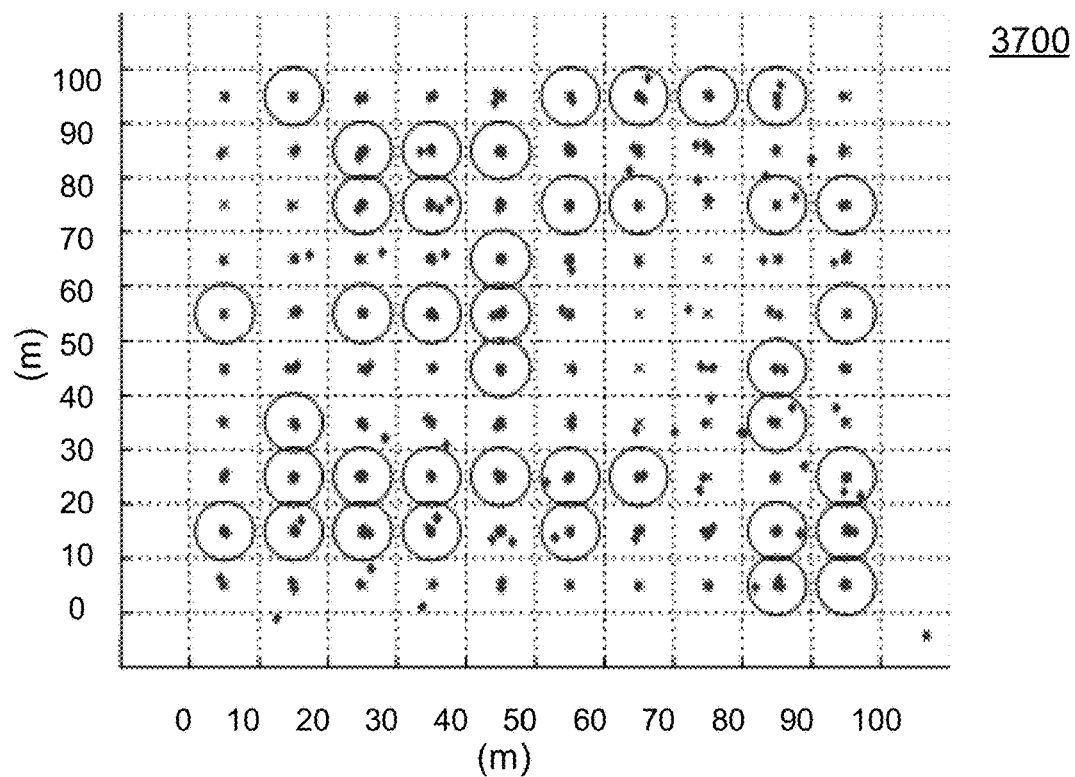
FIGS. 37A and 37B illustrate beacon position calculation results of a 100 m×100 m store when 40% of the store is CCTV-covered with (37A) Distance calculation error from wireless channel variations (log-normal shadowing) or (37B) MN location mis-estimation error from image processing mistakes.
Figure 37B:
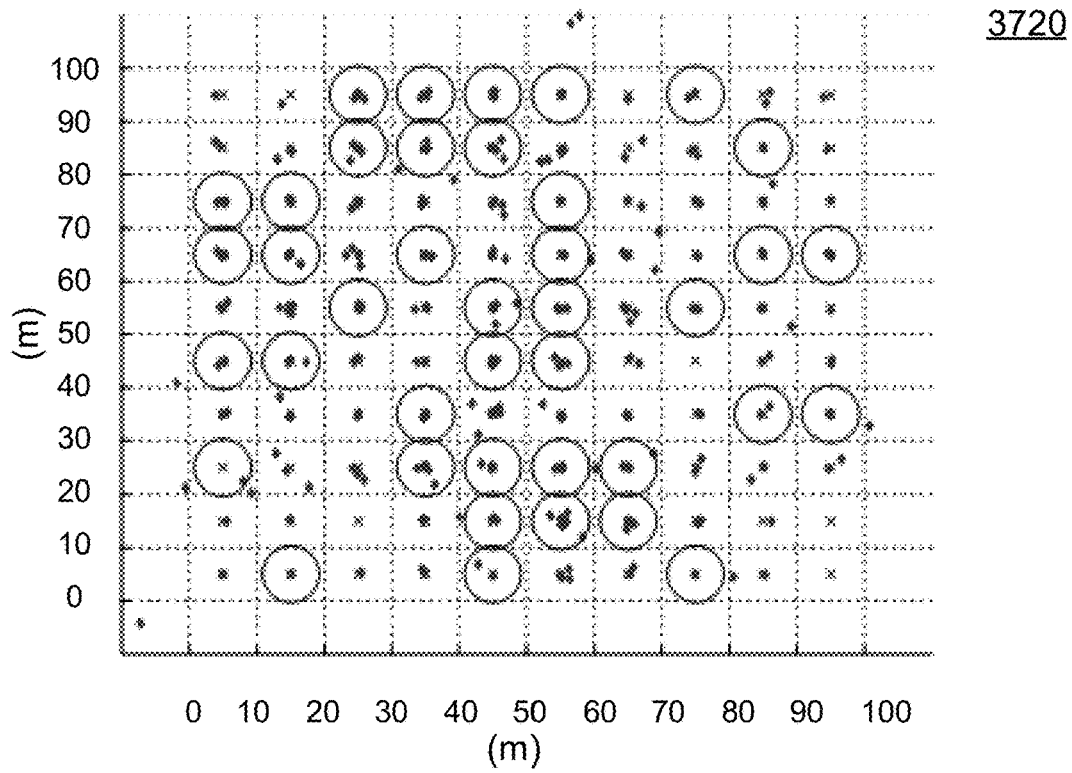

FIGS. 36A and B illustrate beacon position calculation results of a 100 m×100 m store when 30% (FIG. 36A) and 40% (FIG. 36B) of the store is CCTV-covered, respectively. FIGS. 37A and 37B illustrate beacon position calculation results of a 100 m×100 m store when 40% of the store is CCTV covered with (FIG. 37A) distance calculation error from wireless channel variations (log-normal shadowing) or (FIG. 37B) MN location mis-estimation error from image processing mistakes. The FIGS. 37A-37B depict the graphs 3600, 3620, 3700, and 3720, respectively. In the graphs, a beacon device is placed in the center of each of the 10 m×10 m quadrants, indicated by an x. Areas covered by a CCTV are indicated with a circle. Determined beacon device positions are indicated by a dot.

The performance of the proposed beacon position calculation methods is evaluated in FIGS. 36A and B. Within a 100 m×100 m store, the store is virtually divided into 100 identical regions, and one beacon is placed at the center of each region (marked with an x). The other parameters used in the simulations are described in Table 2. Then it is assumed that 30% of all regions are covered by CCTV cameras (marked with a circle), thereby the localization server can estimate employee MN locations within those regions. Then by using the proposed method, beacon device positions (marked as dots) are calculated as depicted in FIG. 36A. As one can see, most beacon devices near CCTV-covered regions found their locations several times by using reference employee MNs captured in CCTV, while beacon devices far from CCTV cameras could not be positioned. However, by slightly increasing the percentage of CCTV camera regions from 30% to 40%, it is seen that most beacon positions are calculated with the help of nearby CCTV cameras in FIG. 36B.

There can be localization errors from two major factors: 1) Distance calculation error from wireless channel variations; and 2) MN location mis-estimation error from image processing mistakes as depicted in FIGS. 37A and 37B respectively. It can be observed that, while some beacon positions are calculated to the different positions from errors, still most beacon devices are positioned to near to their actual ground-truth positions (center of each region).

Returning to FIG. 30, the mobile node is localized at step 3024. From the beacon device positions and measured RSSI values from the received beacon messages, a customer MN can localize itself using the Trilateration algorithm as depicted in FIGS. 19.-20. Customer mobile node's localization information calculated by the localization server 3008 can be delivered to the customer 3012, the store owner 3002, and/or the beacon service operator 3006 based on the service model as depicted in FIG. 30.

FIG. 6A depicts an example beacon message format. Beacon devices transmit packets of data in intervals from 20 ms to 10 seconds. The shorter the interval, the shorter the battery life, but the faster the device can be discovered. The packets can be up to 47 bytes in length and consist of: 1 byte preamble, 4 byte access address, 2-39 bytes advertising PDU, and 3 bytes CRC as follows [8].

UUID (Universally Unique Identifier) (16 bytes) is picked up by a compatible app or operating system in Mobile Node. (e.g. all beacons in NIKE stores may have the same UUID).

Major number (2 bytes) is used to group a related set of beacons. For example, all beacons in a store will have the same major number. That way the application will know in which specific store the customer is. (e.g. all beacons in a specific NIKE store in San Francisco Premium Outlet may have the same Major number).

Minor number (2 bytes) is used to identify individual beacons. Each beacon in a store will have a different minor number, so that you know where the customer is nearby (e.g. each beacon in the NIKE store in San Francisco Premium Outlet has a different Minor values according to their positions such as clothing, men's shoes, women's shoes, etc.).

TX power (1 byte) can be used in calculations to determine how close MN is to a beacon.

It can be either as rough information (immediate/far/out of range) or as a more precise measurement in meters. The TX power is the strength of the signal measured at 1 meter from the device (RSSI—Received Signal Strength Indication).

As the strength of the signal decreases predictably with greater distance, knowing the RSSI at 1 meter, and the current RSSI (Bluetooth chipset can calculate RSSI of the received signal), it is possible to calculate the distance. Obstacles such as furniture, people or communication congestion can weaken the signal. Hence the distance is only an estimate. For the purposes of illustration, it is assumed that each beacon device has the same TX power which means that only RSSI is needed to calculate distance from the beacon to MN. Other embodiments make use of the TX power in calculating distance.

FIG. 6B depicts an example beacon message format. Wi-Fi Access Points periodically broadcast 802.11 beacon messages from intervals of 100 ms usually. The packets can be organized as depicted in FIG. 6B.

Address fields: There are four address fields in the frame format, although not all fields are present in all frames. Address 1 contains the receive address (RA) and is present in all frames. Address 2 contains the transmit address (TA) and is present in all frames except ACK and CTS frames. Address 3 is present in data and management frames. In a data frame, the address carried by the Address 3 field is dependent on the To DS and From DS bit settings and whether the frame is carrying a MSDU or A-MSDU. In management frames, Address 3 contains the BSSID. Address 4 is only present in data frames and only when both the To DS and From DS bits are set Type/Subtype: The Type and Subtype fields together identify the function of the frame. There are three frame types defined: control, data, and management. Each frame type has several subtypes defined. The Data frame, Null, CF-Ack, CF-Poll, and variants (subtypes 0000 through 0111) were introduced in the original 802.11 specification. The QoS Data frame subtype and variants (1000 through 1111) were introduced with the 802.11e amendment (QoS Enhancements). The Control Wrapper frame was introduced in 802.11n and may be used in place of any other control frame.

The proposed system can be implemented without alteration of infrastructure that is already in place. Mobile application developers can make an indoor localization service based on the proposed methods to target each individual store such as restaurants, coffee shops, bookstore, convenience store, or big retail markets, etc. For the operator of the store, they can be provided with precise localization service for its customers without any additional costs except pre-installed beacon devices and CCTV cameras. With the localization services provided to customers, customers can locate themselves within a building and can be guided to the sections of interest within the store.

Beacons can be also installed at a user's home for various purposes.

As a further additional implementation of the proposed system, in a server-based scenario, the localization server can detect any relocation/removal/installation of beacon devices within a store. Those detections can be valuable information for the beacon service operators.

In another application, spoofing attacks from false beacon devices can be detected by using the proposed method. Any spoofed beacon messages broadcasting a false UUID may be detected during the method with an uncoordinated RSSI value from the false beacon device.

Trilateration is a method for determining location of points by measuring distances. This technique is used widely in GPS receivers. To locate a mobile node indoors, radio signal strengths from reference devices at known positions can be used. The strength of the RF signal is measured between the reference devices and the mobile node. Once the signal strength is gathered, it can be converted into a distance using an indoor pathloss formula explained below. When the distances have been calculated, they are used in trilateration equations. It is possible to find the mobile node on the x-y plane and it will also allow us to find the z axis of the object as well.

Trilateration in 2D

For the indoor location system, 2D trilateration is used to find a mobile node located in a store, which will generally be assumed on an x-y plane. The location of three references is known along with the distances between the reference devices and the target for trilateration. One can visualize this by looking at FIGS. 19-20, where the box in the center represents the target location being searched for, or FIG. 34. The reference devices are labeled r1, r2, and r3, the distances between the reference and the target are labeled d1, d2 and d3 respectively. When circles are drawn having center positions on each reference and setting radius from the measured distances, the intersection between all three circles is the location of the mobile node.

In order to calculate the target location in a closed form, see equations below. In the following equations $x_i$ and $y_i$ represent the position of ri (references), where i=1, 2, 3.

$$(x-x_1)^2+(y-y_1)^2=d_1^2 \quad (Eq.10)$$

$$(x-x_2)^2+(y-y_2)^2=d_2^2 \quad (Eq.11)$$

$$(x-x_3)^2+(y-y_3)^2=d_3^2 \quad (Eq.12)$$

To simplify quadratic equations, (Eq.12) will be substituted from (Eq.10) and (Eq.11), which will leave two linear equations.

$$2(x_2-x_1)x+2(y_2-y_1)y=(d_1^2-d_2^2)-(x_1^2-x_2^2)-(y_1^2-y_2^2) \quad (Eq.13)$$

$$2(x_3-x_1)x+2(y_3-y_1)y=(d_1^2-d_3^2)-(x_1^2-x_3^2)-(y_1^2-y_3^2) \quad (Eq.14)$$

The location of the mobile node (x, y) can be found by solving (Eq.13) and (Eq.14) using Cramer's rule:

$$x = \frac{\begin{vmatrix} (d_1^2-d_2^2)-(x_1^2-x_2^2)-(y_1^2-y_2^2) & 2(y_2-y_1) \\ (d_1^2-d_3^2)-(x_1^2-x_3^2)-(y_1^2-y_3^2) & 2(y_3-y_1) \end{vmatrix}}{\begin{vmatrix} 2(x_2-x_1) & 2(y_2-y_1) \\ 2(x_3-x_1) & 2(y_3-y_1) \end{vmatrix}} \quad (Eq.15)$$

$$y = \frac{\begin{vmatrix} 2(x_2-x_1) & (d_1^2-d_2^2)-(x_1^2-x_2^2)-(y_1^2-y_2^2) \\ 2(x_3-x_1) & (d_1^2-d_3^2)-(x_1^2-x_3^2)-(y_1^2-y_3^2) \end{vmatrix}}{\begin{vmatrix} 2(x_2-x_1) & 2(y_2-y_1) \\ 2(x_3-x_1) & 2(y_3-y_1) \end{vmatrix}} \quad (Eq.\ 16)$$

Trilateration in 3D

In order to calculate the target location in 3D in a closed form, see equations below. In the following equations $x_i$, $y_i$, and $z_i$ represent the position of References, where i=1, 2, 3, 4.

$$(x-x_1)^2+(y-y_1)^2+(z-z_1)^2=d_1^2 \quad (Eq.17)$$

$$(x-x_2)^2+(y-y_2)^2+(z-z_2)^2=d_2^2 \quad (Eq.18)$$

$$(x-x_3)^2+(y-y_3)^2+(z-z_3)^2=d_3^2 \quad (Eq.19)$$

$$(x-x_4)^2+(y-y_4)^2+(z-z_4)^2=d_4^2 \quad (Eq.20)$$

To simplify quadratic equations, (Eq.20) will be substituted from (Eq.17), (Eq.18), and (Eq.19), which will leave two linear equations.

$$2(x_2-x_1)x+2(y_2-y_1)y+2(z_2-z_1)z=(d_1^2-d_2^2)-(x_1^2-x_2^2)-(y_1^2-y_2^2)-(z_1^2-z_2^2) \quad (Eq21)$$

$$2(x_3-x_1)x+2(y_3-y_1)y+2(z_3-z_1)z=(d_1^2-d_3^2)-(x_1^3-x_2^2)-(y_1^2-y_3^2)-(z_1^2-z_3^2) \quad (Eq22)$$

$$2(x_4-x_1)x+2(y_4-y_1)y+2(z_4-z_1)z=(d_1^2-d_4^2)-(x_1^4-x_2^2)-(y_1^2-y_4^2)-(z_1^2-z_4^2) \quad (Eq23)$$

The location of the mobile node (x, y) can be found by solving (Eq.21), (Eq.22), and (Eq.23) using Cramer's rule:

$$x = \frac{\begin{vmatrix} (d_1^2 - d_2^2) - (x_1^2 - x_2^2) - (y_1^2 - y_2^2) - (z_1^2 - z_2^2) & 2(y_2 - y_1) & 2(z_2 - z_1) \\ (d_1^2 - d_3^2) - (x_1^2 - x_3^2) - (y_1^2 - y_3^2) - (z_1^2 - z_3^2) & 2(y_3 - y_1) & 2(z_3 - z_1) \\ (d_1^2 - d_4^2) - (x_1^2 - x_4^2) - (y_1^2 - y_4^2) - (z_1^2 - z_4^2) & 2(y_4 - y_1) & 2(z_4 - z_1) \end{vmatrix}}{\begin{vmatrix} 2(x_2 - x_1) & 2(y_2 - y_1) & 2(z_2 - z_1) \\ 2(x_3 - x_1) & 2(y_3 - y_1) & 2(z_3 - z_1) \\ 2(x_4 - x_1) & 2(y_4 - y_1) & 2(z_4 - z_1) \end{vmatrix}} \quad \text{(Eq. 24)}$$

$$y = \frac{\begin{vmatrix} 2(x_2 - x_1) & (d_1^2 - d_2^2) - (x_1^2 - x_2^2) - (y_1^2 - y_2^2) - (z_1^2 - z_2^2) & 2(z_2 - z_1) \\ 2(x_3 - x_1) & (d_1^2 - d_3^2) - (x_1^2 - x_3^2) - (y_1^2 - y_3^2) - (z_1^2 - z_3^2) & 2(z_3 - z_1) \\ 2(x_4 - x_1) & (d_1^2 - d_4^2) - (x_1^2 - x_4^2) - (y_1^2 - y_4^2) - (z_1^2 - z_4^2) & 2(z_4 - z_1) \end{vmatrix}}{\begin{vmatrix} 2(x_2 - x_1) & 2(y_2 - y_1) & 2(z_2 - z_1) \\ 2(x_3 - x_1) & 2(y_3 - y_1) & 2(z_3 - z_1) \\ 2(x_4 - x_1) & 2(y_4 - y_1) & 2(z_4 - z_1) \end{vmatrix}} \quad \text{(Eq. 25)}$$

$$z = \frac{\begin{vmatrix} 2(x_2 - x_1) & 2(y_2 - y_1) & (d_1^2 - d_2^2) - (x_1^2 - x_2^2) - (y_1^2 - y_2^2) - (z_1^2 - z_2^2) \\ 2(x_3 - x_1) & 2(y_3 - y_1) & (d_1^2 - d_3^2) - (x_1^2 - x_3^2) - (y_1^2 - y_3^2) - (z_1^2 - z_3^2) \\ 2(x_4 - x_1) & 2(y_4 - y_1) & (d_1^2 - d_4^2) - (x_1^2 - x_4^2) - (y_1^2 - y_4^2) - (z_1^2 - z_4^2) \end{vmatrix}}{\begin{vmatrix} 2(x_2 - x_1) & 2(y_2 - y_1) & 2(z_2 - z_1) \\ 2(x_3 - x_1) & 2(y_3 - y_1) & 2(z_3 - z_1) \\ 2(x_4 - x_1) & 2(y_4 - y_1) & 2(z_4 - z_1) \end{vmatrix}} \quad \text{(Eq. 26)}$$

Distance Error from Environment

A disadvantage of using signal strength is that the calculated distance may not reflect the exact distance between a reference and a target. The reason for this is that the signal strength coming from a reference could be interfered with by other signal frequencies, room temperature, humidity, and various objects within a store. The equation converting signal strength to distance can be tuned for some of the parameters listed, but generally it is hard to correctly model individual reference-target links. Therefore, with every distance calculation that is calculated there will be a small error.

FIGS. 21A-B shows the effect of distance error in localization. In the simulation, four reference devices are placed within a store size of 10 m×10 m. After randomly locating a mobile node within a store, it measures RSSI values relative to the four reference devices, and calculates its location by using three highest RSSI values and the reference positions. The graphs shows cumulative results of target localizations of 1,000 iterations.

Figure 26B:
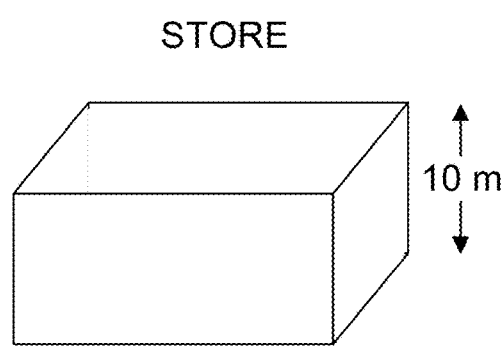
FIG. 26B illustrates an exemplary store layout used in simulations described herein.
Figure 26B:
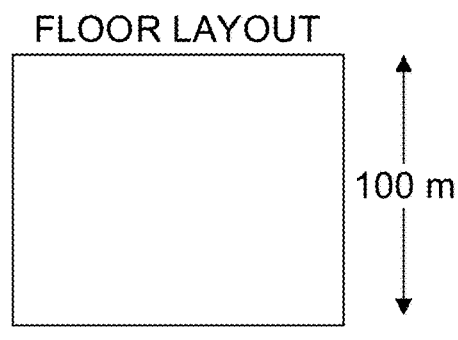

The other parameters used in the simulations are described in Table 2, below. The store layout used for the simulation is illustrated in FIG. 26B.

TABLE 2

| Parameter | Value |
| --- | --- |
| Environment description | Single-floor store Store size: 100 m × 100 m × 10 m |
| Beacon location | If beacon type is Bluetooth Beacon, the number of beacons is 100. In each 1/100$^{th}$ equally divided space, place a beacon in the center of the space at z = 1.5 m above the floor level of the store. If beacon type is Wi-Fi AP, the number of beacons is 25. In each 1/25$^{th}$ equally divided space, place a beacon in the center of the space at z = 1.5 m above the floor level of the store. |
| Mobile Nodes | In each time interval T, place MNs in random xy-locations (uniform distribution) at z = 1.5m above the floor level of the store. |

TABLE 2-continued

| Parameter | Value |
| --- | --- |
| Channel Model And Penetration Losses | Beacon Device Tx power 4 dBm (for Bluetooth Beacon, Power Class 2 Radio [9]) (no TX/RX antenna gain) 20 dBm (for Wi-Fi Mobile Device) (no TX/RX antenna gain) Beacon Device Rx minimum sensitivity 70 dBm (for Bluetooth Receiver with PER <=0.1% [10]) 82 dBm (for Wi-Fi Mobile Device) [11] Pathloss model PL(d) = 40.05 + 20*log10(fc/2.4) + 20*log10(min(d,5)) + (d > 5) * 35*log10(d/5) + 18.3*F$^\wedge$((F + 2)/ (F + 1) − 0.46) + 5*W [dB] d = max(3D distance [m], 1) fc = frequency [GHz] (2.4 GHz for Bluetooth, 5 GHz for Wi-Fi) F = number of floors traversed W = number of walls traversed in x-direction plus number of walls traversed in y-direction Shadowing (wireless channel error) Log-normal with x dB standard deviation, iid across all links |

When there is no RSSI variation, which will result in a correct distance conversion, the target can be correctly located to its ground-truth locations as depicted in FIG. 21A. However, when there is RSSI variations due to environmental effects in a store, target can be mis-located from its ground-truth locations as depicted in FIG. 21B.

Reference Position Error from Limited Information

Another possible localization error stems from inaccurately-estimated reference device positions. There can be differences between claimed reference positions by store owners and ground-truth reference positions due to pointing error, reference replacement, object rearrangement within a store, etc. Therefore, with every target location calculation based on the claimed reference positions, there can be a small error. This disclosure provides a method for addressing this problem by carefully investigating the pattern of erroneous localization as follows.

In FIG. 26A, for the store of 10 m×10 m covered by four reference beacons, reference position error is inserted on the lower left reference FIG. 22A and on the upper right reference FIG. 22B, respectively. Inspecting target localization results of 10,000 iterations cumulated, it is observed that the misestimated reference device contributes to localization errors near to it, while the target roaming the opposite side of the store is not affected by the mis-placed reference. This is due to the fact that trilateration mainly selects the three highest RSSI reference devices for localization. Target locations near the misestimated reference position are calculated by using the erroneous reference position which contributes to locate target outside the store.

Exemplary embodiments disclosed herein are implemented using one or more wired and/or wireless network node, such as a mobile node (MN) or wireless transmit/receive unit (WTRU) or other network entity. For example, a mobile node associated with an employee or customer may be implemented by a WTRU as described herein. A beacon device may be implemented using the transmit features of a WTRU, without necessarily requiring the receive features of the WTRU.

Figure 38:
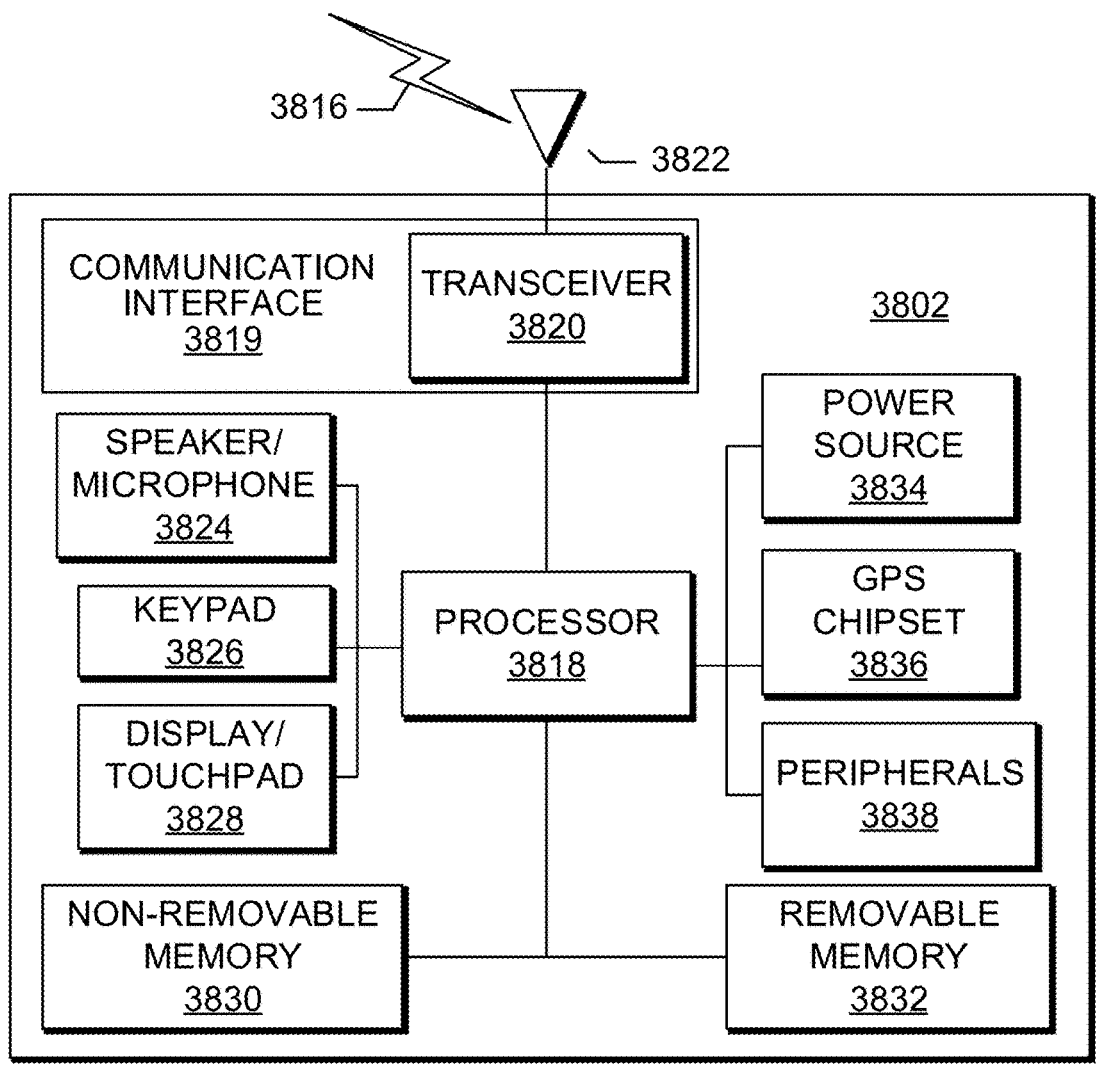
FIG. 38 illustrates an exemplary wireless transmit/receive unit (WTRU) that may be employed as a mobile node or beacon device in embodiments described herein.

FIG. 38 is a system diagram of an exemplary WTRU 3802, which may be employed as a user device in embodiments described herein. As shown in FIG. 38, the WTRU 3802 may include a processor 3818, a communication interface 3819 including a transceiver 3820, a transmit/receive element 3822, a speaker/microphone 3824, a keypad 3826, a display/touchpad 3828, a non-removable memory 3830, a removable memory 3832, a power source 3834, a global positioning system (GPS) chipset 3836, and sensors 3838. It will be appreciated that the WTRU 3802 may include any sub-combination of the foregoing elements while remaining consistent with an embodiment.

The processor 3818 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 3818 may perform signal coding, data processing, power control, input/output processing, and/or any other functionality that enables the WTRU 3802 to operate in a wireless environment. The processor 3818 may be coupled to the transceiver 3820, which may be coupled to the transmit/receive element 3822. While FIG. 38 depicts the processor 3818 and the transceiver 3820 as separate components, it will be appreciated that the processor 3818 and the transceiver 3820 may be integrated together in an electronic package or chip.

The transmit/receive element 3822 may be configured to transmit signals to, or receive signals from, a base station over the air interface 3816. For example, in one embodiment, the transmit/receive element 3822 may be an antenna configured to transmit and/or receive RF signals. In another embodiment, the transmit/receive element 3822 may be an emitter/detector configured to transmit and/or receive IR, UV, or visible light signals, as examples. In yet another embodiment, the transmit/receive element 3822 may be configured to transmit and receive both RF and light signals. It will be appreciated that the transmit/receive element 3822 may be configured to transmit and/or receive any combination of wireless signals.

In addition, although the transmit/receive element 3822 is depicted in FIG. 38 as a single element, the WTRU 3802 may include any number of transmit/receive elements 3822. More specifically, the WTRU 3802 may employ MIMO technology. Thus, in one embodiment, the WTRU 3802 may include two or more transmit/receive elements 3822 (e.g., multiple antennas) for transmitting and receiving wireless signals over the air interface 3816.

The transceiver 3820 may be configured to modulate the signals that are to be transmitted by the transmit/receive element 3822 and to demodulate the signals that are received by the transmit/receive element 3822. As noted above, the WTRU 3802 may have multi-mode capabilities. Thus, the transceiver 3820 may include multiple transceivers for enabling the WTRU 3802 to communicate via multiple RATs, such as UTRA and IEEE 802.11, as examples.

The processor 3818 of the WTRU 3802 may be coupled to, and may receive user input data from, the speaker/microphone 3824, the keypad 3826, and/or the display/touchpad 3828 (e.g., a liquid crystal display (LCD) display unit or organic light-emitting diode (OLED) display unit). The processor 3818 may also output user data to the speaker/microphone 3824, the keypad 3826, and/or the display/touchpad 3828. In addition, the processor 3818 may access information from, and store data in, any type of suitable memory, such as the non-removable memory 3830 and/or the removable memory 3832. The non-removable memory 3830 may include random-access memory (RAM), read-only memory (ROM), a hard disk, or any other type of memory storage device. The removable memory 3832 may include a subscriber identity module (SIM) card, a memory stick, a secure digital (SD) memory card, and the like. In other embodiments, the processor 3818 may access information from, and store data in, memory that is not physically located on the WTRU 3802, such as on a server or a home computer (not shown).

The processor 3818 may receive power from the power source 3834, and may be configured to distribute and/or control the power to the other components in the WTRU 3802. The power source 3834 may be any suitable device for powering the WTRU 102. As examples, the power source 3834 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 3818 may also be coupled to the GPS chipset 3836, which may be configured to provide location information (e.g., longitude and latitude) regarding the current location of the WTRU 3802. In addition to, or in lieu of, the information from the GPS chipset 3836, the WTRU 3802 may receive location information over the air interface 3816 from a base station and/or determine its location based on the timing of the signals being received from two or more nearby base stations. It will be appreciated that the WTRU 3802 may acquire location information by way of any suitable location-determination method while remaining consistent with an embodiment.

The processor 3818 may further be coupled to other peripherals 3838, which may include one or more software and/or hardware modules that provide additional features, functionality and/or wired or wireless connectivity. For example, the peripherals 3838 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 39:
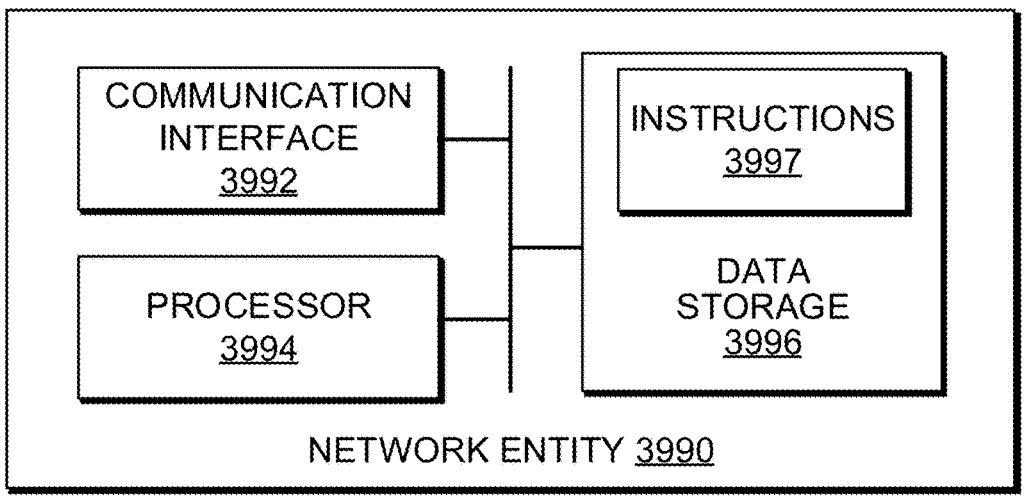
FIG. 39 illustrates an exemplary network entity that may be employed as a localization server in embodiments described herein.

FIG. 39 depicts an exemplary network entity 3990 that may be used in embodiments of the present disclosure, for example as a localization server. As depicted in FIG. 39, network entity 3990 includes a communication interface 3992, a processor 3994, and non-transitory data storage 3996, all of which are communicatively linked by a bus, network, or other communication path 3998.

Communication interface 3992 may include one or more wired communication interfaces and/or one or more wireless-communication interfaces. With respect to wired communication, communication interface 3992 may include one or more interfaces such as Ethernet interfaces, as an example. With respect to wireless communication, communication interface 3992 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 3992 may be equipped at a scale and with a configuration appropriate for acting on the network side—as opposed to the client side—of wireless communications (e.g., LTE communications, Wi-Fi communications, and the like). Thus, communication interface 3992 may include the appropriate equipment and circuitry (perhaps including multiple transceivers) for serving multiple mobile stations, UEs, or other access terminals in a coverage area.

Processor 3994 may include one or more processors of any type deemed suitable by those of skill in the relevant art, some examples including a general-purpose microprocessor and a dedicated DSP.

Data storage 3996 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 39, data storage 3996 contains program instructions 3997 executable by processor 3994 for carrying out various combinations of the various network-entity functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

REFERENCES

[1] Euclid Analytics http://euclidanalytics.com/
[2] IPS Wikipedia, http://en.wikipedia.org/wiki/Indoor_positioning_system
[3] P. Bahl V. N. Padmanabhan, RADAR: An In-Building RF-Based User Location and Tracking System, Proceedings of IEEE INFOCOM 2000, Vol. 2, Tel-Aviv, Israel (March 2000): 775-784
[4] Nicola. Cinefra, Thesis, Politecnico Di Milano, An adaptive indoor positioning system based on Bluetooth Low Energy RSSI
[5] iBeacon Wikipedia, http://en.wikipedia.org/wiki/Meacon
[6] Shopkick, Inc., http://www.shopkick.com/
[7] Facebook's Beacon-based pilot tests, http://www.geo-marketing.com/can-facebook-bring-beacons-to-the-mainstream
[8] Getting Started with iBeacon Ver.1.0, Apple, Inc.
[9] http://www.bluetooth.com/Pages/Basics.aspx
[10] Bluetooth Core Spec V4.2 https://www.bluetooth.org/en-us/specification/adopted-specifications
[11] IEEE 802.11-2012 Spec http://standards.ieee.org/findstds/standard/802.11-2012.html

The invention claimed is:

1. A system comprising:
a processor; and
a non-transitory computer-readable medium storing instructions that, when executed on the processor, are operative to cause the system to:
receive, at a mobile node, beacon messages from a plurality of beacon devices comprising at least a first beacon message from a first beacon device in a room, the beacon messages comprising a room identifier and a beacon identifier;
based on the received beacon messages, determine a number of detected beacon devices in the room; and
set an initial estimated position of the first beacon device in the room, the initial estimated position being determined at least in part by the number of detected beacon devices in the room.

2. The system of claim 1, wherein the initial estimated position of the first beacon device is based on a geometric pattern selected based on the number of detected beacon devices in the room.

3. The system of claim 2,
wherein the initial estimated position of the first beacon device is a selected position within a geometric pattern comprising a plurality of positions, and
wherein the selected position within the geometric pattern is based at least in part on a received signal strength of at least the first beacon message at the mobile node.

4. The system of claim 1, wherein the instructions, when executed on the processor, are further operative to cause the system to refine the initial estimated position based at least in part on a received signal strength of the first beacon device.

5. The system of claim 1, wherein the instructions, when executed on the processor, are further operative to cause the system to:
calculate a plurality of estimated locations of the mobile node based on beacon signal strengths received from the plurality of beacon devices by the mobile node and based on estimated positions of the plurality of beacon devices, wherein the plurality of beacon devices comprises the first beacon device;
based on the estimated locations, determine an estimated region of movement of the mobile node;
compare the region of movement to a floor plan of the room comprising the plurality of beacon devices; and change the estimated position of at least one of the beacon devices based on the comparison of the region of movement to the floor plan.

6. The system of claim 5, wherein determining the estimated region of movement of the mobile node comprises determining the smallest convex polygon that comprises all calculated estimated locations of the mobile node.

7. The system of claim 5, wherein changing the estimated position of at least one of the beacon devices comprises repositioning a centroid of at least one of the beacon devices.

8. The system of claim 5,
wherein the room is in a place of business,
wherein the instructions, when executed on the processor, are further operative to cause the system to determine whether the mobile node is associated with an employee of the place of business, and
wherein changing the estimated position of at least one of the beacon devices is performed after a determination that the mobile node is associated with an employee.

9. The system of claim 8, wherein determining whether the mobile node is associated with an employee comprises determining whether at least some of the estimated locations of the mobile node are in an employee-only area.

10. The system of claim 8, wherein determining whether the mobile node is associated with an employee comprises determining whether the mobile node is located in the place of business during an employee-only period.

11. The system of claim 5, wherein changing the estimated position of at least one of the beacon devices is performed using partial centroid repositioning.

12. The system of claim 5, wherein changing the estimated position of at least one of the beacon devices is performed using total centroid repositioning.

13. The system of claim 5, wherein the instructions, when executed on the processor, are further operative to cause the system to:
use a camera to determine a plurality of positions of at least one individual in the room; and
obtain a plurality of distance measurements between a mobile node associated with the at least one individual and a beacon device in the plurality of beacon devices; the distance measurements being based at least in part on receive signal strength of beacon signals received by the mobile device from the beacon device,
wherein changing the estimated position of at least one of the beacon devices is further based at least in part on the determined positions of the at least one individual and on the plurality of distance measurements.

14. A system comprising:
a processor; and
a non-transitory computer-readable medium storing instructions that, when executed on the processor, are operative to cause the system to:
obtain floor plan information of a building, wherein the floor plan information identifies locations of a plurality of rooms comprising a first room;
receive, at a mobile node, a plurality of beacon signals from a respective plurality of beacon devices;
calculate a plurality of estimated locations of the mobile node based on beacon signal strengths received from the plurality of beacon devices by the mobile node and based on estimated positions of the plurality of beacon devices;
based on the plurality of estimated locations of the mobile node, determine an estimated region of movement of the mobile node;

compare the region of movement to the floor plan information of the first room comprising the plurality of beacon devices; and
change the estimated position of at least one of the beacon devices based on the comparison of the region of movement to the floor plan information.

15. The system of claim 14,
wherein the first room is in a place of business,
wherein the instructions, when executed on the processor, are further operative to cause the system to determine whether the mobile node is associated with an employee of the place of business, and
wherein changing the estimated position of at least one of the beacon devices is performed after a determination that the mobile node is associated with an employee.

16. The system of claim 15, wherein determining whether the mobile node is associated with an employee comprises determining whether at least some of the estimated locations of the mobile node are in an employee-only area.

17. The system of claim 15, wherein determining whether the mobile node is associated with an employee comprises determining whether the mobile node is located in the place of business during an employee-only period.

18. The system of claim 14, wherein changing the estimated position of at least one of the beacon devices is performed using partial centroid repositioning.

19. A system comprising:
a processor; and
a non-transitory computer-readable medium storing instructions that, when executed on the processor, are operative to cause the system to:
receive, at a mobile node, a first beacon signal from a first beacon device and a second beacon signal from a second beacon device;
based on a first received signal strength of the first beacon signal, determine whether the mobile node is proximate to the first beacon device;
based on a second received signal strength of the second beacon signal, determine a distance from the mobile node to the second beacon device; and
in response to a determination that the mobile node is proximate to the first beacon device, update an estimated position of at least one of the first beacon device and the second beacon device using the determined distance as a distance measure between the first and second beacon devices.

20. A system comprising:
a processor; and
a non-transitory computer-readable medium storing instructions that, when executed on the processor, are operative to cause the system to:
obtain floor plan information of a building identifying: (i) locations of a plurality of rooms comprising a first room, and (ii) locations of a plurality of areas within one or more of the plurality of rooms comprising at least a first area within the first room;
receive, at a mobile node, beacon messages from a plurality of beacon devices, comprising at least a first beacon message from a first beacon device in the first room, the beacon messages comprising a room identifier and a beacon device identifier;
determine a number of detected beacon devices in the first room based on the received beacon messages;
determine a number of detected beacon devices in the first area of the first room; and
set an initial estimated position of the first beacon device in the first area of the first room, the initial estimated position being determined at least in part by the number of detected beacon devices in the first room.

\* \* \* \* \*